United States Patent
Reid et al.

(10) Patent No.: US 11,320,086 B2
(45) Date of Patent: May 3, 2022

(54) MULTIPLE GEOMETRY AND MULTIPLE MATERIAL INSULATED COMPONENTS

(71) Applicant: CONCEPT GROUP LLC, Wellesley, MA (US)

(72) Inventors: Aarne H. Reid, Jupiter, FL (US); David H. Reid, Jr., Fort Pierce, FL (US); Shriram Radhakrishnan, West Palm Beach, FL (US)

(73) Assignee: Concept Group LLC, Wellesley, MA (US)

( * ) Notice: Subject to any disclaimer, the term of this patent is extended or adjusted under 35 U.S.C. 154(b) by 24 days.

(21) Appl. No.: 16/641,829

(22) PCT Filed: Aug. 24, 2018

(86) PCT No.: PCT/US2018/047974
§ 371 (c)(1),
(2) Date: Feb. 25, 2020

(87) PCT Pub. No.: WO2019/040885
PCT Pub. Date: Feb. 28, 2019

(65) Prior Publication Data
US 2020/0393076 A1    Dec. 17, 2020

Related U.S. Application Data

(60) Provisional application No. 62/594,180, filed on Dec. 4, 2017, provisional application No. 62/567,361, filed (Continued)

(51) Int. Cl.
*F16L 59/065* (2006.01)
*F16L 59/02* (2006.01)
(Continued)

(52) U.S. Cl.
CPC ........... *F16L 59/024* (2013.01); *F16L 59/065* (2013.01); *F16L 59/182* (2013.01); *F16L 59/22* (2013.01)

(58) Field of Classification Search
CPC . F16L 59/065; F16L 59/06; F16L 9/18; F16L 39/00
(Continued)

(56) References Cited

U.S. PATENT DOCUMENTS 1,362,805 A    12/1920   Kruse
1,457,504 A     6/1923   Cullen et al.
(Continued)

FOREIGN PATENT DOCUMENTS

BE    0900295 A    12/1984
CN    101119673 A    2/2008
(Continued)

OTHER PUBLICATIONS

Daniel et al., "Handbook of Battery Materials", Wiley-VCH Publishers, 2011, vol. 1, 3 pages.
(Continued)

*Primary Examiner* — Patrick F Brinson
(74) *Attorney, Agent, or Firm* — BakerHostetler

(57) ABSTRACT

The present disclosure provides insulated components that include corrugated regions, which corrugated regions may reside on inner tubes, outer tubes, or both. The present disclosure also provides insulated components that may achieve straight, curved, or other variable geometries.

27 Claims, 26 Drawing Sheets

Related U.S. Application Data on Oct. 3, 2017, provisional application No. 62/562,543, filed on Sep. 25, 2017, provisional application No. 62/550,200, filed on Aug. 25, 2017, provisional application No. 62/550,182, filed on Aug. 25, 2017.

(51) Int. Cl.
*F16L 59/18* (2006.01)
*F16L 59/22* (2006.01)

(58) Field of Classification Search
USPC ........ 138/121, 122, 114, 118, 119, 109, 148, 138/149; 285/47, 223, 226
See application file for complete search history.

(56) References Cited

U.S. PATENT DOCUMENTS

| | | | |
|---|---|---|---|
| 2,085,737 | A | 7/1937 | Cereghino |
| 2,225,660 | A | 12/1940 | Rogers |
| 2,362,893 | A | 11/1944 | Durst |
| 2,363,893 | A | 11/1944 | Monier |
| 2,573,594 | A | 10/1951 | Nofzinger |
| 2,666,979 | A | 1/1954 | Van Dusen |
| 2,722,336 | A | 11/1955 | Aaron et al. |
| 2,807,074 | A | 9/1957 | Schroeder |
| 2,845,199 | A | 7/1958 | Putman et al. |
| 2,867,242 | A | 1/1959 | Harris et al. |
| 3,068,026 | A | 12/1962 | McKamey |
| 3,090,463 | A | 5/1963 | Yanda |
| 3,119,238 | A | 1/1964 | Chamberlain et al. |
| 3,146,005 | A | 8/1964 | Peyton |
| 3,152,452 | A | 10/1964 | Bond et al. |
| 3,195,564 | A | 7/1965 | Carney et al. |
| 3,265,236 | A | 8/1966 | Norman et al. |
| 3,457,723 | A | 7/1969 | Kerns |
| 3,460,512 | A | 8/1969 | Keichler et al. |
| 3,510,323 | A | 5/1970 | Wismer et al. |
| 3,706,208 | A | 12/1972 | Kadi et al. |
| 3,736,936 | A | 6/1973 | Basiulis et al. |
| 3,760,142 | A | 9/1973 | Schoenthaler |
| 3,799,440 | A | 3/1974 | Goss et al. |
| 3,988,029 | A | 10/1976 | Gibson |
| 4,055,268 | A | 10/1977 | Barthel |
| 4,117,201 | A | 9/1978 | Keifert |
| 4,157,779 | A | 6/1979 | Arashi et al. |
| 4,200,199 | A | 4/1980 | Perkins et al. |
| 4,332,401 | A * | 6/1982 | Stephenson ............. F16L 59/21 138/149 |
| 4,396,211 | A | 8/1983 | McStravick et al. |
| 4,399,919 | A | 8/1983 | Posnansky et al. |
| 4,450,872 | A | 5/1984 | Orcutt |
| 4,491,347 | A | 1/1985 | Gustafson |
| 4,515,397 | A | 5/1985 | Nowobilski et al. |
| 4,538,337 | A | 9/1985 | Holbrook et al. |
| 4,653,469 | A | 3/1987 | Miyaji et al. |
| 4,696,104 | A | 9/1987 | Vanzetti et al. |
| 4,746,054 | A | 5/1988 | Moats et al. |
| 4,758,222 | A | 7/1988 | McCoy |
| 4,838,859 | A | 6/1989 | Strassmann |
| 4,903,631 | A | 2/1990 | Morris |
| 4,919,299 | A | 4/1990 | Haines |
| 4,997,124 | A | 3/1991 | Kitabatake et al. |
| 5,038,706 | A | 8/1991 | Morris |
| 5,052,816 | A | 10/1991 | Nakamura et al. |
| 5,108,390 | A | 4/1992 | Potocky et al. |
| 5,206,705 | A | 4/1993 | Tokura |
| 5,235,817 | A | 8/1993 | Gallagher et al. |
| 5,285,559 | A | 2/1994 | Thompson et al. |
| 5,393,260 | A * | 2/1995 | Barth ............. F16L 9/18 138/114 |
| 5,411,897 | A | 5/1995 | Harvey et al. |
| 5,520,682 | A | 5/1996 | Baust et al. |
| 5,524,630 | A | 6/1996 | Crowley |
| 5,562,154 | A | 10/1996 | Benson et al. |
| 5,573,140 | A | 11/1996 | Satomi et al. |
| 5,573,532 | A | 11/1996 | Chang et al. |
| 5,600,752 | A | 2/1997 | Lopatinsky |
| 5,650,020 | A | 7/1997 | Ohta et al. |
| 5,674,218 | A | 10/1997 | Rubinsky et al. |
| 5,704,401 | A * | 1/1998 | Fukui ............. F16L 11/11 138/121 |
| 5,742,048 | A | 4/1998 | Kobayashi et al. |
| 5,756,934 | A | 5/1998 | Purdom |
| 5,862,973 | A | 1/1999 | Wasserman |
| 5,869,801 | A | 2/1999 | Paton et al. |
| 5,870,823 | A | 2/1999 | Bezama et al. |
| 5,983,950 | A | 11/1999 | Aoki et al. |
| 6,050,443 | A | 4/2000 | Tung |
| 6,095,405 | A | 8/2000 | Kim et al. |
| 6,109,518 | A | 8/2000 | Mueller et al. |
| 6,139,571 | A | 10/2000 | Fuller et al. |
| 6,145,547 | A | 11/2000 | Villatte |
| 6,166,907 | A | 12/2000 | Chien |
| 6,186,390 | B1 | 2/2001 | Tadauchi et al. |
| 6,203,764 | B1 | 3/2001 | Benson |
| 6,216,745 | B1 | 4/2001 | Augustynowicz et al. |
| 6,257,282 | B1 * | 7/2001 | Emmer ............. F16L 59/065 138/109 |
| 6,360,935 | B1 | 3/2002 | Flake |
| 6,706,037 | B2 | 3/2004 | Zvuloni et al. |
| 6,755,823 | B2 | 6/2004 | Lalonde |
| 6,875,209 | B2 | 4/2005 | Zvuloni et al. |
| 6,936,045 | B2 | 8/2005 | Yu et al. |
| 7,064,429 | B2 | 6/2006 | Bemmerl et al. |
| 7,139,172 | B2 | 11/2006 | Bezama et al. |
| 7,143,788 | B2 * | 12/2006 | Keyes ............. F16L 51/025 138/120 |
| 7,150,743 | B2 | 12/2006 | Zvuloni et al. |
| 7,203,064 | B2 | 4/2007 | Mongia et al. |
| 7,207,985 | B2 | 4/2007 | Duong et al. |
| 7,258,161 | B2 | 8/2007 | Cosley et al. |
| 7,298,623 | B1 | 11/2007 | Kuczynski et al. |
| RE40,049 | E | 2/2008 | Li |
| 7,334,630 | B2 | 2/2008 | Goodson et al. |
| 7,354,434 | B2 | 4/2008 | Zvuloni et al. |
| 7,356,434 | B2 | 4/2008 | Wu et al. |
| 7,361,187 | B2 | 4/2008 | Duong et al. |
| 7,374,063 | B2 | 5/2008 | Reid |
| 7,393,350 | B2 | 7/2008 | Maurice |
| 7,419,085 | B2 | 9/2008 | Fukunaka et al. |
| 7,431,896 | B2 | 10/2008 | Biel, Jr. et al. |
| 7,451,785 | B2 | 11/2008 | Taira et al. |
| 7,460,369 | B1 | 12/2008 | Blish, II |
| 7,485,117 | B2 | 2/2009 | Damasco et al. |
| 7,497,365 | B2 | 3/2009 | Kimura et al. |
| 7,510,534 | B2 | 3/2009 | Burdorff et al. |
| 7,515,415 | B2 | 4/2009 | Monfarad et al. |
| 7,562,679 | B2 * | 7/2009 | Yasuda ............. F16L 11/11 138/121 |
| 7,608,071 | B2 | 10/2009 | Duong et al. |
| 7,621,889 | B2 | 11/2009 | Duong et al. |
| 7,621,890 | B2 | 11/2009 | Duong et al. |
| 7,681,299 | B2 | 3/2010 | Reid |
| 7,909,227 | B2 | 3/2011 | Duong et al. |
| 7,980,171 | B2 | 7/2011 | Groll |
| 8,231,613 | B2 | 7/2012 | Baxter et al. |
| 8,353,332 | B2 | 1/2013 | Reid |
| 8,434,665 | B2 | 5/2013 | Motomura et al. |
| 8,569,622 | B2 * | 10/2013 | Katou ............. H02G 3/34 174/68.3 |
| 9,243,726 | B2 | 1/2016 | Reid |
| 9,463,918 | B2 | 10/2016 | Reid |
| 9,739,296 | B2 | 8/2017 | Schlosser |
| 9,874,303 | B2 | 1/2018 | Reid |
| 10,495,250 | B2 | 12/2019 | Reid |
| 2001/0030225 | A1 | 10/2001 | Nagata |
| 2002/0114937 | A1 | 8/2002 | Albert et al. |
| 2003/0079554 | A1 | 5/2003 | Van Cleve |
| 2003/0146224 | A1 | 8/2003 | Fujii et al. |
| 2004/0116851 | A1 | 6/2004 | Johansen et al. |
| 2004/0129756 | A1 | 7/2004 | Zakel et al. |
| 2004/0181136 | A1 | 9/2004 | McDaniel et al. |
| 2004/0226979 | A1 | 11/2004 | Sato et al. |

(56) References Cited

U.S. PATENT DOCUMENTS

| | | |
|---|---|---|
| 2005/0211711 A1 | 9/2005 | Reid |
| 2006/0054234 A1 | 3/2006 | White |
| 2006/0054243 A1 | 3/2006 | Walton |
| 2006/0061092 A1 | 3/2006 | Keyes |
| 2006/0071052 A1 | 4/2006 | Conlon et al. |
| 2006/0076389 A1 | 4/2006 | Kemper et al. |
| 2006/0086773 A1 | 4/2006 | Sanftleben et al. |
| 2006/0213566 A1 | 9/2006 | Johnson |
| 2006/0282039 A1 | 12/2006 | Duong et al. |
| 2007/0012374 A1* | 1/2007 | Yasuda .......... F16L 11/11 138/121 |
| 2007/0102477 A1 | 5/2007 | Prince |
| 2007/0102478 A1 | 5/2007 | Prince |
| 2007/0235497 A1 | 10/2007 | Hsu |
| 2007/0235498 A1 | 10/2007 | Hsu |
| 2007/0235499 A1 | 10/2007 | Hsu |
| 2007/0246510 A1 | 10/2007 | Hsu |
| 2008/0006598 A1 | 1/2008 | Fujii et al. |
| 2008/0036076 A1 | 2/2008 | Ouyang |
| 2008/0061111 A1 | 3/2008 | Kiriyama |
| 2008/0083816 A1 | 4/2008 | Leinbach et al. |
| 2008/0121642 A1 | 5/2008 | Reid |
| 2008/0147055 A1 | 6/2008 | Duong et al. |
| 2008/0169037 A1 | 7/2008 | Ziegler |
| 2008/0197170 A1 | 8/2008 | Prince |
| 2008/0285230 A1 | 11/2008 | Bojan et al. |
| 2009/0000681 A1 | 1/2009 | Averbuch et al. |
| 2009/0031659 A1 | 2/2009 | Kalfon |
| 2009/0065499 A1 | 3/2009 | England |
| 2009/0068070 A1 | 3/2009 | Hashimoto et al. |
| 2009/0123221 A1 | 5/2009 | Marshall |
| 2009/0152331 A1 | 6/2009 | Schmitt et al. |
| 2010/0057064 A1 | 3/2010 | Baust et al. |
| 2010/0057067 A1 | 3/2010 | Baust et al. |
| 2010/0076421 A1 | 3/2010 | Baust et al. |
| 2010/0096037 A1 | 4/2010 | Lee et al. |
| 2010/0258290 A1 | 10/2010 | Bass |
| 2011/0056582 A1 | 3/2011 | Walle et al. |
| 2011/0178514 A1 | 7/2011 | Levin et al. |
| 2011/0264084 A1 | 10/2011 | Reid |
| 2012/0085070 A1 | 4/2012 | Chou et al. |
| 2012/0090817 A1 | 4/2012 | Reid |
| 2012/0175007 A1 | 7/2012 | Pan et al. |
| 2012/0184901 A1 | 7/2012 | Nguyen et al. |
| 2012/0228364 A1 | 9/2012 | Vegelahn |
| 2012/0282792 A1 | 11/2012 | Schloegl |
| 2012/0318808 A1 | 12/2012 | McCormick |
| 2013/0105496 A1 | 5/2013 | Jung |
| 2013/0199757 A1 | 8/2013 | Meyer et al. |
| 2013/0312865 A1 | 11/2013 | Baur et al. |
| 2014/0008417 A1 | 1/2014 | Visser et al. |
| 2014/0012243 A1 | 1/2014 | Burnett et al. |
| 2014/0090737 A1 | 4/2014 | Reid |
| 2014/0177146 A1 | 6/2014 | Barizza et al. |
| 2014/0182608 A1 | 7/2014 | Egoyants et al. |
| 2014/0275767 A1 | 9/2014 | Baust |
| 2015/0110548 A1 | 4/2015 | Reid |
| 2015/0149800 A1 | 5/2015 | Gendler et al. |
| 2015/0151893 A1 | 6/2015 | Wengreen et al. |
| 2015/0159800 A1 | 6/2015 | Kimura et al. |
| 2015/0168050 A1 | 6/2015 | Cur et al. |
| 2015/0260332 A1 | 9/2015 | Reid |
| 2015/0271927 A1 | 9/2015 | Cocklin et al. |
| 2015/0345930 A1 | 12/2015 | Ikeda et al. |
| 2015/0356730 A1 | 12/2015 | Grove et al. |
| 2016/0044963 A1 | 2/2016 | Saleem |
| 2016/0050784 A1 | 2/2016 | Koizumi et al. |
| 2016/0084425 A1 | 3/2016 | Reid |
| 2016/0279725 A1 | 9/2016 | Azdasht |
| 2016/0314220 A1 | 10/2016 | Sachdev et al. |
| 2016/0317220 A1 | 11/2016 | Guo |
| 2016/0341360 A1 | 11/2016 | Uraguchi et al. |
| 2016/0354853 A1 | 12/2016 | Azdasht |
| 2016/0368072 A1 | 12/2016 | Senga et al. |
| 2017/0030498 A1 | 2/2017 | Chu |
| 2017/0043938 A1 | 2/2017 | Reid |
| 2017/0062774 A1 | 3/2017 | Reid et al. |
| 2017/0106414 A1 | 4/2017 | Hamilton |
| 2017/0120362 A1 | 5/2017 | Reid et al. |
| 2017/0165773 A1 | 6/2017 | Azdasht et al. |
| 2017/0225276 A1 | 8/2017 | Reid |
| 2017/0253416 A1 | 9/2017 | Reid |
| 2017/0305641 A1 | 10/2017 | Bodum |
| 2017/0358079 A1 | 12/2017 | Gillies et al. |
| 2018/0106414 A1 | 4/2018 | Reid |
| 2018/0106529 A1 | 4/2018 | Cur et al. |

FOREIGN PATENT DOCUMENTS

| | | |
|---|---|---|
| CN | 101666407 A | 3/2010 |
| CN | 102072363 A | 5/2011 |
| CN | 202001825 U | 10/2011 |
| DE | 3630399 A1 | 3/1988 |
| DE | 4324051 A1 | 1/1995 |
| DE | 10019420 A1 | 10/2001 |
| DE | 202010008131 U1 | 10/2010 |
| EP | 0611614 A1 | 8/1994 |
| EP | 1294022 A2 | 3/2003 |
| EP | 1619436 A2 | 1/2006 |
| EP | 1643180 A1 | 4/2006 |
| EP | 2957804 A1 | 12/2015 |
| FR | 2550313 A1 | 2/1985 |
| FR | 2597571 A1 | 10/1987 |
| FR | 2777630 A1 | 10/1999 |
| GB | 1034671 A | 6/1966 |
| GB | 2105226 A | 3/1983 |
| JP | 60-071243 A | 4/1985 |
| JP | 06-142909 A | 5/1994 |
| JP | 10-231970 A | 9/1998 |
| JP | 11-153290 A | 6/1999 |
| JP | 3654249 B2 | 6/2005 |
| JP | 2005-224832 A | 8/2005 |
| JP | 3962782 B1 | 8/2007 |
| JP | 2008-045956 A | 2/2008 |
| JP | 2011-162756 A | 8/2011 |
| KR | 10-1510288 B1 | 4/2015 |
| WO | 03/25476 A2 | 3/2003 |
| WO | 2009/068255 A1 | 6/2009 |
| WO | 2013/034455 A1 | 3/2013 |
| WO | 2015/091003 A1 | 6/2015 |
| WO | 2017/152045 A1 | 9/2017 |
| WO | 2018/093773 A1 | 5/2018 |
| WO | 2018/093776 A1 | 5/2018 |
| WO | 2018/093781 A1 | 5/2018 |
| WO | 2019/010385 A1 | 1/2019 |
| WO | 2019/014463 A1 | 1/2019 |
| WO | 2019/040885 A1 | 2/2019 |
| WO | 2019/204306 A1 | 10/2019 |
| WO | 2020/112976 A1 | 6/2020 |

OTHER PUBLICATIONS

Database WPI Week 201179 Thomson Scientific, London, GB; AN 2011-N98729 XP002794699, & CN 202 001 825 U (LINS) Oct. 5, 2011 (Oct. 5, 2011).

Guidotti et al., "Characterization of Vacuum-Multifoil Insulation for Long-Life Thermal Batteries", U.S. Department of Energy, Office of Scientific and Technical Information, Apr. 17, 2000, 3 pages.

Hodkinson et al., "Lightweight Electric/Hybrid Vehicle Design", 2001, 4 pages.

https://en.wikipedia.org/wiki/Sodium-sulfur battery Jun. 11, 2018, 5 pages.

Multifoil Insulation; 1 page.

National Research Council, "Assessment of Research Needs for Advanced Battery Systems", 1982, 203 pages.

Overview of NAS Battery for Load Management; CEC Energy Storage Workshop, Feb. 2005, pp. 1-22.

U.S. Patent Application filed on Apr. 23, 2010 by Concept Group Inc., U.S. Appl. No. 12/766,397.

* cited by examiner

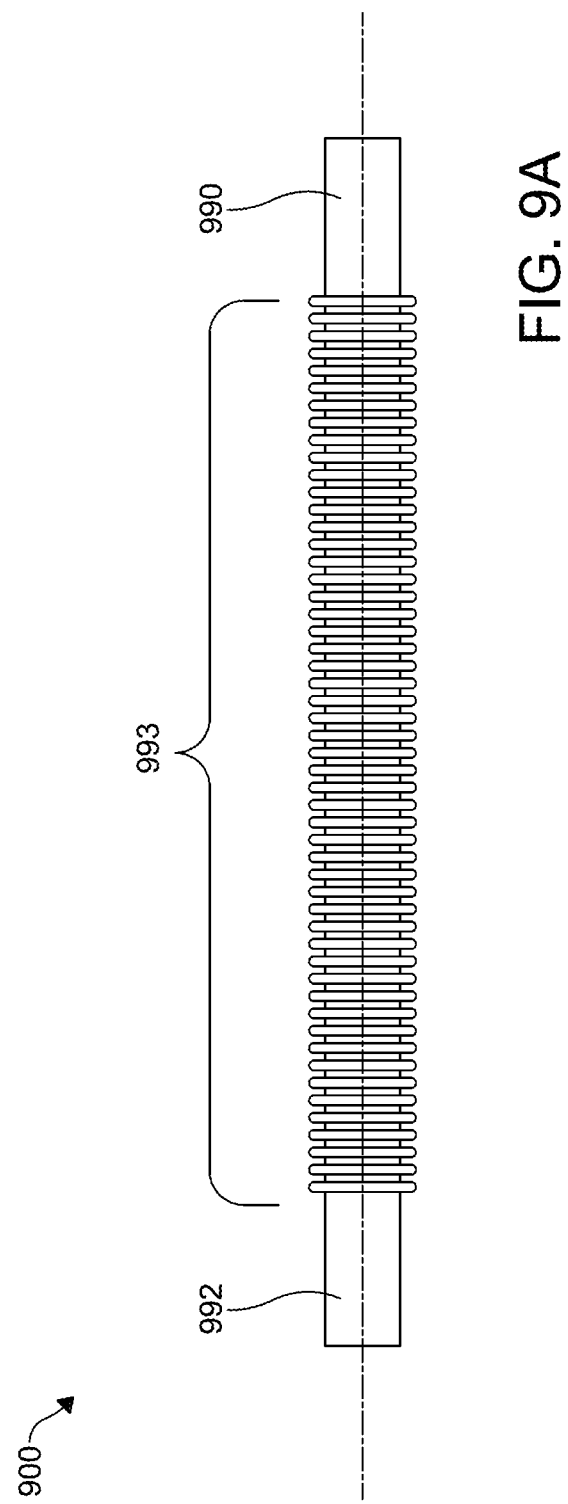

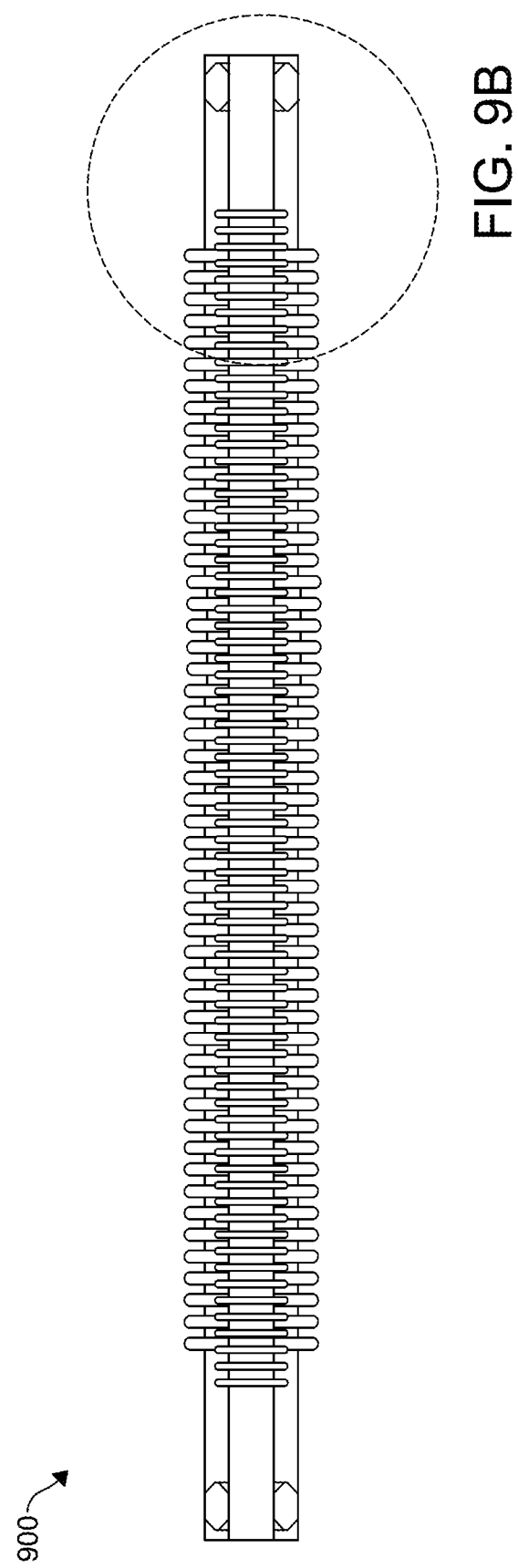

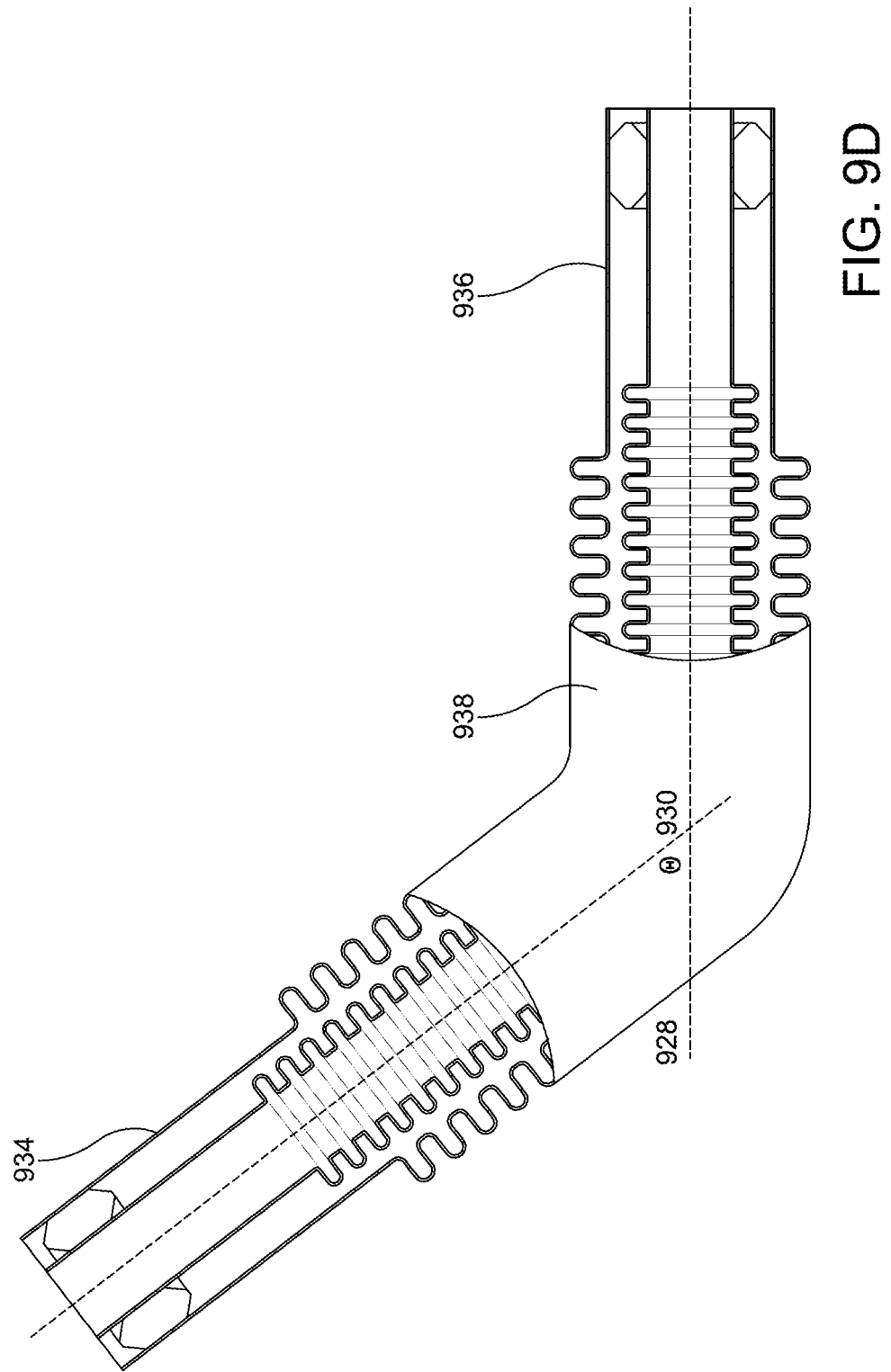

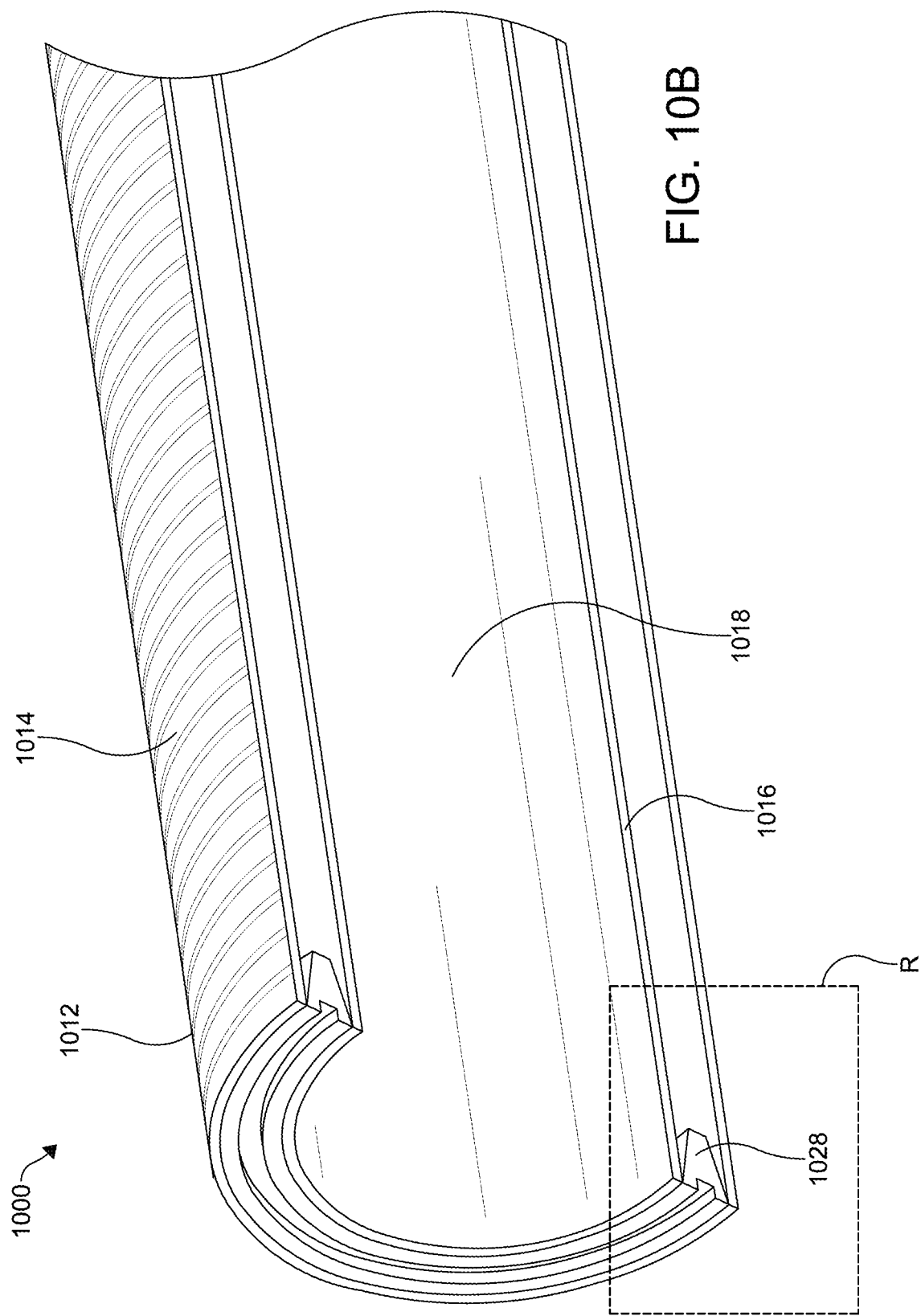

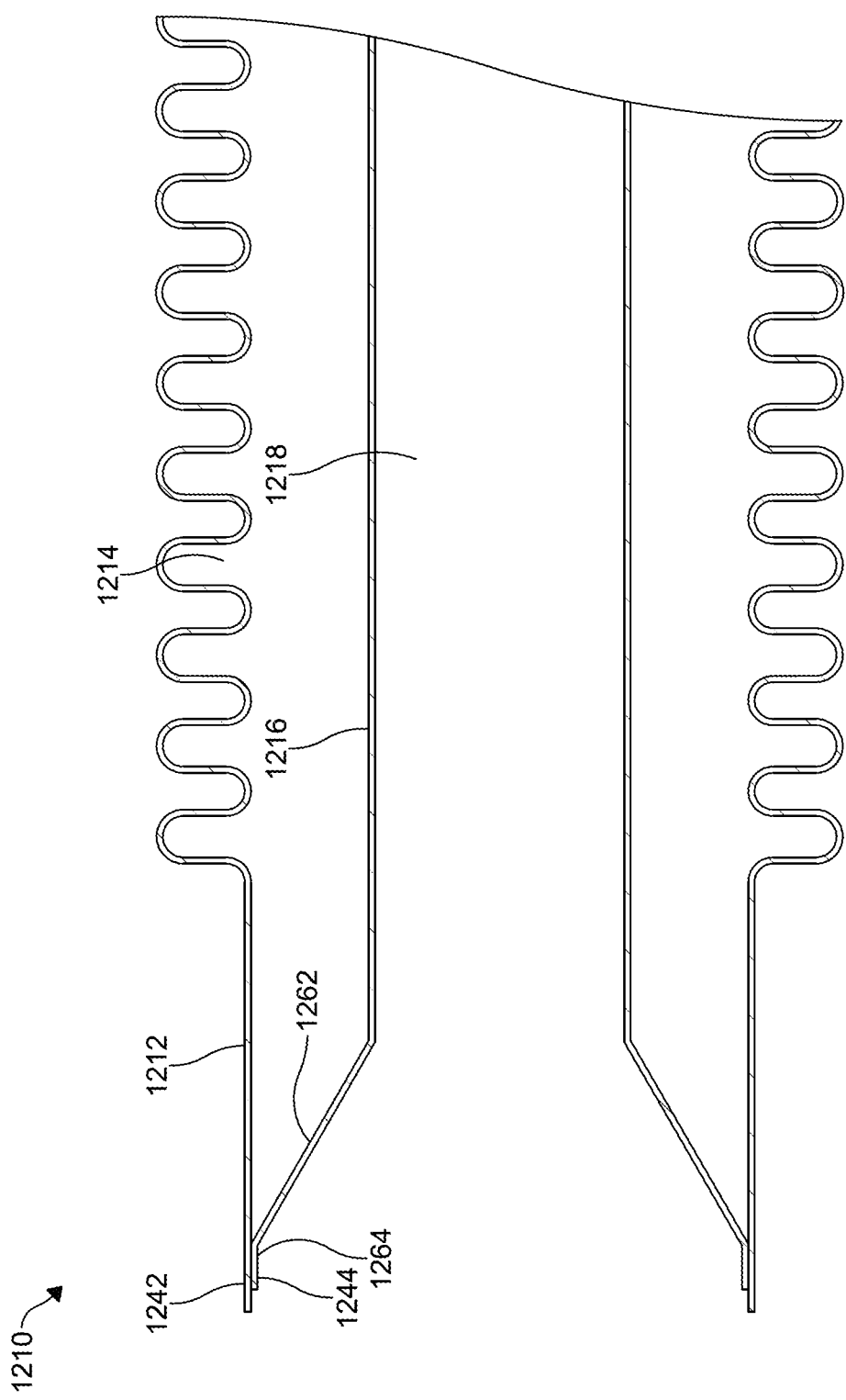

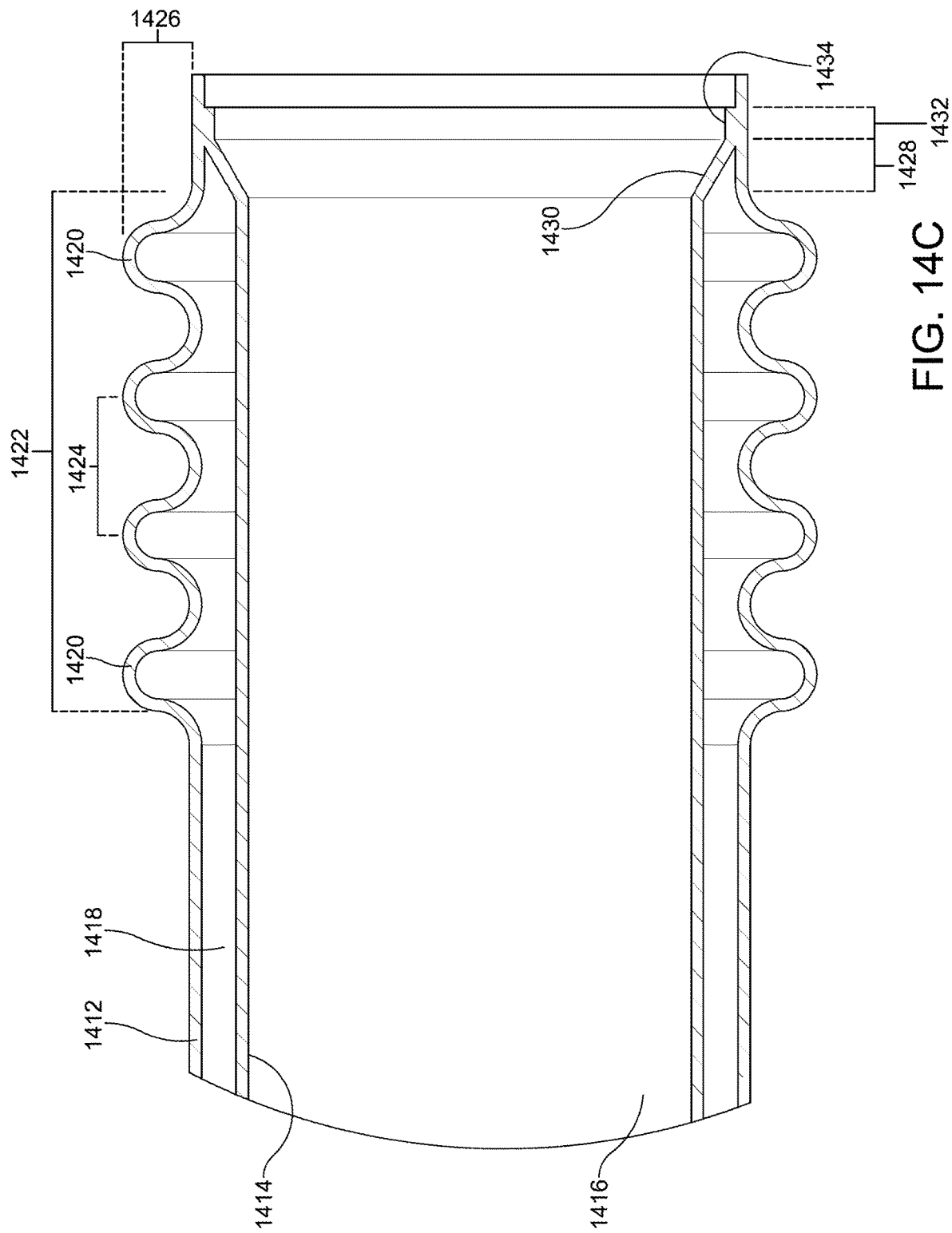

MULTIPLE GEOMETRY AND MULTIPLE MATERIAL INSULATED COMPONENTS

RELATED APPLICATIONS

Cross-Reference to Related Applications

The present application is the National Stage Application of International Patent Application No. PCT/US2018/047974, filed Aug. 24, 2018, which claims priority to and the benefit of U.S. Patent Application No. 62/550,182, "Clamshell Configured Insulators" (filed Aug. 25, 2017); U.S. Patent Application No. 62/550,200, "Flexible Vacuum Insulated Components" (filed Aug. 25, 2017); U.S. Patent Application No. 62/562,543, "Multiple Geometry Insulated Conduits" (filed Sep. 25, 2017); U.S. Patent Application No. 62/567,361, "Insulated Components Comprising Different Thermal Expansion Materials" (filed Oct. 3, 2017); and U.S. Patent Application No. 62/594,180, "Multiple Geometry Insulated Conduits" (filed Dec. 4, 2017). All of the foregoing applications are incorporated by reference herein in their entireties for any and all purposes.

TECHNICAL FIELD

The present disclosure relates to the field of vacuum-insulated articles.

BACKGROUND

A variety of high-performance applications require conduits that possess excellent insulating qualities. These applications, however, required conduits of various shapes, including bent, kinked, and curved conduits. These applications may also require an insulating jacket to be disposed about a component—e.g., a tube—that is not itself insulated. Existing technology, does not provide the ability to fabricate such insulating jackets, particularly jackets that enclose curved or irregularly-shaped lumens. Accordingly, there is a long-felt need in the art for insulating jackets that enclose curved or irregularly-shaped lumens and also for methods of fabricating such jackets.

SUMMARY

In meeting the long-felt needs described above, the present disclosure first provides vacuum-insulated components, comprising: a first arcuate shell sealed to a second arcuate shell, the sealed first and second arcuate shells defining a first tube; a second tube being disposed within the first tube so as to define a sealed insulating space between the first tube and the second tube, the second tube being coaxial with the first tube, the component further comprising a vent defined by first and second walls communicating with the insulating space to provide an exit pathway for gas molecules from the space, the vent being sealable for maintaining a vacuum within the insulating space following evacuation of gas molecules through the vent, the distance between the first and second walls being variable in a portion of the insulating space adjacent the vent such that gas molecules within the insulating space are directed towards the vent by the variable-distance portion of the first and second walls during the evacuation of the insulating space, the directing of the gas molecules by the variable-distance portion of the first and second walls imparting to the gas molecules a greater probability of egress from the insulating space than ingress.

The present disclosure also provides vacuum-insulated components. The components suitably comprise a first arcuate shell sealed to a second arcuate shell so as to define an insulating space therebetween, the sealed first and second arcuate shells defining a first tube, the first arcuate shell comprising a region that extends toward the second arcuate shell, the second arcuate shell comprising a region that extends toward the first arcuate shell, or both; the component further comprising a vent communicating with the insulating space to provide an exit pathway for gas molecules from the space, the vent comprising first and second walls defined by a region of the first arcuate shell that extends toward the second arcuate shell, by a region of the second arcuate shell that extends toward the first arcuate shell, or both, the vent being sealable for maintaining a vacuum within the insulating space following evacuation of gas molecules through the vent, the distance between the first and second walls being variable in a portion of the insulating space adjacent the vent such that gas molecules within the insulating space are directed towards the vent by the variable-distance portion of the first and second walls during the evacuation of the insulating space, the directing of the gas molecules by the variable-distance portion of the first and second walls imparting to the gas molecules a greater probability of egress from the insulating space than ingress.

Additionally provided are methods of fabricating a vacuum-insulated component, comprising: sealing a first arcuate shell to a second arcuate shell so as to define a first tube; disposing a second tube within the first tube so as to define an insulating space between the first and second tubes, the vacuum-insulated component comprising a vent defined by first and second walls communicating with the insulating space to provide an exit pathway for gas molecules from the space, the vent being sealable for maintaining a vacuum within the insulating space following evacuation of gas molecules through the vent, the distance between the first and second walls being variable in a portion of the insulating space adjacent the vent such that gas molecules within the insulating space are directed towards the vent by the variable-distance portion of the first and second walls during the evacuation of the insulating space, the directing of the gas molecules by the variable-distance portion of the first and second walls imparting to the gas molecules a greater probability of egress from the insulating space than ingress; and giving rise to a reduced pressure within the insulating space and sealing the vent so as to maintain the insulating space.

Further provided are methods of fabricating a vacuum-insulated component, comprising: sealing a first arcuate shell to a second arcuate shell so as to define a first tube; disposing a second tube within the first tube so as to define an insulating space between the first and second tubes, the vacuum-insulated component including a vent comprising first and second walls defined by a region of the first arcuate shell that extends toward the second arcuate shell, by a region of the second arcuate shell that extends toward the first arcuate shell, or both, the vent being sealable for maintaining a vacuum within the insulating space following evacuation of gas molecules through the vent, the distance between the first and second walls being variable in a portion of the insulating space adjacent the vent such that gas molecules within the insulating space are directed towards the vent by the variable-distance portion of the first and second walls during the evacuation of the insulating space, the directing of the gas molecules by the variable-distance portion of the first and second walls imparting to the gas molecules a greater probability of egress from the insulating space than ingress; and giving rise to a reduced pressure within the insulating space and sealing the vent so as to maintain the insulating space.

In meeting the described long-felt needs in the art, the present disclosure first provides insulated conduits, comprising: an outer tube, the outer tube comprising an outer tube corrugated section; an inner tube disposed within the outer tube, the inner tube defining a lumen and further comprising an inner tube corrugated section; the inner tube corrugated section and the outer tube corrugated section being at least partially in register with one another, and the inner tube and outer tube defining a sealed insulating region of reduced pressure therebetween.

The present disclosure also provides methods, the methods comprising communicating a fluid through the lumen of the inner tube of an insulated conduit according to the present disclosure.

Also provided are methods, the methods comprising: with an outer tube, the outer tube comprising an outer tube corrugated section, and an inner tube defining a lumen and further comprising an inner tube corrugated section, disposing the inner tube within the outer tube such that there is a space therebetween, the inner tube corrugated section and the outer tube corrugated section being at least partially in register with one another, and sealing the space between the inner tube and outer tube so as to give rise to a sealed insulating region of reduced pressure therebetween.

In meeting the described long-felt needs in the art, the present disclosure first provides insulated conduits, comprising: (a) an outer tube, the outer tube having a distal end and a proximal end, the outer tube further comprising a first corrugated region having a length and comprising a plurality of corrugations extending along the outer tube from the distal end of the outer tube toward the proximal end of the outer tube; an inner tube disposed within the outer tube, the inner tube having a distal end and a proximal end, and the inner tube defining a lumen; the inner tube and outer tube being sealed to one another at a joint, optionally at the distal end of the inner tube, the seal defining a sealed insulating region of reduced pressure between the outer tube and the inner tube, the inner tube and outer tube being sealed to one another such that the length of the first corrugated region of the outer tube increases or decreases in response to a temperature, or (b) an outer tube, the outer tube having a distal end and a proximal end, an inner tube disposed within the outer tube, the inner tube having a distal end and a proximal end, and the inner tube defining a lumen; the inner tube further comprising a first corrugated region having a length and comprising a plurality of corrugations extending along the inner tube from the distal end of the inner tube toward the proximal end of the inner tube; the inner tube and outer tube being sealed to one another at a joint, optionally at the distal end of the outer tube, the seal defining a sealed insulating region of reduced pressure between the outer tube and the inner tube, the inner tube and outer tube being sealed to one another such that the length of the first corrugated region of the inner tube increases or decreases in response to a temperature.

Also provided are methods, the methods comprising communicating a fluid through the lumen of an insulated conduit according to the present disclosure.

Additionally provided are methods, comprising: with (a) an outer tube, the outer tube having a distal end and a proximal end, the outer tube further comprising a first corrugated region having a length and comprising a plurality of corrugations extending along the outer tube from the distal end of the outer tube toward the proximal end of the outer tube, and (b) an inner tube having a distal end and a proximal end, and the inner tube defining a lumen, disposing the inner tube within the outer tube and sealing the inner tube and outer tube to one another at a joint, optionally at the distal end of the inner tube, the seal defining a sealed insulating region of reduced pressure between the outer tube and the inner tube, the inner tube and outer tube being sealed to one another such that the length of the first corrugated region of the outer tube increases or decreases in response to a temperature.

Further provided are methods, comprising: with (a) an outer tube, the outer tube having a distal end and a proximal end, and (b) an inner tube having a distal end and a proximal end, and the inner tube defining a lumen and the inner tube further comprising a first corrugated region having a length and comprising a plurality of corrugations extending along the inner tube from the distal end of the inner tube toward the proximal end of the inner tube, disposing the inner tube within the outer tube and sealing the inner tube and outer tube to one another at a joint, optionally at the distal end of the outer tube, the seal defining a sealed insulating region of reduced pressure between the outer tube and the inner tube, the inner tube and outer tube being sealed to one another such that the length of the first corrugated region of the inner tube increases or decreases in response to a temperature.

In meeting the described long-felt needs, the present disclosure provides insulated conduits, comprising: an outer tube having a first end and an inner tube having a first end, the inner tube defining a lumen, the inner tube being disposed within the outer tube so as to define a insulating space between the first tube and the second tube, the conduit further comprising a vent defined by a sealer ring having a first wall and a second wall, the second wall being disposed opposite the outer tube and the first wall being disposed opposite the inner tube, the sealer ring being disposed between one or both of the first end of the outer tube and the first end of the inner tube and the other tube so as to seal the insulating space to provide an exit pathway for gas molecules from the space, the vent being sealable for maintaining a vacuum within the insulating space following evacuation of gas molecules through the vent, (a) the distance between the second wall of the sealer ring and the outer tube and/or (b) the distance between the first wall of the sealer ring and the and the outer tube being variable in a portion of the insulating space adjacent the vent such that gas molecules within the insulating space are directed towards the vent by the variable-distance portion of the first and second walls during the evacuation of the insulating space, the directing of the gas molecules by the variable-distance portion of the first and second walls imparting to the gas molecules a greater probability of egress from the insulating space than ingress, and the lumen of the inner tube comprising a first major axis at the first end of the inner tube, and the lumen comprising a bend, measured relative to the first major axis of from about 1 to about 180 degrees.

The present disclosure also provides methods, the methods comprising communicating a fluid through an insulated conduit according to the present disclosure.

Also provided are methods, comprising: positioning an inner tube having a first end within an outer tube having a first end, so as to define an insulating space therebetween; positioning a spacer in the insulating space; sealing, to the inner tube and outer tube, a sealer ring having a first wall and a second wall so as to form a vent, the second wall of the sealer ring being disposed opposite the outer tube and the first wall of the sealer ring being disposed opposite the inner tube, the sealer ring being disposed between one or both of the first end of the outer tube and the first end of the inner tube and the other tube so as to seal the insulating space to provide an exit pathway for gas molecules from the space, the vent being sealable for maintaining a vacuum within the insulating space following evacuation of gas molecules through the vent, (a) the distance between the second wall of the sealer ring and the outer tube and/or (b) the distance between the first wall of the sealer ring and the and the outer tube being variable in a portion of the insulating space adjacent the vent such that gas molecules within the insulating space are directed towards the vent by the variable-distance portion of the first and second walls during the evacuation of the insulating space, the directing of the gas molecules by the variable-distance portion of the first and second walls imparting to the gas molecules a greater probability of egress from the insulating space than ingress, and the lumen of the inner tube comprising a first major axis at the first end of the inner tube.

Further provided are insulated conduits, comprising: a corrugated outer tube having a first end; an inner tube having a first end, the inner tube defining a lumen, the inner tube being disposed within the outer tube so as to define a insulating space between the first tube and the second tube, the conduit further comprising a vent defined by a seal between the outer tube and the inner tube, the vent being sealable for maintaining a vacuum within the insulating space following evacuation of gas molecules through the vent, the distance between the inner tube and the outer tube being variable in a portion of the insulating space adjacent the vent such that gas molecules within the insulating space are directed towards the vent by the variable-distance portion, the directing of the gas molecules by the variable-distance portion imparting to the gas molecules a greater probability of egress from the insulating space than ingress, and the lumen of the inner tube comprising a first major axis at the first end of the inner tube, and the lumen comprising a bend, measured relative to the first major axis, of from about 1 to about 180 degrees.

The present disclosure also provides methods, the methods comprising communicating a fluid through an insulated conduit according to the present disclosure.

Further provided are methods, comprising: positioning an inner tube having a first end within a corrugated outer tube having a first end, so as to define an insulating space therebetween; (a) the outer tube comprising a region that converges toward the inner tube, (b) the inner tube comprising a region that diverges toward the outer tube, or both (a) and (b), positioning a spacer in the insulating space; sealing the outer tube and inner tube to one another so as to form a vent, the vent being sealable for maintaining a vacuum within the insulating space following evacuation of gas molecules through the vent, the distance between the inner tube and the outer tube being variable in a portion of the insulating space adjacent the vent such that gas molecules within the insulating space are directed towards the vent by the variable-distance portion, the directing of the gas molecules by the variable-distance portion imparting to the gas molecules a greater probability of egress from the insulating space than ingress, and the lumen of the inner tube comprising a first major axis at the first end of the inner tube, and the lumen of the inner tube comprising a first major axis at the first end of the inner tube, the lumen comprising a bend, measured relative to the first major axis, of from about 1 to about 180 degrees.

Also provided are insulated conduits, comprising: an outer tube having a first end and an inner tube having a first end, the inner tube defining a lumen, the first end of the inner tube and the first end of the outer tube being sealed to one another so as to define a insulating space between the first tube and the second tube, the distance between the inner and outer tubes being variable in a portion of the insulating space, and a vent in communication with the insulating space to provide an exit pathway for gas molecules from the insulating space, the vent located proximate to the variable distance portion of the insulating space such that gas molecules are guided towards the vent during evacuation of the insulating space to facilitate their egress from the insulating space, and the vent being sealable for maintaining a vacuum within the insulating space; the distance between the inner and outer tubes being variable in a portion of the insulating space adjacent the vent such that gas molecules within the insulating space are directed towards the vent by the variable-distance portion, the directing of the gas molecules by the variable-distance portion imparting to the gas molecules a greater probability of egress from the insulating space than ingress, and the lumen of the inner tube comprising a first major axis at the first end of the inner tube, and the lumen comprising a bend, measured relative to the first major axis of from about 1 to about 180 degrees.

Further provided are systems, comprising: (a) an outer tube, the outer tube having a distal end and a proximal end, (b) an inner tube having a distal end and a proximal end, and the inner tube defining a lumen and the inner tube further comprising a first corrugated region having a length and comprising a plurality of corrugations extending along the inner tube from the distal end of the inner tube toward the proximal end of the inner tube, the inner tube being disposed within the outer tube and the inner tube and outer tube being sealed so as to define a sealed insulating region of reduced pressure between the outer tube and the inner tube, the inner tube and outer tube being sealed to one another such that the length of the first corrugated region of the inner tube increases or decreases in response to a temperature.

BRIEF DESCRIPTION OF THE DRAWINGS

The summary, as well as the following detailed description, is further understood when read in conjunction with the appended drawings. For the purpose of illustrating the invention, there are shown in the drawings exemplary embodiments of the invention; however, the invention is not limited to the specific methods, compositions, and devices disclosed. In addition, the drawings are not necessarily drawn to scale. In the drawings:

FIG. 9A provides an exterior view of an insulated conduit according to the present disclosure;

FIG. 9B provides a view along line A-A of the conduit in FIG. 9A;

FIG. 9D provides a view of a bent insulated conduit according to the present disclosure.

FIG. 10B provides a view of an end of an conduit according to the present disclosure;

FIG. 12 provides a cutaway view of a further illustrative embodiment of the disclosed technology;

FIG. 14C provides a further magnified view of the insulated conduit of FIG. 14B;

DETAILED DESCRIPTION OF ILLUSTRATIVE EMBODIMENTS

Figure 1A:
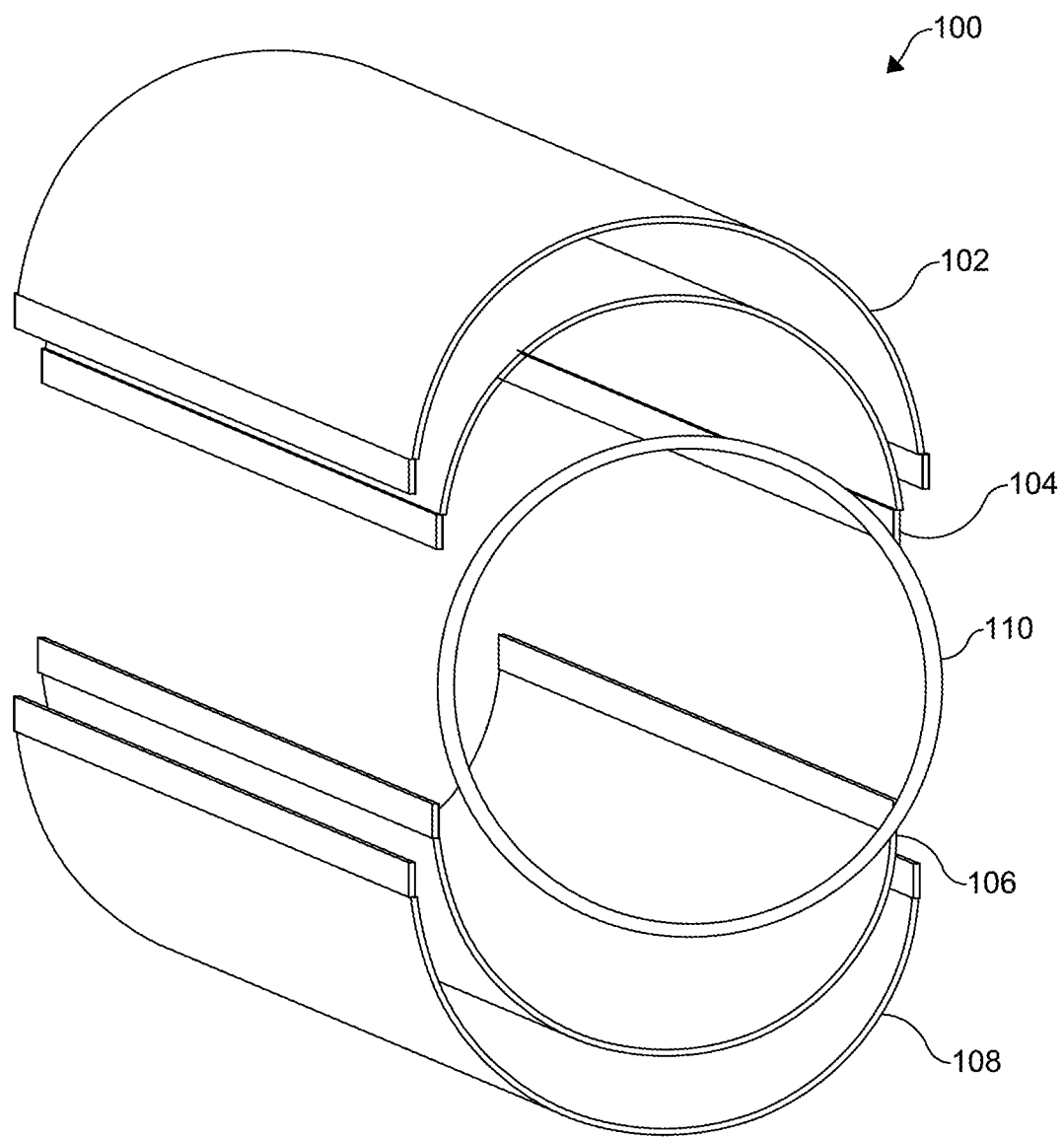
FIG. 1 provides (1A) an exploded view of an insulator according to the present disclosure; and (1B) an assembled view of the insulator of FIG. 1(A)

The present disclosure can be understood more readily by reference to the following detailed description of desired embodiments and the examples included therein.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing. All publications, patent applications, patents and other references mentioned herein are incorporated by reference in their entirety. The materials, methods, and examples disclosed herein are illustrative only and not intended to be limiting.

The singular forms "a," "an," and "the" include plural referents unless the context clearly dictates otherwise.

As used in the specification and in the claims, the term "comprising" can include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any impurities that might result therefrom, and excludes other ingredients/steps.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

Unless indicated to the contrary, the numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values). The endpoints of the ranges and any values disclosed herein are not limited to the precise range or value; they are sufficiently imprecise to include values approximating these ranges and/or values.

Further, the term "comprising" should be understood as having its open-ended meaning of "including," but the term also includes the closed meaning of the term "consisting." For example, a composition that comprises components A and B can be a composition that includes A, B, and other components, but can also be a composition made of A and B only. Any documents cited herein are incorporated by reference in their entireties for any and all purposes. Where provided, steps can be performed in any order.

A sealed and/or evacuated space (also termed insulating space) can be evacuated, e.g., a vacuum space. Some exemplary vacuum-insulated structures (and related techniques for forming and using such structures) can be found in United States published patent applications 2015/0110548, 2014/0090737, 2012/0090817, 2011/0264084, 2008/0121642, and 2005/0211711 and/or U.S. patent application Ser. Nos. 14/953,756, 15/254,304, 15/238,961, 15/337,102, 15/448,964, PCT/US2017/020651, and 15/494,943, all by A. Reid, and all incorporated herein by reference in their entireties for any and all purposes.

As explained in U.S. Pat. Nos. 7,681,299 and 7,374,063 (incorporated herein by reference in their entireties for any and all purposes), the geometry of the insulating space can be such that it guides gas molecules within the space toward a vent or other exit from the space. The width of the vacuum insulating space need not be not uniform throughout the length of the space. The space can include an angled portion such that one surface that defines the space converges toward another surface that defines the space. As a result, the distance separating the surfaces can vary adjacent the vent such the distance is at a minimum adjacent the location at which the vent communicates with the vacuum space. The interaction between gas molecules and the variable-distance portion during conditions of low molecule concentration serves to direct the gas molecules toward the vent.

The molecule-guiding geometry of the space provides for a deeper vacuum to be sealed within the space than that which is imposed on the exterior of the structure to evacuate the space. This somewhat counterintuitive result of deeper vacuum within the space is achieved because the geometry of the present invention significantly increases the probability that a gas molecule will leave the space rather than enter. In effect, the geometry of the insulating space functions like a check valve to facilitate free passage of gas molecules in one direction (via the exit pathway defined by vent) while blocking passage in the opposite direction.

Another benefit associated with the deeper vacuums provided by the geometry of insulating space is that it is achievable without the need for a getter material within the evacuated space. The ability to develop such deep vacuums without a getter material provides for deeper vacuums in devices of miniature scale and devices having insulating spaces of narrow width where space constraints would limit the use of a getter material.

Other vacuum-enhancing features can also be included, such as low-emissivity coatings on the surfaces that define the vacuum space. The reflective surfaces of such coatings, generally known in the art, tend to reflect heat-transferring rays of radiant energy. Limiting passage of the radiant energy through the coated surface enhances the insulating effect of the vacuum space.

In some embodiments, an article can comprise first and second walls spaced at a distance to define an insulating space therebetween and a vent communicating with the insulating space to provide an exit pathway for gas molecules from the insulating space. The vent is sealable for maintaining a vacuum within the insulating space following evacuation of gas molecules through the vent. The distance between the first and second walls is variable in a portion of the insulating space adjacent the vent such that gas molecules within the insulating space are directed towards the vent during evacuation of the insulating space. The direction of the gas molecules towards the vent imparts to the gas molecules a greater probability of egress than ingress with respect to the insulating space, thereby providing a deeper vacuum without requiring a getter material in the insulating space.

The construction of structures having gas molecule guiding geometry according to the present invention is not limited to any particular category of materials. Suitable materials for forming structures incorporating insulating spaces according to the present invention include, for example, metals, ceramics, metalloids, or combinations thereof.

The convergence of the space provides guidance of molecules in the following manner. When the gas molecule concentration becomes sufficiently low during evacuation of the space such that structure geometry becomes a first order effect, the converging walls of the variable distance portion of the space channel gas molecules in the space toward the vent. The geometry of the converging wall portion of the vacuum space functions like a check valve or diode because the probability that a gas molecule will leave the space, rather than enter, is greatly increased.

The effect that the molecule-guiding geometry of structure has on the relative probabilities of molecule egress versus entry can be understood by analogizing the converging-wall portion of the vacuum space to a funnel that is confronting a flow of particles. Depending on the orientation of the funnel with respect to the particle flow, the number of particles passing through the funnel would vary greatly. It is clear that a greater number of particles will pass through the funnel when the funnel is oriented such that the particle flow first contacts the converging surfaces of the funnel inlet rather than the funnel outlet.

Various examples of devices incorporating a converging wall exit geometry for an insulating space to guide gas particles from the space like a funnel are provided herein. It should be understood that the gas guiding geometry of the invention is not limited to a converging-wall funneling construction and can, instead, utilize other forms of gas molecule guiding geometries.

DRAWINGS

The following description provides details concerning the attached drawings. The attached drawings are illustrative only and do not serve to limit the scope of the present disclosure or the attached claims.

FIG. 1A provides an exemplary embodiment of the disclosed insulators. As shown, a component can comprise first shell 102, which shell can be sealed to second shell 108. Shells 102 and 108 can be formed of the same or different materials. As shown, first shell 102 and second shell 108 can be semicircular in profile, but this is not a requirement.

A shell can be semicircular, but can also be of some other conical section, e.g., oval or otherwise. A shell can also be polygonal, in some embodiments. A shell can have a continuously curved profile (e.g., a profile that has a constant radius of curvature), but this is not a requirement. A shell can also have a non-constant radius of curvature.

In some embodiments, a shell can be circular in cross-section. It is not a requirement that a shell be semicircular; a shell can have an arc of 180 degrees, but can also have an arc between about 1 and about 359 degrees, or from about 5 to about 355 degrees, or from about 15 to about 340 degrees, or from about 30 degrees to about 330 degrees, or from about 60 degrees to about 300 degrees, or from about 90 degrees to about 270 degrees, or from about 120 degrees to about 240 degrees, or from about 150 degrees to 210 degrees, or even 180 degrees.

A shell suitably comprises a metal or mixture of metals, e.g., aluminum, steel, iron, or stainless steel. Stainless steel is considered especially suitable.

Figure 1B:
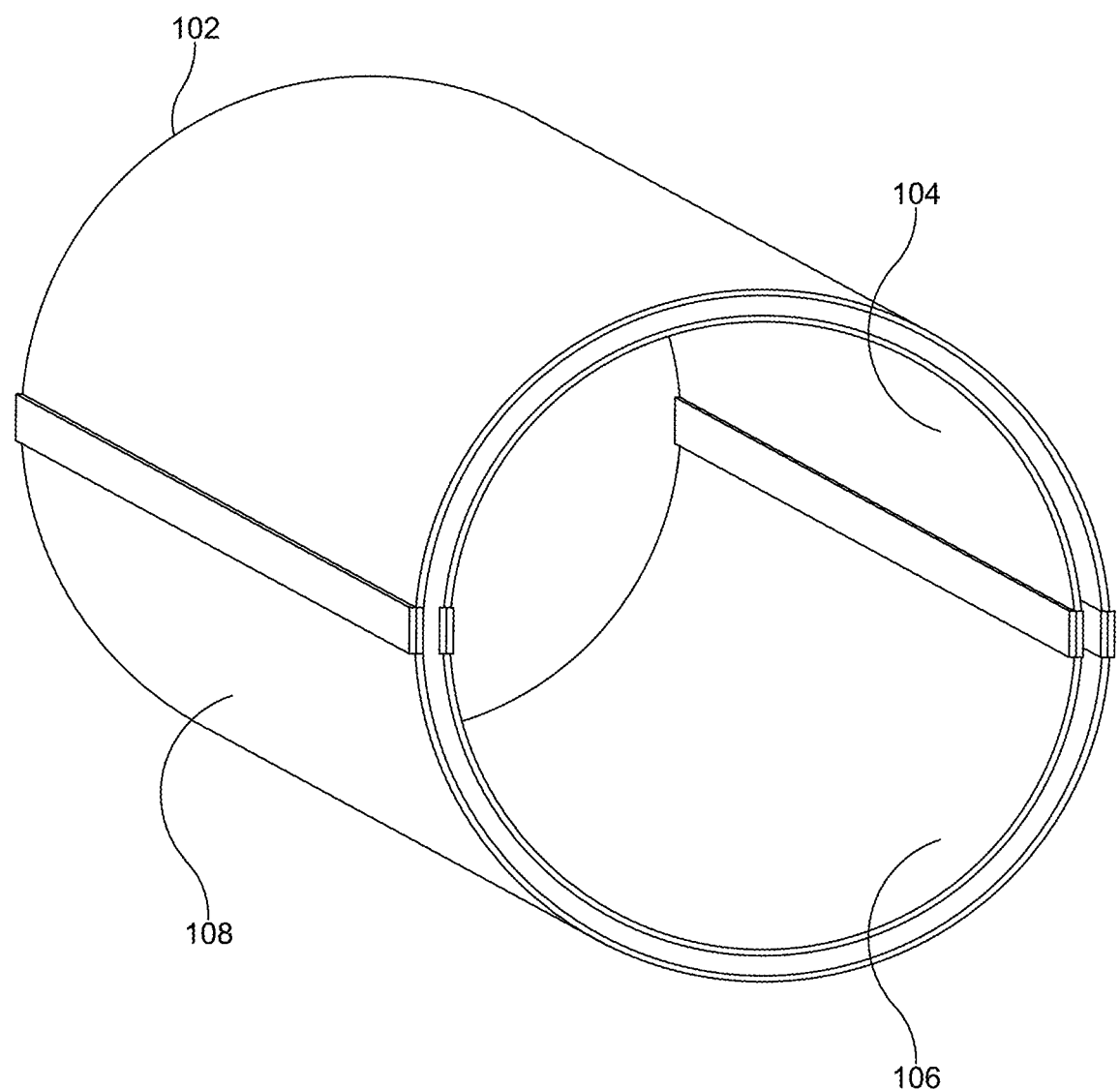

First shell 102 and second shell 108 can be sealed to one another via welding, brazing, or other techniques known to those of skill in the art. As one example—and as shown in FIG. 1A—a shell can have a flange, e.g., a planar or flattened portion along one edge, which flattened portion can be sealed to a flange (e.g., flattened portion) of another shell, as shown in FIG. 1B, discussed below.

A flange can include a flat or near-flat region, but can also include a curved region, slot, tab, notch, or other feature that can engage with another shell or the flange of another shell. The flange (not labeled) of first shell 102 in FIG. 1A includes a flat region that engages and is sealed to a flat region of a flange (not labeled) of second shell 108.

As shown in FIG. 1A, an insulator according to the present disclosure can comprise third shell 104 and fourth shell 106. Third shell 104 and fourth shell 108 can be of shape and/or material similar or identical to first shell 102 and second shell 108. When assembled, third shell 104 and fourth shell 106 can form a tube or other form that fits within the assembly of first shell 102 and second shell 108.

A tube can include a single lumen, but can also include two or more lumens. Similarly, it should be understood that an outer shell can contain within it one, two, or more tubes.

As one example, first shell 102 and second shell 108 in FIG. 1 enclose the tube formed from third shell 104 and fourth shell 106, but first shell 102 and second shell 108 can also enclose one, two or more tubes. As one example, an outer shell can be disposed so as to contain—and also insulate—two tubes disposed within. This arrangement can be especially useful for heat-exchange applications, e.g., those that feature counter-current fluid in adjacent tubes.

A spacer 110 can be used to maintain a spacing between the first and second shells and the third and fourth shells. In some suitable embodiments, first shell 102 and second shell 108 are sealed together and third shell 104 and fourth shell 106 are sealed together so as to form two concentric tubes. The ends of the tubes can in turn be sealed together so as to give rise to a sealed volume disposed between the two concentric tubes. The spacer can be present at the end of a tube, but can also be disposed at a position along the intermediate length of a tube.

The sealed volume can—as described elsewhere herein—contain a reduced pressure, e.g., a pressure less than ambient pressure. The reduced pressure can be at a pressure of, e.g., from less than about 760 Torr to about $1 \times 10^{-7}$ Torr. Pressures of about $10^{-1}$, $10^{-2}$, $10^{-3}$, $10^{-4}$, $10^{-5}$, $10^{-6}$, and about $10^{-7}$ Torr are all considered suitable.

FIG. 1B provides a view of the component of FIG. 1A in assembled form. As shown, first shell 102 and second shell 108 are sealed together along their edges. Third shell 104 and fourth shell 106 are, likewise, sealed together along their edges. The resultant article comprises the concentric tubes formed by the sealed shells. A sealed region of reduced pressure (not labeled in FIG. 1B) exists between the inner and outer tubes. As shown, the sealed tubes together define a lumen that is straight in shape. The sealed region of reduced pressure can include one or more vents as described elsewhere herein, which vents can facilitate the formation and maintenance of the reduced pressure within the region between the tubes.

Figure 2:
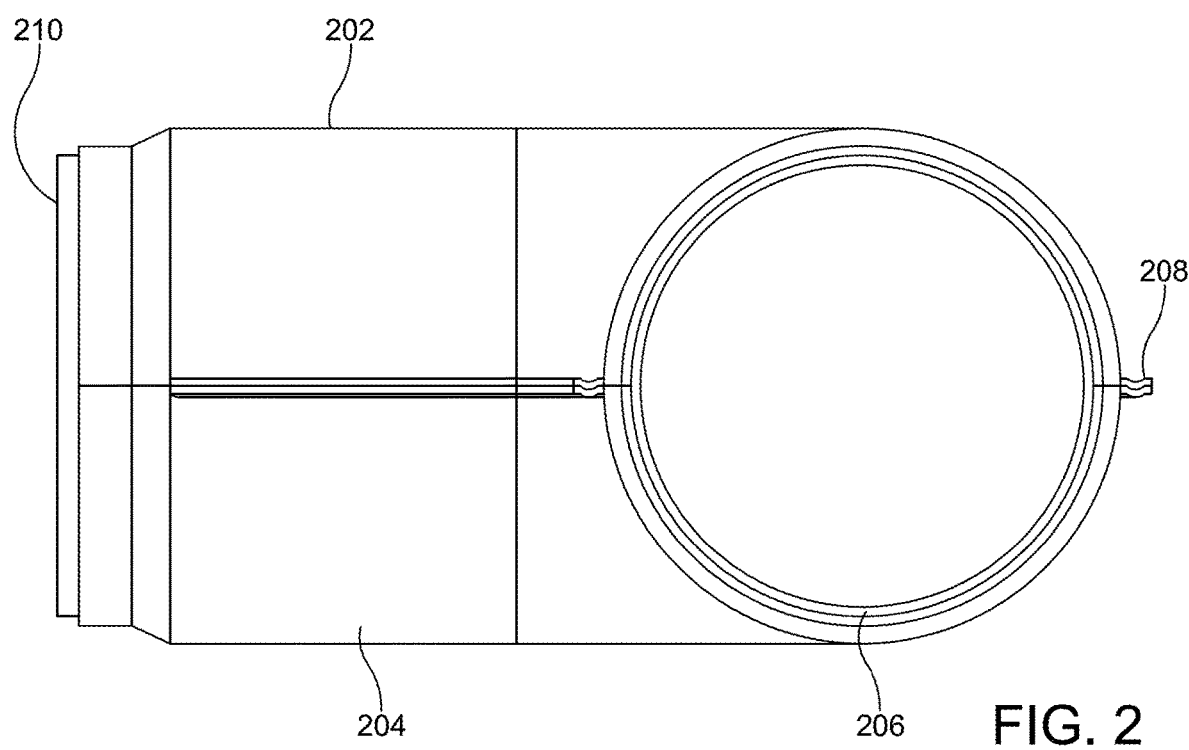
FIG. 2 provides an end view of an assembled insulator according to the present disclosure.

FIG. 2 provides an alternative article according to the present disclosure, which article comprises an assembly having a lumen that is bent at 90 degrees in an elbow-shaped shape. The component comprises an outer tube or jacket, which jacket is formed from first shell 202 and second shell 204.

As shown, the first and second shells can be sealed together. The sealing can take place at a region 208 defined by an interface between the first and second shells. The first and second shells can each comprise a flange or other extension, which flanges can be sealed together at region 208. As shown at region 208, flanges can include grooves (e.g., v-shaped grooves) that engage with one another to assist in the engagement between the two shells.

As shown in FIG. 2, the flange of a shell can be flat or can also include a ridge, slot, or other feature which can mate or otherwise engage with a complementary feature of another shell. The article can also include an inner tube 206, which tube can have opening 210. The inner tube 206 can be straight, bent, or otherwise kinked.

It should be understood that a tube can have a constant radius of curvature, but can also have a variable radius of curvature. The curvature of a tube can be smooth or can be sharp; as one example, a tube can include a bend of 90 degrees and a corner.

First shell 202 and second shell 204 can be shaped such that they fit over the inner tube 206, leaving a space therebetween, which space can be sealed. The sealed space (not labeled) between the jacket and inner tube can comprise a reduced pressure within, as described elsewhere herein.

It should be understood that a component can be curved at 90 degrees, like an elbow, but can also be curved in other ways. A component can include a bend that is greater or lesser than 90 degrees in angle. A component can include multiple curves or undulations. A component can have a constant cross-section along the length of the component, but a component can also have a cross-section that varies along the length of the component. A component—or a tube of the component—can comprise bends in one, two, or more planes.

For example, a component can comprise a first region having a first exterior diameter, and can then comprise a second region that is turned at 45 degrees relative to the first region and that has an exterior diameter that is less than the first exterior diameter.

Figure 3:
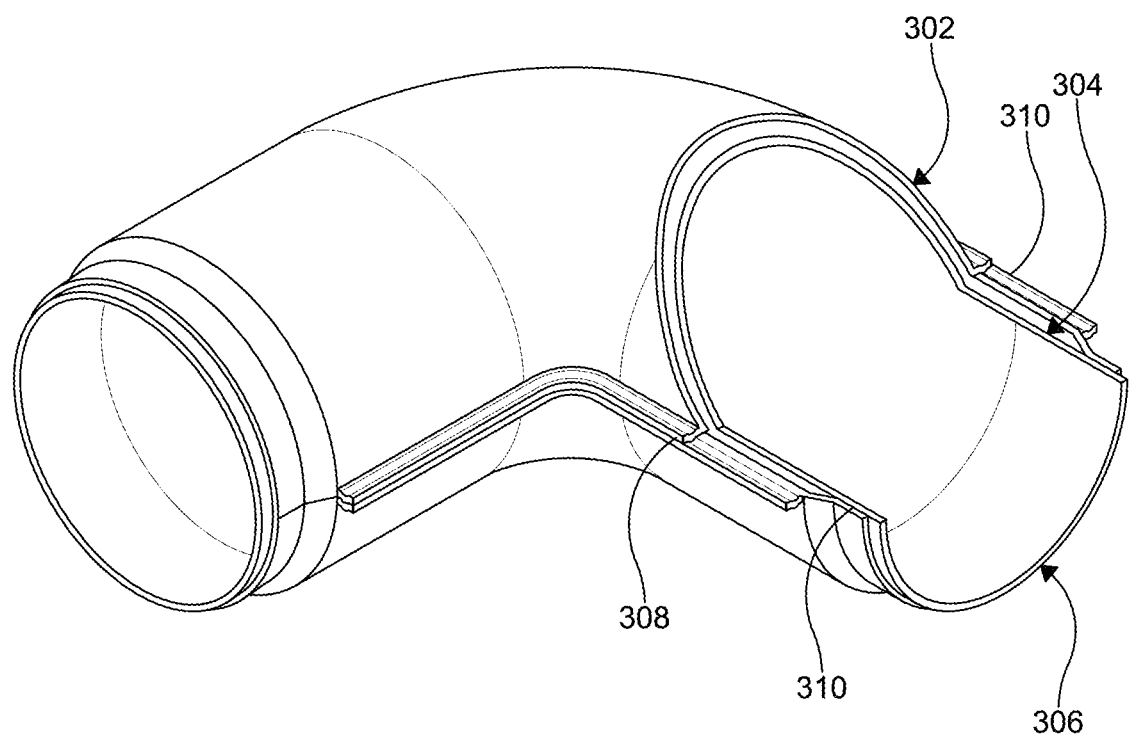
FIG. 3 provides an alternative view of an elbow-shaped insulator according to the present disclosure.

FIG. 3 provides an alternative view of an elbow-shaped component. As shown in FIG. 3, a component's jacket can be formed from first shell 302 and second shell 308. The first and second shells can be sealed at their flanges along region 310. As shown in the figure, the ends of the first and second shells can be shaped so as to form a vent 310, which vent is shaped so as to encourage the formation of a comparatively deep vacuum space 304 between the jacket and inner tube 306.

Figure 4:
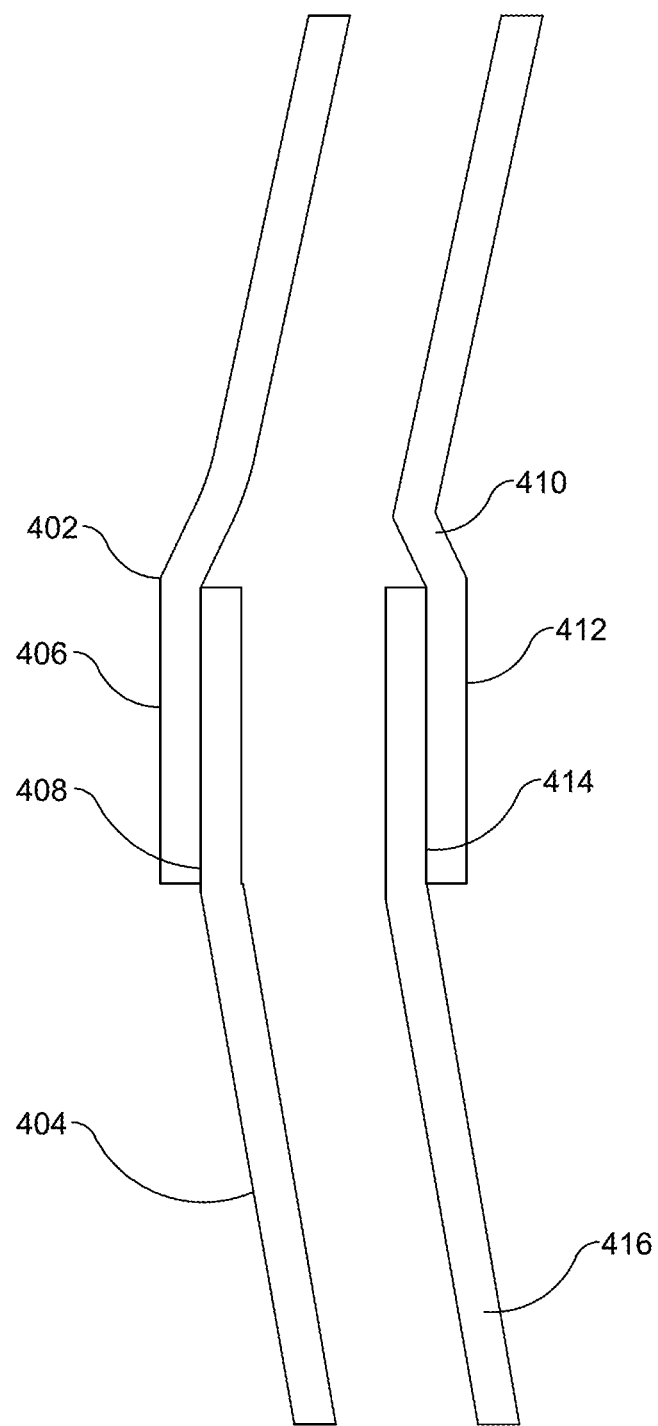
FIG. 4 provides a cutaway view of an exemplary joint between clamshells.

FIG. 4 provides a cutaway view of the union of exemplar shells. As shown in the figure, first shell 402 includes an engagement region 406, which region can be a flange, e.g., a planar flange. Second shell 404 can include an engagement region 408. The engagement regions 406 and 408 can be sealed to one another. First shell 402 and second shell 404 can, as described elsewhere herein, be sealed together to form an outer jacket.

Third shell 410 can comprise an engagement region 412, which engagement region 412 can be sealed to engagement region 414 of fourth shell 416. In this way, the third and fourth shells can form an inner tube, which tube is separated by a distance from the jacket formed by the first and second shells.

As shown in FIG. 4, second shell 404 and fourth shell 416 are closest to one another. This is not a requirement, as second shell 404 can be closest to third shell 410, in some embodiments. In other embodiments, fourth shell 416 can be closes to second shell 404.

It should also be understood that the inner and outer tubes of a component can each be formed from the same sheet of material. For example, a single sheet can be rolled lengthwise and the edges of the sheet are then sealed to one another. In one embodiment, a jacket is formed in this way around an internal tube that is enclosed with the jacket. The jacket-forming sheet can include one or more flanges, planar regions, ridges, tabs, slots, or other features to facilitate sealing edges to one another. Likewise, the tube or tubes contained within the outer jacket can be formed in a similar manner.

Figure 5:
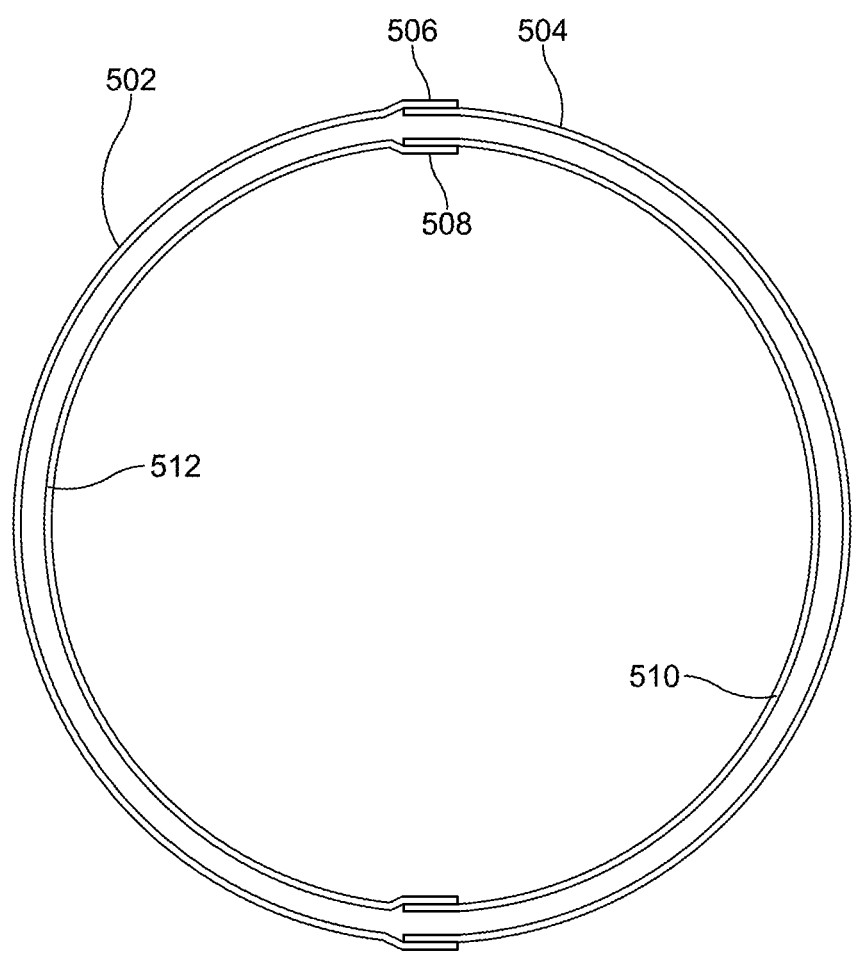
FIG. 5 provides a cutaway view of an assembled insulator according to the present disclosure.

FIG. 5 provides a cutaway view of the component shown in FIG. 4. As shown in FIG. 5, engagement region 506 of first shell 502 is sealed to an engagement region of second shell 504, so as to form an outer jacket. Third shell 512 and fourth shell 510 are sealed together at engagement region 508, which region can be formed from the overlap of portions of the shells.

Figure 6:
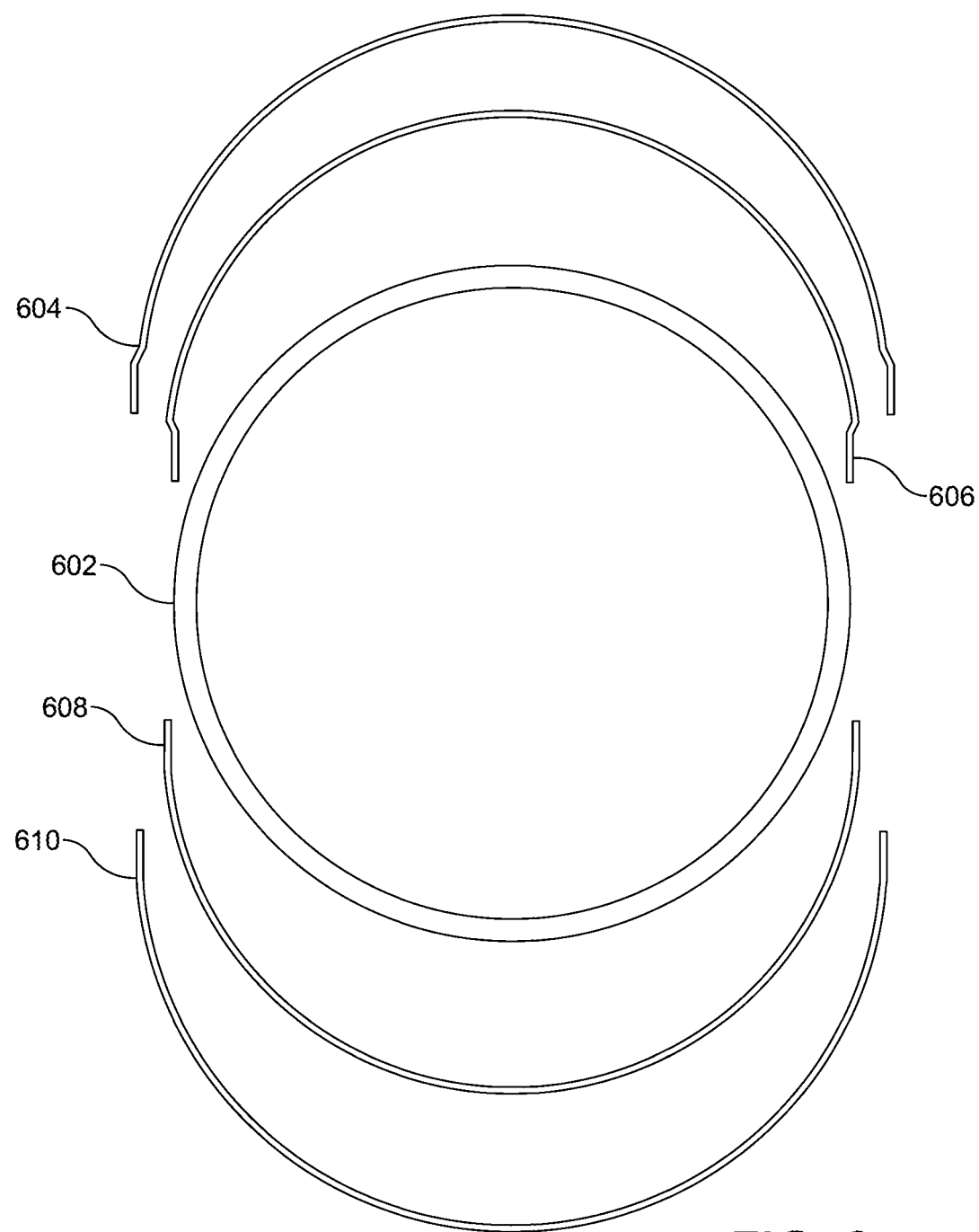
FIG. 6 provides an exploded view of the insulator of FIG. 5.

FIG. 6 provides an exploded view of an exemplary component. As shown, first shell 604 can be sealed to second shell 610, and third shell 606 can be sealed to fourth shell 608. A spacer 602 can be used to maintain a spacing between the tubes formed by the union of the first and second shells and the third and fourth shells. The spacer can remain in place or can be removed or otherwise disintegrated as needed.

Figure 7:
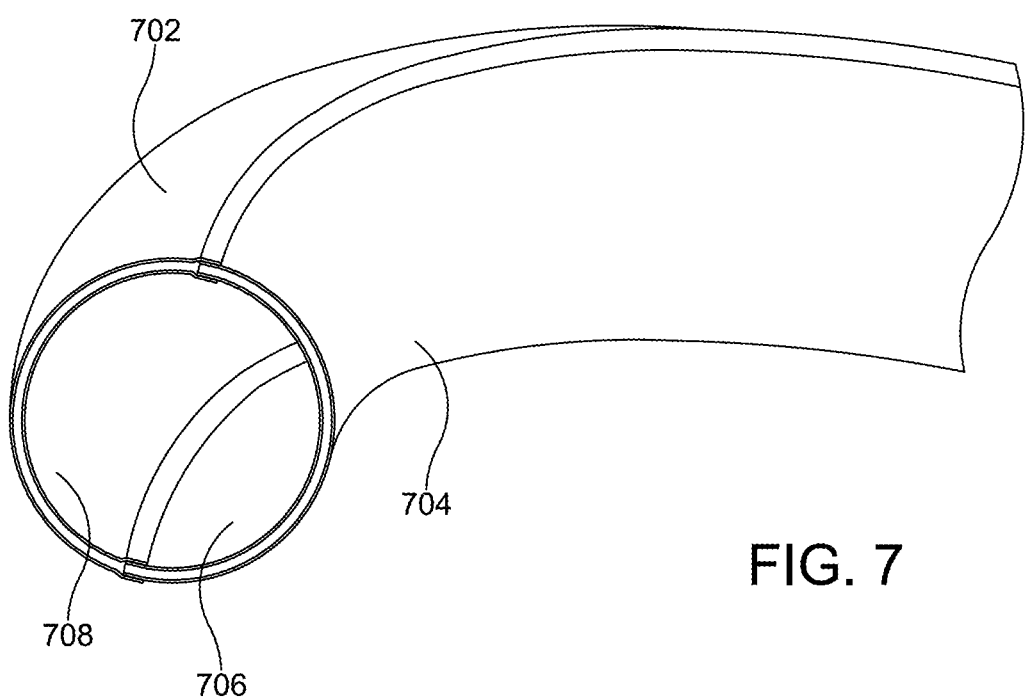
FIG. 7 provides a view of an elbow-shaped insulator according to the present disclosure.

FIG. 7 provides a curved component according to the present disclosure. As shown in the figure, first shell 702 is sealed to second shell 704 so as to form an outer jacket. Inner tube 706 is disposed within the jacket. Inner tube 706 can be curved, thus giving rise to a curved lumen 708. As described elsewhere herein, the disclosed technology allows for non-straight, insulated lumen components.

Figure 8:
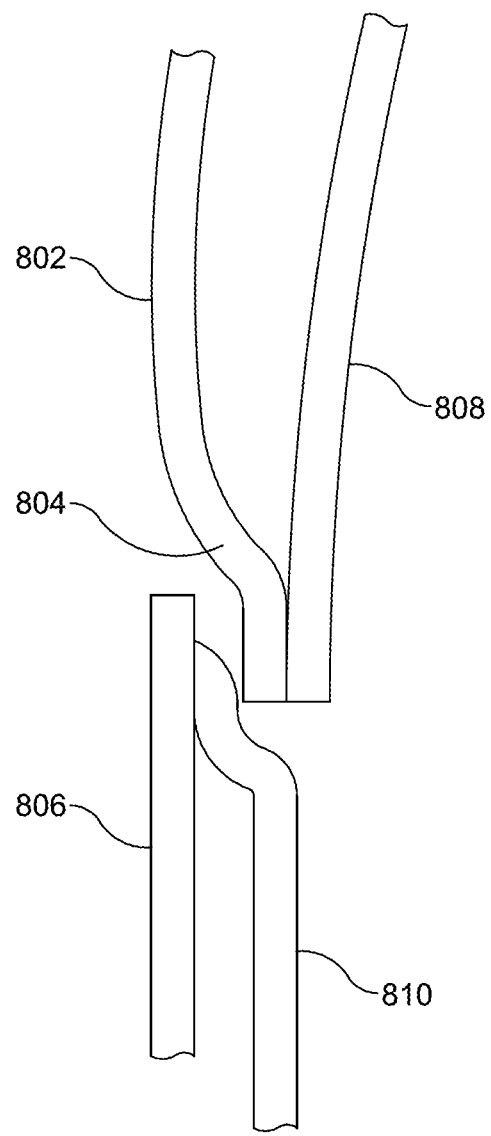
FIG. 8 provides a cutaway view of an exemplary joint between clamshells according to the present disclosure.

FIG. 8 provides a view of an exemplary seal between shells. As shown in the figure, first shell 802 can include a region 804 that diverges from the shell. The region 804 can be tapered or otherwise configured to extend toward another shell. As shown in the figure, region 804 can extend toward a region of a second shell 808 so as to form a tapered vent, which vent encourages the formation of a reduced pressure in the space sealed by the vent.

Region 810 (which can be part of second shell 808 or part of yet another shell) can extend toward a region 806 of another shell (which can be part of first shell 802 but can also be part of another shell). This can give rise to a second vent between regions 806 and 810, which vent encourages the formation of a reduced pressure in the space sealed by the vent.

In this way, one can give rise to an article with an insulated, non-straight lumen or other hollow space disposed within.

FIG. 9A provides an exterior view of an insulated conduit 900 according to the present disclosure. As shown, insulated conduit 900 can have end regions 990 and 992 that are cylindrical and can also be smooth (or at least corrugation-free) in profile. The insulated conduit can also include a central region 993 that includes a plurality of corrugations, as shown.

Figure 9C:
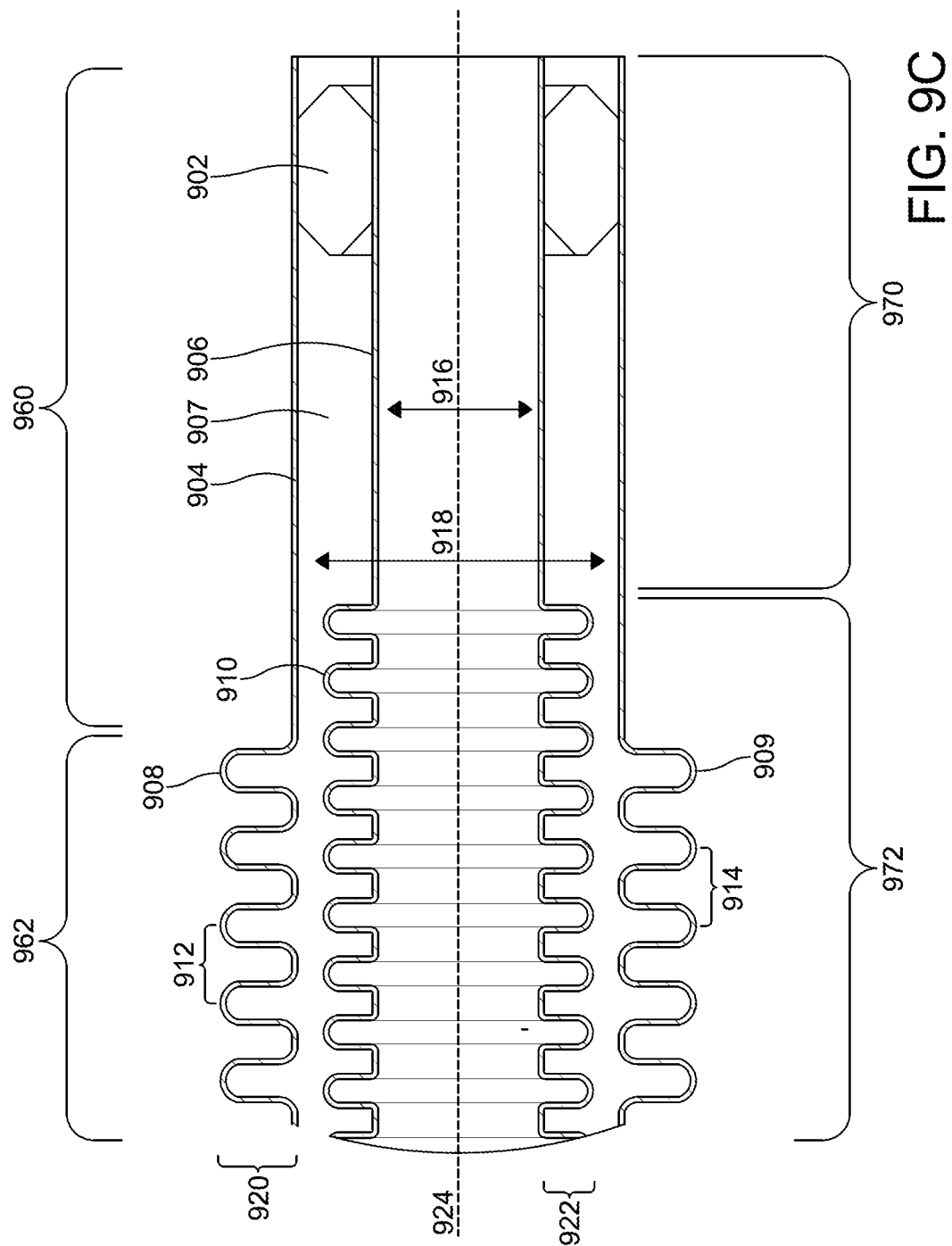
FIG. 9C provides a cutaway view of the encircled region of FIG. 9B.

FIG. 9B provides a view along line A-A in FIG. 9A, which view shows the interior profile of corrugations of the inner tube (not labeled) and outer tube (not labeled) of insulated conduit 900. The insulated conduit can also include one or more fittings (not labeled, but shown in FIG. 9C) disposed between the inner and outer tubes.

FIG. 9C provides further detail of the encircled area of FIG. 9B. As shown in FIG. 9C, an insulated conduit can include outer tube 904 and inner tube 906, which define therebetween a sealed insulating region 907. The conduit can also include spacer 902, which spacer can act to support insulating region 907. The spacer can also act to seal the insulating region 907. It should be understood that spacer 902 is optional, as in some embodiments outer tube 904 and inner tube are sealed directly to one another. In other embodiments, the insulated conduit can include a spacer and also have outer rube 904 and inner tube 906 sealed to one another. By reference to FIG. 9C, a spacer can be disposed between the corrugated regions of the inner and outer tubes and a location where the inner and outer tubes are sealed to one another.

The outer tube can include a non-corrugated region 960 and a corrugated region 962. The non-corrugated region 960 can define an internal diameter 918. Internal diameter 918 will depend on the needs of the user and can be, e.g., 0.1 to 10 cm and all intermediate values, in some embodiments. Outer tube 904 and inner tube 906 can be formed of one or more metals or metal alloys, e.g., stainless steel. It is not a requirement that inner tube 906 and outer tube 904 be formed of the same material.

Corrugated region 962 of the outer tube 904 can include a plurality of corrugations, as shown by outer tube corrugation 908. An outer tube corrugation can be arched, but can also have a triangular or be otherwise polygonal in profile. Outer tube corrugations can be separated by outer tube corrugation pitch distance 912 (which can also be termed "period"), which can be the distance between the highest points on two adjacent corrugations. The pitch distance 912 can depend on the needs of the user. In some embodiments, the pitch distance is, e.g., from about 0.1 to about 3 cm, and all intermediate values. (The foregoing values are exemplary only and do not limit the pitch values.)

The corrugations of the outer tube can also define outer tube corrugation height 920, which is measured as the distance between the innermost and outermost (measured radially outward from the outer tube) points on a corrugation 908. In some non-limiting embodiments, the corrugation height can be, e.g., 0.1 to about 5 or even 10 cm. The outer tube corrugations can suitably all have the same height, although this is not a requirement, as different regions of the outer tube can have corrugations of different heights.

Inner tube 906 can define a non-corrugated region 970 and a corrugated region 972. Non-corrugated region 970 can define an internal diameter 916; inner tube 906 can also define a lumen (not labeled). The internal diameter will depend on the user's needs and can be, e.g., from about 0.1 cm to about 5 or even about 10 cm. Corrugated region 972 of inner tube 906 can comprise a plurality of corrugations 909. An inner tube corrugation can be arched, but can also have a triangular or be otherwise polygonal in profile. Inner tube corrugations can be separated by outer tube corrugation pitch distance 914, which can be the distance between the highest points on two adjacent corrugations. The pitch distance 914 can depend on the needs of the user. In some embodiments, the pitch distance is, e.g., from about 0.1 to about 3 cm, and all intermediate values. (The foregoing values are exemplary only and do not limit the pitch values.) Inner tube corrugation pitch distance 914 can be greater than, equal to, or less than outer tube corrugation pitch distance 912.

The corrugations of the inner tube can also define outer tube corrugation height 922, which is measured as the distance between the innermost and outermost (measured radially outward from the outer tube) points on a corrugation 909. In some non-limiting embodiments, the corrugation height can be, e.g., 0.1 to about 5 or even 10 cm. The inner tube corrugations can suitably all have the same height, although this is not a requirement, as different regions of the inner tube can have corrugations of different heights. Inner tube 906 can also define axial centerline 924. (The axial centerline of the inner tube 906 is in some embodiments suitably coincident or nearly coincident with the axial centerline of the outer tube 904, although this is not a requirement.)

The height and pitch of the inner tube corrugations and outer tube corrugations can be selected such that the insulating region 907 persists when the conduit is bent, e.g., such that there is no contact between the inner tube/inner tube corrugations and the outer tube/outer tube corrugations.

FIG. 9D provides a cutaway view of a bent insulated conduit according to the present disclosure. As shown, the bent insulated conduit includes first region 936 and second region 934; the bend can be optionally enclosed by shell 938. First region 936 defines a first centerline 928, which is defined along the axial center of the inner tube (not labeled) of the first region 936. Second region 934 defines a second centerline 930, which is defined along the axial center of the inner tube (not labeled) of the second region 934. As shown in the figure, first centerline 928 and second centerline 930 define an angle θ, which angle can represent the degree of bending.

As discussed, the corrugations of the insulated conduits can allow for bending of the conduit, e.g., without loss of the insulating capabilities of the conduit derived from the sealed insulating region. In some embodiments, the corrugations also allow for the corrugated tube (inner tube, outer tube) to be extended, e.g., in an extending telescoping manner. In this way, a tube can be extended so as to reduce the diameter of the tube as the tube's radially-extending corrugations are extended in the tube's axial direction, thus reducing the corrugations' height and increasing their pitch. This can be done to, e.g., allow for insertion of the tube through a comparatively small opening. The corrugated tube can also be shortened (e.g., in a shortening or retracting telescoping manner) as well. This allows for re-expansion of a tube if desired. For example, once a tube has been inserted through a comparatively small opening, the tube can be shortened and thus re-expanded so as to return the corrugations to their original heights and pitch.

Angle θ can be in the range of, e.g., from about 0 to about 90 degrees, e.g., 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or even 90 degrees. Angle θ can even, in some embodiments, be greater than 90 degrees, e.g., 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, or even 180 degrees. The bending in an insulated conduit according to the present disclosure can be a bend having a constant radius along the bend. The bending can also be, however, a bend that has a changing radius along the bend. An insulated conduit according to the present disclosure can include 0, 1, 2, 3, or even more bends along the length of the conduit.

Figure 10A:
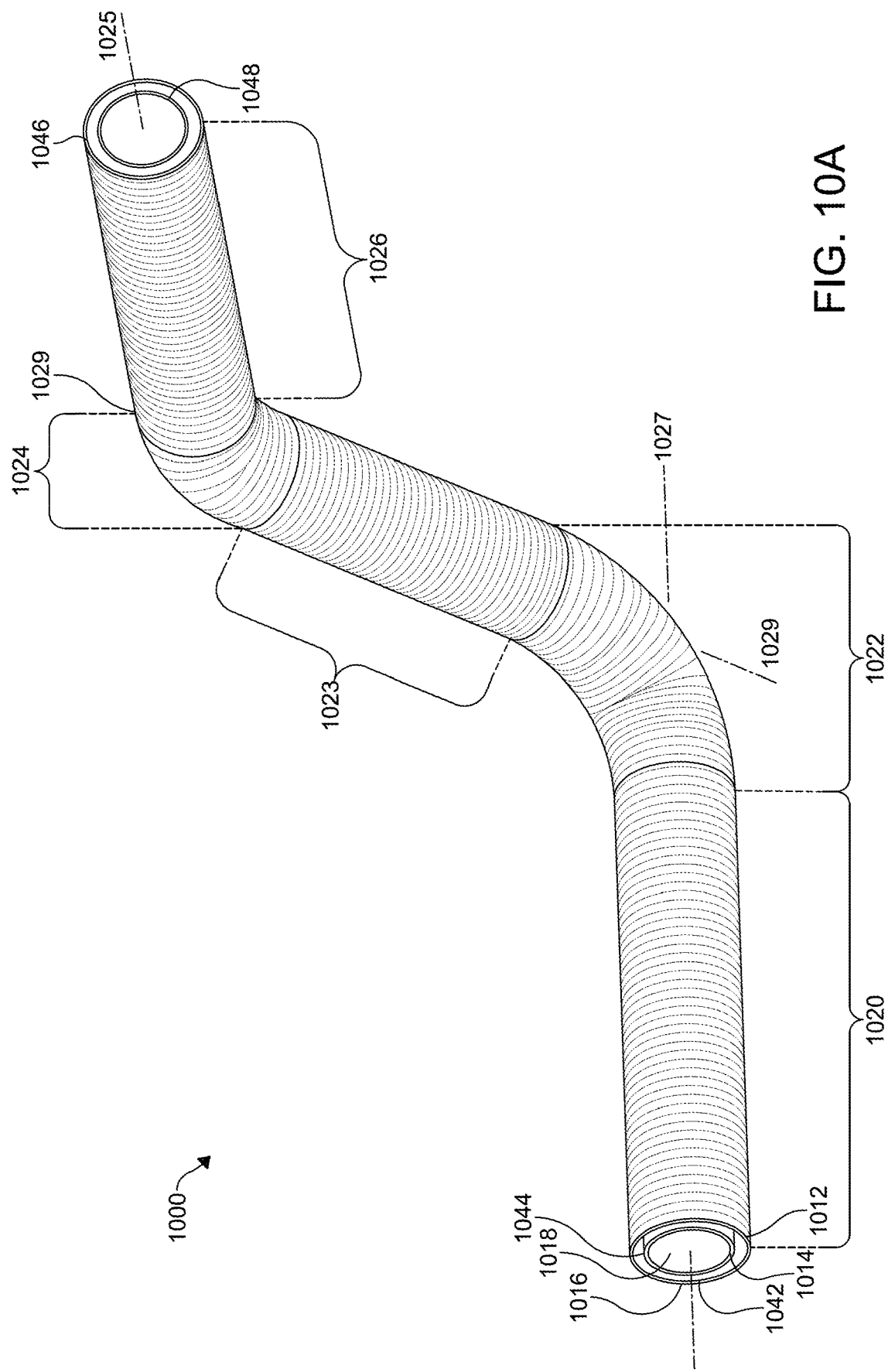
FIG. 10A provides an exterior view of a conduit according to the present disclosure.

As shown in FIG. 10A, a conduit 1000 can comprise an inner tube 1016 and an outer wall 1012, between which is defined an insulating space 1014. The inner tube 12 can enclose lumen 1018. As shown, article 1000 can include straight portions, bent portions, or both. (One or both of inner tube 1016 and outer tube 1012 can be present as a tube.) Inner tube 1016 can have a first end 1044, and outer tube 12 can have a first end 42. The inner tube can suitably be formed of a single piece, and the outer tube can be suitably formed of a single piece.

In exemplary FIG. 10A, conduit 1000 can include a straight region 1020. A straight region can transition to a curved region, e.g., curved region 1022. A curved region can comprise a curvature of constant radius, but can also comprise a curvature of non-constant radius. A curved region can transition to another curved region or to a straight region; as shown in FIG. 10A, curved region 1022 can transition to a straight region 1023, which straight region can transition to another curved region, as shown by curved region 1024. As shown in FIG. 10A, the curved region 1024 can transition to a straight region, as shown by straight region 1026, which can have a major axis 1025. It should be understood that a conduit according to the present disclosure can comprise regions that bend in one or more planes. For example, as shown in FIG. 10A, curved region 1022 and curved region 1024 bend in different planes from one another.

A curved region can comprise a bend of, e.g., from about 1 to about 180 degrees (and all intermediate values), e.g., from 1 to 180 degrees, from about 5 to about 175 degrees, from about 10 to about 170 degrees, from about 15 to about 165 degrees, from about 20 to about 160 degrees, from about 30 to about 155 degrees, from about 45 to about 150 degrees, from about 50 to about 145 degrees, from about 55 to about 140 degrees, from about 60 to about 135 degrees, from about 65 to about 130 degrees, from about 70 to about 125 degrees, from about 75 to about 120 degrees, from about 80 to about 115 degrees, from about 85 to about 110 degrees, from about 90 to about 105 degrees, from about 95 to about 100 degrees.

A bend can be measured by the angle between the major axis of the lumen of the bend at the entrance of the bend and at the exit of the bend. By reference to FIG. 10A, straight region 1020 can have a (first) major axis 1027. Curved portion 1022—connected to straight portion 1020—comprises a curve, and curved portion 1022 then connects to straight portion 1023, which defines a major axis 1029. Straight portion 1023 can in turn connect to curved portion 1024, which in turn connects to straight portion 1026, which defines a (second) major axis 1025. (It should be understood that the foregoing description is illustrative only, as outer tube 1012 can be formed of a single piece that includes straight and/or bent regions.)

As shown in FIG. 10A, inner tube 1016 can define a second end 1048, and outer tube 1012 can define a second end 1046. A conduit can include a sealer (not shown) that seals the second ends of the inner and outer tubes, so as to seal the insulating space between the inner and outer tubes.

As shown in FIG. 10A, major axis 1029 can be at an angle relative to major axis 1027. Major axis 1025 can in turn be at an angle relative to major axis 1029. The ultimate result is that major axis 1025 can be at an angle relative to major axis 1027 in one or more planes.

Insulating space 1014 can be evacuated. There can also be present (not shown) a spacing material in insulating space 1014, between inner tube 10116 and outer tube 1012. A spacing material is suitably a heat-resistant material, in particular a material that experiences little to no outgassing when exposed to high temperatures. Suitable such materials include, e.g., ceramic materials (e.g., ceramic threads, including ceramic threads that are woven or braided into a structure). The spacing material can be present as a sleeve in configuration, and can be slid over inner tube 1016 or even slid into a space between inner tube 1016 and outer tube 1012. The spacing material can act to reduce contact between the two tubes between which the insulating space is defined, as explained in the various references by Reid mentioned herein. The spacing material can also have a comparatively low thermal conductivity, e.g., to reduce conduction across the space between inner and outer walls (e.g., tubes) that are separated by an evacuated insulating space.

FIG. 10B provides further detail relating to an end of conduit 1000. As shown in FIG. 10B, a sealer ring 1028 can be disposed so as to seal insulating space 1014 of article 1000. (As described elsewhere herein, insulating space 1014 can be evacuated to, e.g., from $10^{-5}$ to $10^{-9}$ Torr, e.g., about $10^{-6}$ or even $10^{-7}$ Torr.) Sealer ring 1028 can be ring-shaped as shown in FIG. 10B. As shown in FIG. 10B, sealer ring 1028 can be flush or nearly flush with an end of inner tube 1016 or outer tube 1012, though this is not a requirement. In some embodiments, a portion of sealer ring 1028 can extend beyond an end of inner tube 1012 or outer tube 1016. As one example, sealer ring 1028 can include a flange portion (not shown) that can be used as a gripping surface to facilitate placement of sealer ring 1028.

Figure 10C:
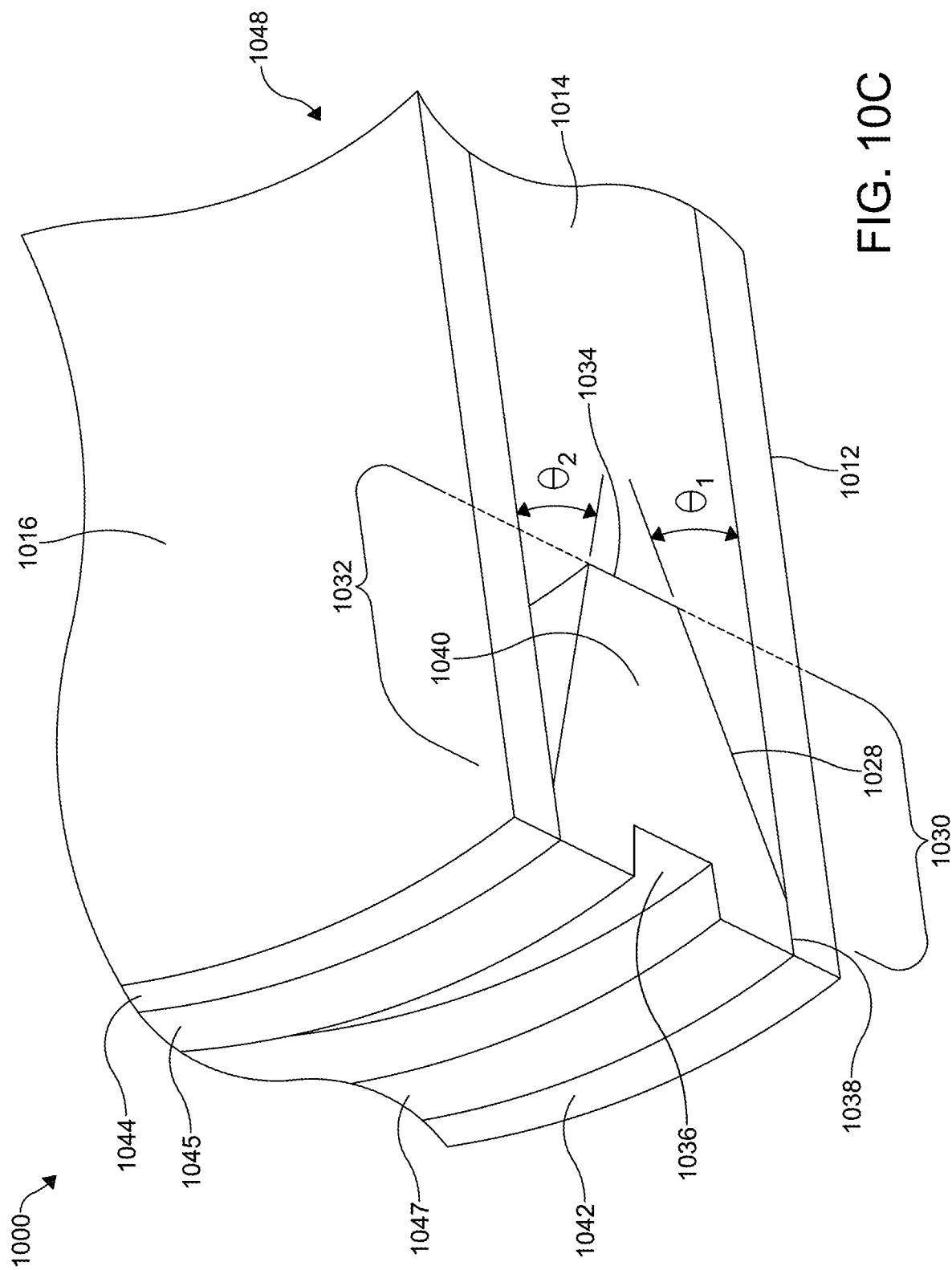
FIG. 10C provides a magnified view of region R in FIG. 10B.

FIG. 10C provides a magnified view of region R in FIG. 10B. As shown in FIG. 10C, sealer ring 1018 is disposed within insulating space 1014 so as to seal insulating space 14. In the exemplary embodiment of FIG. 10C, sealer ring 1028 is sealed to inner tube 1016 at joint 1040 and also sealed to outer tube 1012 at joint 1028. One or both of joint 1040 and joint 1028 can be a brazed joint.

In the exemplary embodiment of FIG. 10C, sealer ring 1028 has a V-shaped cross section, and sealer ring 1028 includes a first sloped portion 1030 that leads from land 1034 to joint 1038, extending toward first end 1042 of outer tube 1012. Sealer ring 1028 can include a second sloped portion 1032 that leads from land 1034 to joint 1040, in the direction of first end 1044 of inner tube 1016. As shown, land 1034 is flat, but land 1034 can be curved or otherwise nonplanar. (It should also be understood that land 1034 is not a requirement, as sealer ring 1028 can include two sloped portions that extend from a point.) Sloped portion 1032 can be inclined at an angle $\theta_2$ relative to inner tube 16. $\theta_2$ can be from about 0 to about 90, 120, or even 180 degrees, including all intermediate values and ranges. Sloped portion 30 can be inclined at an angle $\theta_1$ relative to inner tube 16. $\theta_1$ can be from about 0 to about 90, 120, or even 180 degrees, including all intermediate values and ranges.

It should be understood, however, that sealer ring 1028 need not include planar sloped portions 1030 and 1032 as shown in FIG. 10C. Sealer ring 1028 can include one or more curved portions that act to encourage movement of molecules out of insulating space 1014. Some exemplary vacuum-insulated vents and structures (and related techniques for forming and using such structures) can be found in United States patent application publications 2017/0253416, 2017/0225276, 2017/0120362, 2017/0062774, 2017/0043938, 2016/0084425, 2015/0260332, 2015/0110548, 2014/0090737, 2012/0090817, 2011/0264084, 2008/0121642, and 2005/0211711, all by A. Reid, and all incorporated herein by reference in their entireties for any and all purposes. It should be understood that a vacuum (i.e., any vacuum within the disclosed devices and methods) can be effected by the methods in the aforementioned applications or by any other method known in the art.

As shown in FIG. 10C, sealer ring 1028 can optionally include a groove 1036, which groove can run circumferentially about sealer ring 1028. The groove can be used to facilitate positioning of sealer ring 1028 in conduit 1000.

Figure 11A:
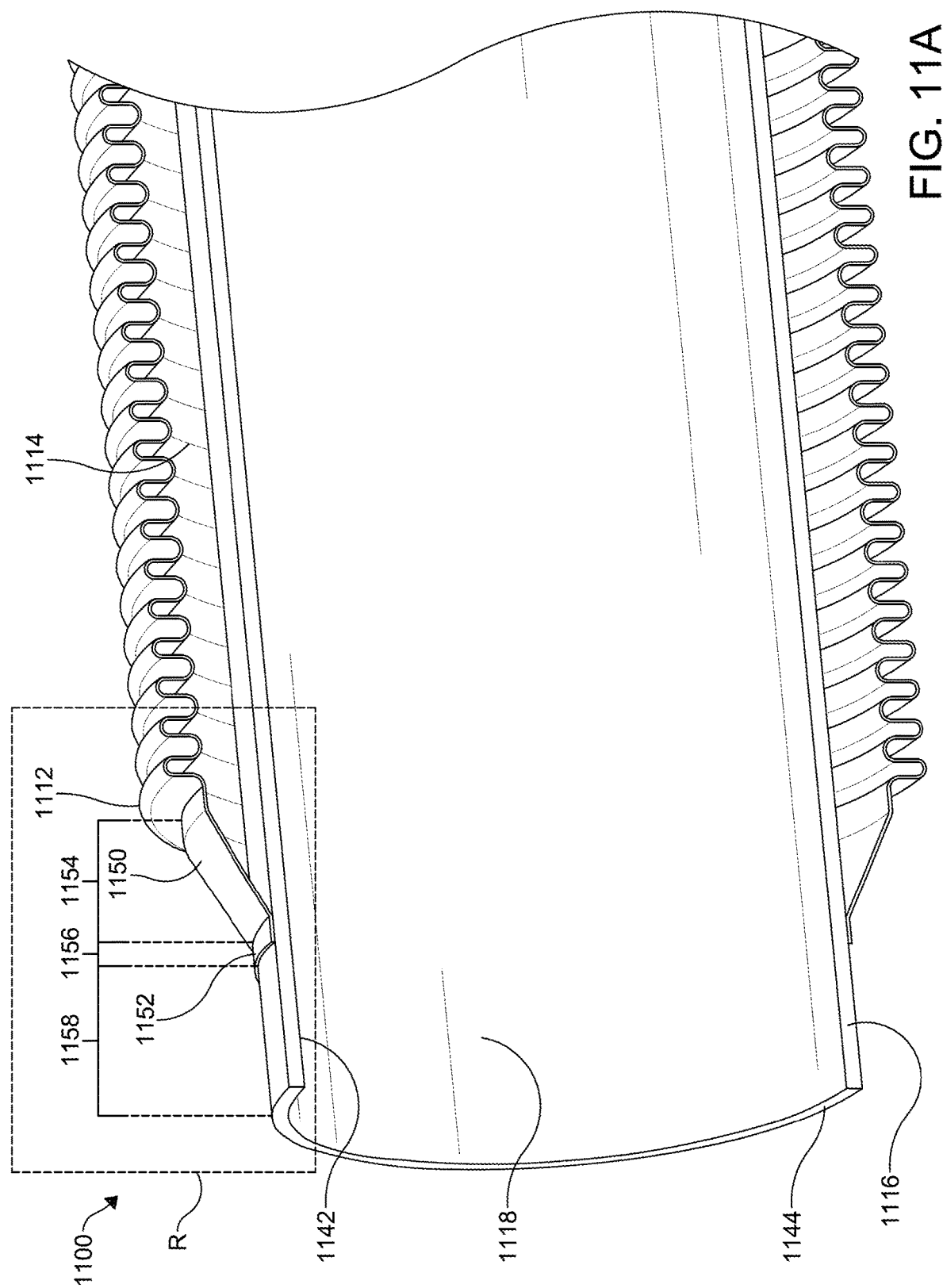
FIG. 11A provides a cutaway view of an alternative embodiment of the disclosed articles.

Exemplary FIG. 11A provides another embodiment of the disclosed conduits. As shown in FIG. 11A, an insulated conduit 1100 can include an outer tube 1112, which outer tube include a plurality of corrugations. The corrugations can be present along any portion of the length of the outer tube 1112. (It should be understood that although the corrugations shown in the disclosed FIGS. are arcuate in nature, corrugations can be v-shaped or even include one or more right angles in cross-section.) The conduit can also include inner tube 1116, which inner tube further defines a lumen 1118. As explained elsewhere herein, however, it is not a requirement that the outer tube be corrugated. In some embodiments, the outer tube is free of corrugations, and the inner tube comprises a corrugated region.

Outer tube 1112 can be sealed to inner tube 1116 so as to define sealed insulating space 1114. As shown in FIG. 11A, outer tube 1112 can include a sloped region 1150, having a length 1154. Sloped region 1150 can extend toward inner tube 1116, as shown. Outer tube 1112 can further include a joint land 1152 (having a length 1156), which joint land extends from sloped region 1150 toward end 1152 of outer tube 1112. Joint land 1152 can be sealed (e.g., via brazing) to inner tube 1116. In some embodiments, a length 1158 of inner tube 16 can extend beyond the end of the outer tube's joint region 1152, in the direction of the end 1144 of inner tube 1116.

Figure 11B:
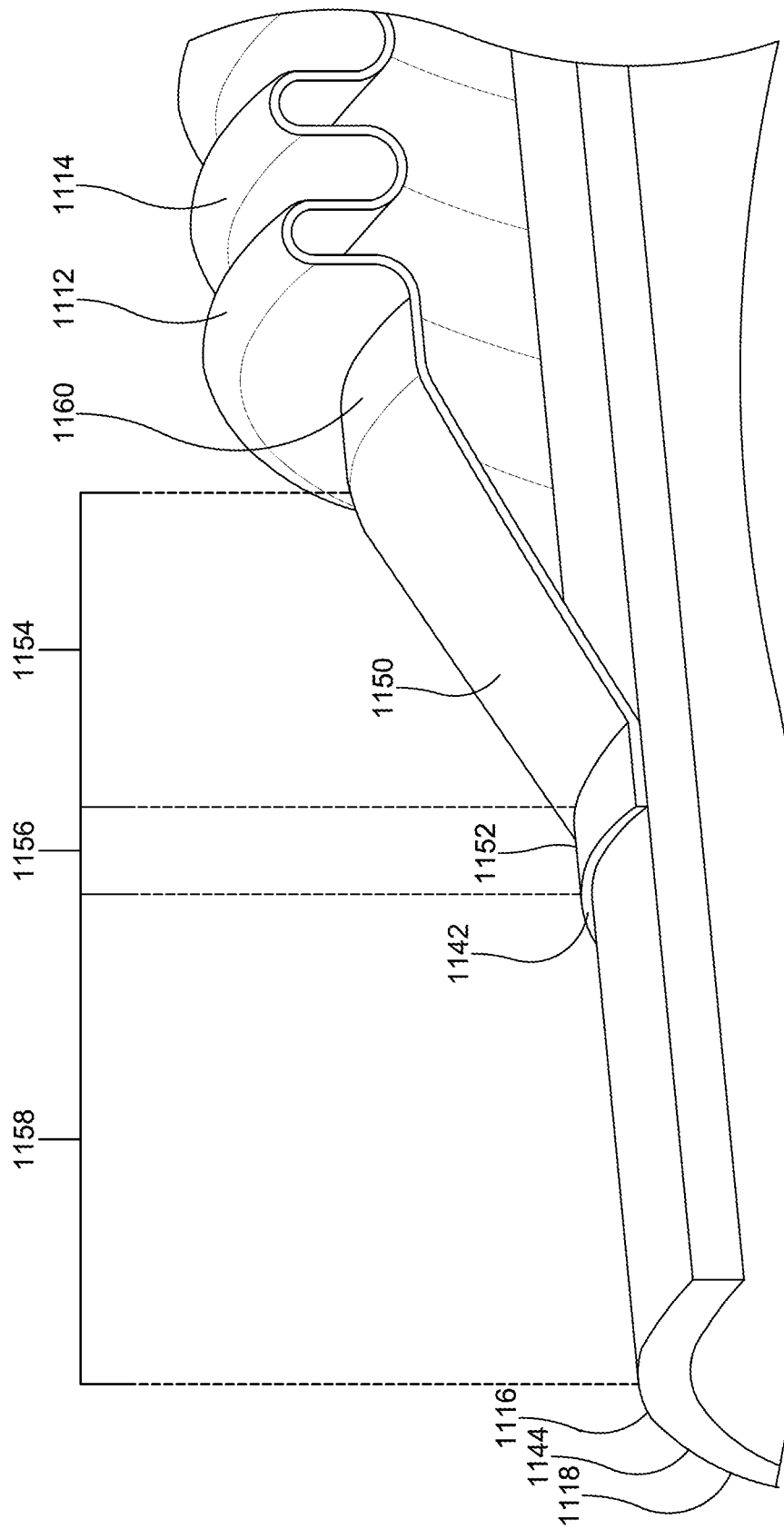
FIG. 11B provides a magnified view of region R in FIG. 11A.

Additional detail is provided in FIG. 11B, which provides a magnified view of region R in FIG. 11A. As shown in FIG. 11B, outer tube 1112 can include corrugations (not labeled). Outer tube 1112 can optionally include a transition region 1160, which transition region extends toward sloped region 1150, so as to connect sloped region 1150 to a corrugated region of outer tube 1112. (It should be understood that transition region 1160 is not a requirement, as sloped region 1150 can connect directly to a corrugation.) As shown, sloped region 1150 can extend for a distance 1154.

As shown in FIG. 11B, sloped region 1150 can extend toward inner tube 1116, in the direction of end 1144 of inner tube 1116. Outer tube 1112 can include a joint land 1152, which joint land can extend for a distance 1156. Joint land 1152 can be brazed or otherwise sealed to inner tube 1116; e.g., via vacuum brazing. The seal between outer tube 1112 and inner tube 1116 thus forms a vent; such vents are described elsewhere herein.

Sloped region 1150 can act as a vent, when insulating space 1114 is sealed. As described elsewhere herein, some exemplary vacuum-insulated vents and structures (and related techniques for forming and using such structures) can be found in United States patent application publications 2017/0253416, 2017/0225276, 2017/0120362, 2017/0062774, 2017/0043938, 2016/0084425, 2015/0260332, 2015/0110548, 2014/0090737, 2012/0090817, 2011/0264084, 2008/0121642, and 2005/0211711, all by A. Reid, and all incorporated herein by reference in their entireties for any and all purposes. It should be understood that a vacuum (i.e., any vacuum within the disclosed devices and methods) can be effected by the methods in the aforementioned applications or by any other method known in the art.

As described elsewhere herein, inner tube 1116 and/or outer tube 1112 can include one or more bends. In addition, although the exemplary embodiment of FIG. 11A and FIG. 11B shows a sloped portion of outer tube 1112 converging toward inner tube 16, the present disclosure also includes embodiments in which inner tube 1116 include a portion that diverges or flares outward toward outer tube 1112, so as to form a vent.

One or more of outer tube 1114, transition region 1160 (if present), sloped region 1150, and joint land 1152 can be configured so as to "spring into" inner tube 1116. As one example, the outer diameter of inner tube 1116 can be larger (e.g., larger by less than about 20, 15, 10, 5, or even 1%) than the inner diameter of outer tube 1112 (e.g., the inner diameter of outer tube 1112 at end 1142 and/or at joint land 1152). In this way, outer tube 1112 can act to at least partially secure itself to inner tube 16 by effectively squeezing itself around inner tube 1116, e.g., by flexing of a portion of outer tube 12 that converges or flares inward toward inner tube 1116. This in turn acts to secure outer tube 1112 to inner tube 1116.

Likewise, inner tube 1116 can include a portion that diverges or flares toward outer tube 12, so as to form a vent, as described elsewhere herein. In some such embodiments, the outer diameter of inner tube 16 can be larger than the inner diameter of outer tube 1112, such that inner tube 1116 compresses itself against outer tube 1112. This can be accomplished by, e.g., flexing of the portion of inner tube 1116 that diverges or flares toward outer tube 1112. This in turn acts to secure outer tube 1112 to inner tube 1116.

One such embodiment is provided in exemplary FIG. 12 attached hereto. As shown in FIG. 12, insulated conduit 1210 includes outer tube 1212, which outer tube includes a plurality of corrugations (not labeled). Disposed within outer tube 1212 is inner tube 1216, which inner tube defines a lumen 1218.

As FIG. 12 provides, inner tube 1216 can include a sloped region 1262, which sloped region flares or diverges outward in the direction of outer tube 1212. Sloped region 1262 can connect to a joint land 1264, which joint land extends in the direction of the end 1244 of inner tube 1216 and in the direction of end 1242 of outer tube 1212. Inner tube 1216 and outer tube 1212 can be sealed together at joint land 1262; the sealing can be accomplished by brazing or other methods known to those of skill in the art.

The sealing at joint land 1262, nearby to sloped portion 1262 gives rise to a vent, which vent seals insulating space 1214, which insulating space is defined between inner tube 1216 and outer tube 1212. As described elsewhere herein, the outer diameter of inner tube 1216 can be greater at one location along the tube than the inner diameter of outer tube 1212, such that flexing of inner tube 1216 at least partially secures inner tube 1216 against outer tube 1212.

It should be understood that an insulated conduit according to the present disclosure can have a proximal end and a distal end. One of both of the proximal and distal ends can be sealed according to the vents described herein. In embodiments where both the proximal and distal ends of the insulated conduit are sealed with vents according to the present disclosure, it is not a requirement that both vents be formed the same way. For example, the proximal end of an insulated conduit can be sealed with a sealing ring as shown in FIGS. 10A-10C, and the distal end of an insulated conduit can be sealed according to FIGS. 11A-11B or even according to FIG. 12.

Figure 13A:
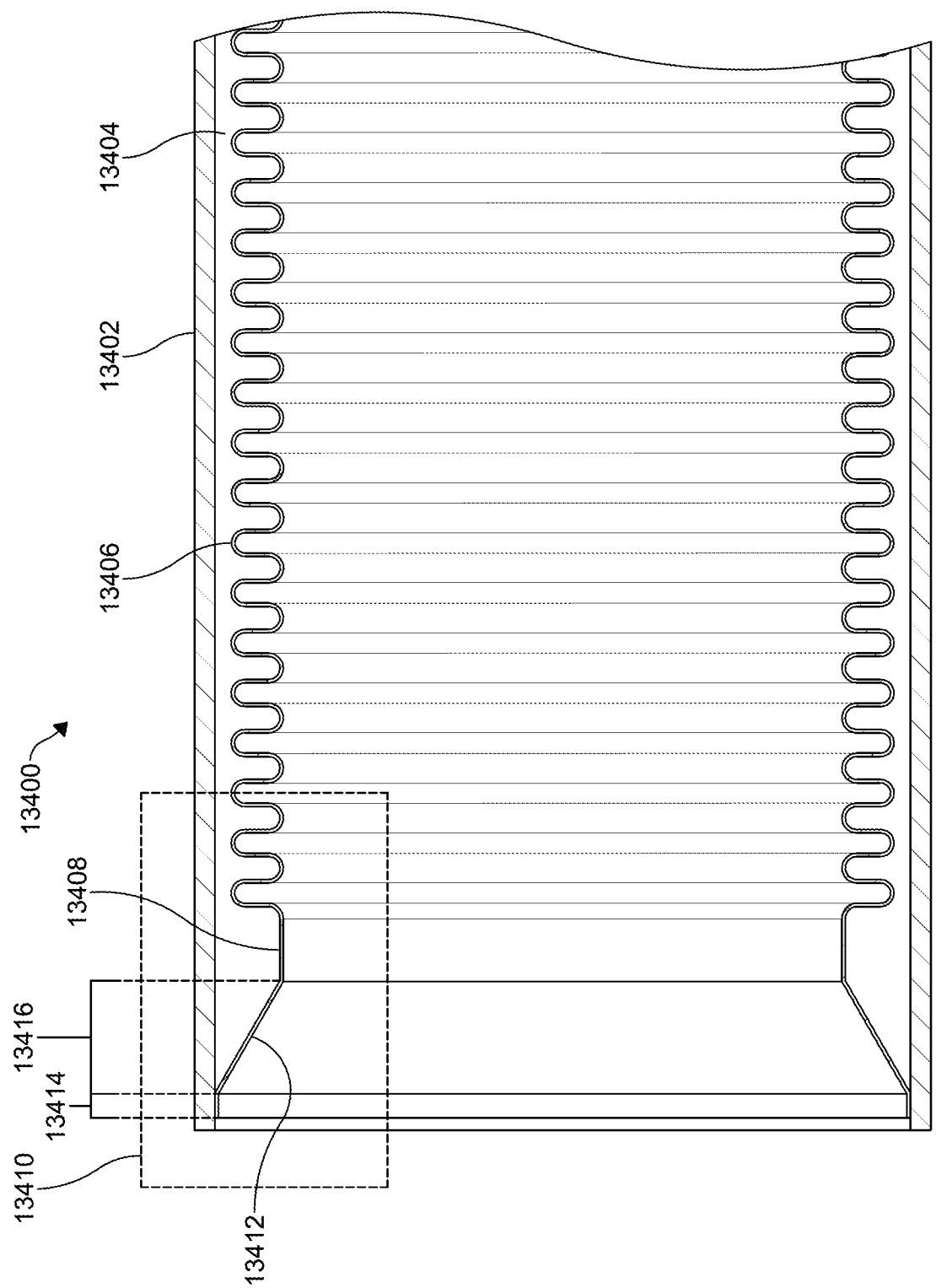
FIG. 13A provides a cutaway view of an illustrative embodiment of the disclosed technology.

FIG. 13A provides a cutaway view of an illustrative embodiment according to the present disclosure of an insulated conduit 1300. As shown, insulated conduit 1300 can include outer tube 13402, which tube can be smooth, i.e., free of corrugations. Insulated conduit 13400 can also include inner tube 13408, which can include corrugations 13406. As shown, the inner and outer tubes can be sealed to one another so as to define a sealed insulating space 13404.

Inner tube 13408 can include sloped region 13412; as shown, angled region 13412 can flare outward toward outer tube 13402. Sloped region 13412 can define a length (along the major axis of inner tube 13408) 13416. As shown, inner tube 13408 can include a joint land region; the joint land region in FIG. 13A has a length of 13414. Region 13410 of insulated conduit is shown in FIG. 13B, described below.

Figure 13B:
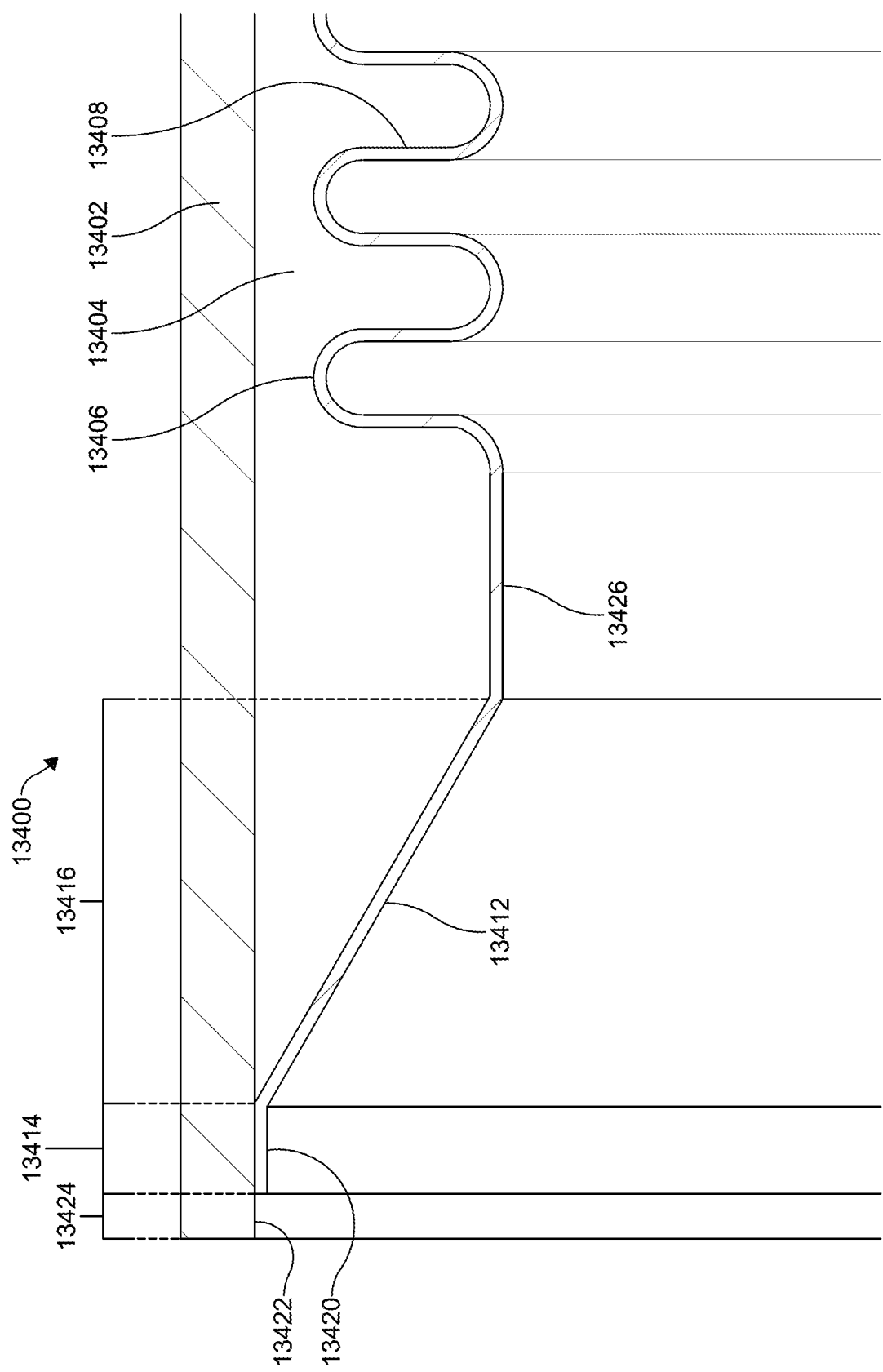
FIG. 13B provides a magnified view of region 13410 of FIG. 13A.

FIG. 13B provides a magnified view of region 13410 in FIG. 13A. As shown in FIG. 13B, inner tube 13408 can include corrugations 13406. Inner tube 13408 and outer tube 13402 can define sealed insulating space 13404 therebetween.

Inner tube 13408 can include transition region 13426 that is connected to a corrugated region of inner tube 13408. Inner tube can further comprise sloped region 13412 that is connected to transition region 13426. Sloped region 13412 can be connected to joint land 13420. Joint land 13420 can be sealed to outer tube 13402. Sloped region 13412 can have a length 13416. Similarly, joint land 13420 can have a length 13414. Outer tube 13402 can have an end region 13422 that extends beyond the end of joint land 13420; end region 13422 can have a length 13424. Methods of joining inner tube 13408 to outer tube 13402 are described elsewhere herein.

A spacer material (not shown or labeled) can optionally be disposed within sealed insulating space 13404 so as to reduce or even eliminate contact or so-called "thermal shorts" between inner tube 13408 and outer tube 13402. The spacer material can be, e.g., a ceramic, boron nitride, or other suitable material.

Without being bound to any particular theory, the embodiment shown in FIGS. 13A and 13B provides an alternative pathway to forming a non-straight, insulated conduit. Using a conduit according to FIG. 13A, a user can bend the conduit; such a conduit can be bent while maintaining the sealed insulating space 13404 between inner tube 13408 and outer tube 13402 without any physical contact between inner tube 13408 and outer tube 13402. A spacer material disposed within sealed insulating space 13404 can prevent contact between inner tube 13408 and outer tube 13404.

Without being bound to any particular theory, the corrugations in inner tube 13408 allow for bending without the tube experiencing crimping—this in turn allows the inner tube to bend within the outer tube while also maintaining sealed insulating space 13404. In this way, a user can produce an insulated conduit that has a smooth, non-corrugated outer surface. Such smooth-surfaced conduits can be well-suited for certain applications, e.g., applications where a user can desire a certain external appearance, such as visible exhaust pipes and the like.

Without being bound to any particular theory, the disclosed technology (e.g., conduits) is especially suitable for use with communicating comparatively hot fluids, e.g., the exhaust from a combustion engine. Embodiments that comprise a corrugated conduit (e.g., tube) through which the hot fluid is communicated are especially suitable.

Without being bound to any particular theory, a corrugated inner tube can act as a bellows or otherwise expand and/or contract in response to the temperature of the fluid disposed within the inner tube. As an example, a comparatively hot fluid may induce an expansion in the corrugated tube that contains the hot fluid; the corrugations can act to expand and/or contract in response to temperature. In this way, the corrugated (inner) tube may expand in response to the temperature of the fluid, thus taking on the mechanical stresses while sparing the outer tube from those stresses. A user can manipulate the height, period, and/or location of corrugations so as to maximize the insulating effect of the corrugations.

The surface area of a corrugated tube of a given length is greater than the surface area of a smooth tube of the same length. Without being bound to any particular theory, the so-called view factor can be reduced or even minimized, depending on the design of the corrugations (e.g., number of corrugations, period of corrugations, height of corrugations, and the like). The term "view factor" relates to the field of heat transfer, and is known to those of ordinary skill in the art.

For example, in an article having a corrugated inner tube that is sealed to an smooth-profile outer tube so as to form an evacuated, insulated space therebetween. When comparatively hot fluid is communicated within the corrugated inner tube, the corrugations of the inner tube will expand and/or contract in response to the temperature of the fluid. While the inner tube and outer tube may be fixed to one another, the inner tube's expansion accommodates mechanical stress evolved from the hot fluid; the inner tube's expansion takes on the mechanical stresses that would otherwise also be borne by the outer tube. In this way, the overall article can retain its length and its outer width (e.g., diameter) even when a hot fluid is being carried within. By reference to non-limiting FIG. 15B, the corrugations 1520 of the inner tube can expand in response to heated fluid carried within the inner tube, thereby accommodating the mechanical stresses brought about by the heated fluid and allowing the outer tube to retain its size/shape.

Again without being bound to any particular theory, the corrugations in the tube may contain so-called recirculation pockets of fluid. These recirculating pockets may act to reduce contact between the comparatively hot fluid moving through the center of the tube and the tube's (corrugated) walls. In this way, the hot fluid in the center of the tube transfers less heat to the walls of the corrugated tube, with the hot fluid thereby retaining more of its original heat and reducing heat losses out of the walls of tube. Without being bound to any particular theory, the corrugations of a tube can increase the surface area of the tube that is available to radiate heat.

Fluid being carried within a corrugated tube can be flowed as laminar flow. Such fluid can also be flowed as turbulent flow; the fluid can also be flowed in a flow regime that is between laminar flow and turbulent flow.

Figure 14A:
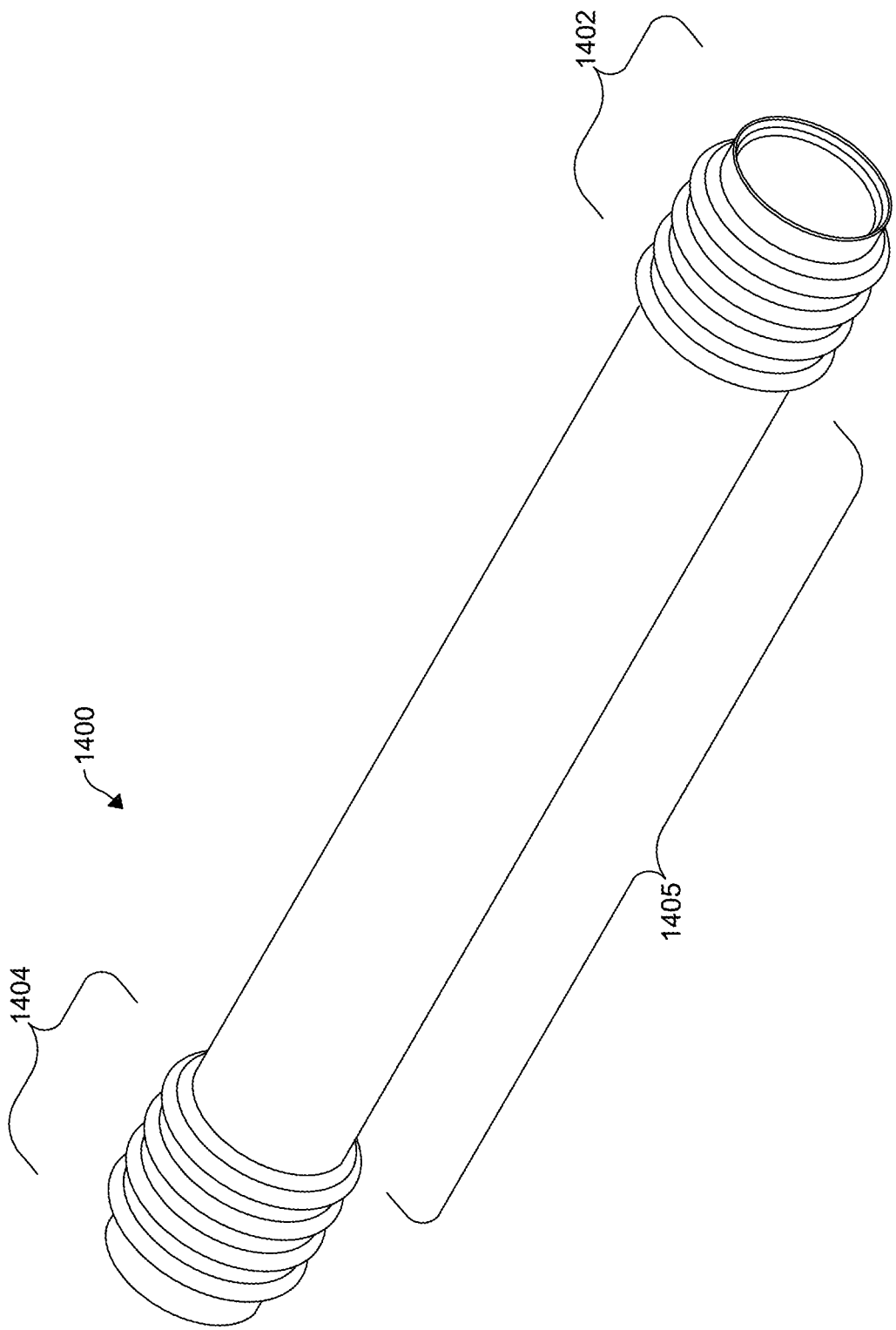
FIG. 14A provides an exterior view of an insulated conduit according to the present disclosure.

FIG. 14A provides an exterior view of an insulated conduit 1400 according to the present disclosure. As shown, insulated conduit 1400 can have end regions 1402 and 1404 that are cylindrical and include corrugations in their profiles. The insulated conduit can also include a central region 1405 that extends between distal end 1402 and proximal end 1404.

Figure 14B:
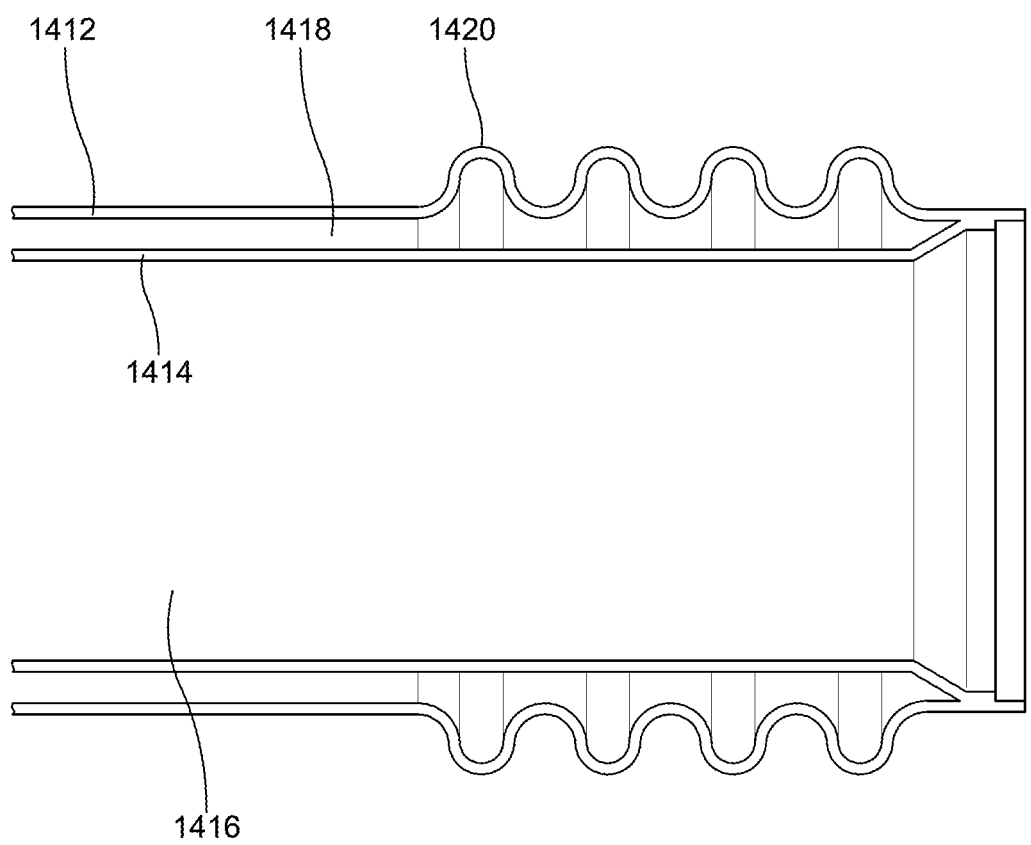
FIG. 14B provides a magnified cutaway view of the insulated conduit of FIG. 14A.

FIG. 14B provides a cutaway view of distal end 1402 in FIG. 14A. As shown in FIG. 14B, inner tube 1414 is disposed within outer tube 1412 so as to form sealed insulating space 1418 between the inner and outer tubes. Inner tube 1414 can define a lumen 1416 within. The internal diameter of the lumen will depend on the user's needs and can be, e.g., from about 0.1 cm to about 5 or even about 10 cm, in some non-limiting embodiments.

Outer tube 1412 can include one or more corrugations 1420. As shown, the corrugations can extend from the distal end of outer tube 1412 in the direction of the proximal end (not shown) of outer tube 1412. Corrugations can extend only partially along the length of outer tube 12, e.g., from about 0.01 to about 50% of the end-to-end length of outer tube 1412.

FIG. 14C provides further detail of the encircled area of FIG. 14B. As shown in FIG. 14C, an insulated conduit can include outer tube 1412 and inner tube 1414, which define therebetween a sealed insulating region 1418. Outer tube 1412 can include one or more corrugations 1420 within corrugated region 1422. Corrugated region 1422 can represent only a portion of the length of outer tube 1412, e.g., from about 0.01 to about 50% of the end-to-end length of outer tube 1412. Outer tube 1412 can comprise a metallic material, in some embodiments. Inner tube 1414 can comprise a ceramic material, in some embodiments.

An outer tube corrugation can be arched, but can also have a triangular or be otherwise polygonal in profile. Outer tube corrugations can be separated by outer tube corrugation pitch distance 1424, which can be the distance between the highest points on two adjacent corrugations. The pitch distance 14 can depend on the needs of the user. In some embodiments, the pitch distance is, e.g., from about 0.1 to about 3 cm, and all intermediate values. (The foregoing values are exemplary only and do not limit the pitch values.)

The corrugations of the outer tube can also define outer tube corrugation height 1426, which is measured as the distance between the innermost and outermost (measured radially outward from the outer tube) points on a corrugation 1420. In some non-limiting embodiments, the corrugation height can be, e.g., 0.1 to about 5 or even 10 cm. The outer tube corrugations can suitably all have the same height, although this is not a requirement, as different regions of the outer tube can have corrugations of different heights.

As shown in exemplary FIG. 14C, inner tube 1414 can include a sloped region 1430 (having a length 1428), which sloped region flares outward toward outer tube 1412. Inner tube 1414 can also include land region 1434 (having a length 1432), which land region is connected to sloped region 1430, and which land region can be brazed to outer tube 1412 so as to form a sealed vent. Some exemplary vacuum-insulated vents and structures (and related techniques for forming and using such structures) can be found in United States patent application publications 2017/0253416, 2017/0225276, 2017/0120362, 2017/0062774, 2017/0043938, 2016/0084425, 2015/0260332, 2015/0110548, 2014/0090737, 2012/0090817, 2011/0264084, 2008/0121642, and 2005/0211711, all by A. Reid, and all incorporated herein by reference in their entireties for any and all purposes. It should be understood that a vacuum (i.e., any vacuum within the disclosed devices and methods) can be effected by the methods in the aforementioned applications or by any other method known in the art.

Although FIGS. 14B and 14C illustrate a cutaway view of the conduit's distal end, it should be understood that the proximal end of a conduit can also include any or all of the features described in FIGS. 14B and 14C.

Figure 15A:
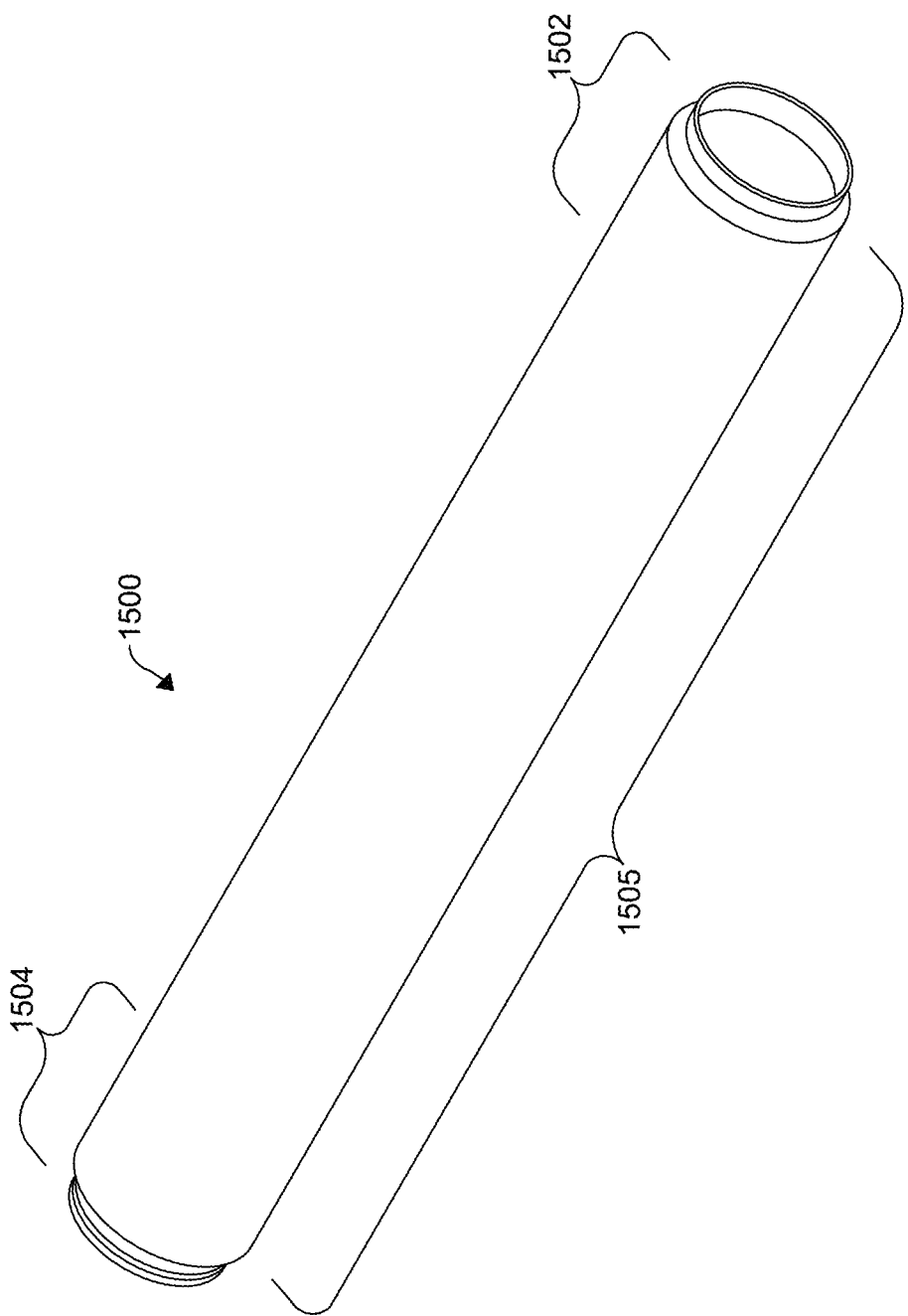
FIG. 15A provides an exterior view of an insulated conduit according to the present disclosure.

FIG. 15A provides an exterior view of insulated conduit 1500. As shown, insulated conduit 1500 can have end regions 1502 and 1504 that are cylindrical and include corrugations in their profiles. The insulated conduit can also include a central region 1505 that extends between distal end 1502 and proximal end 1504.

Figure 15B:
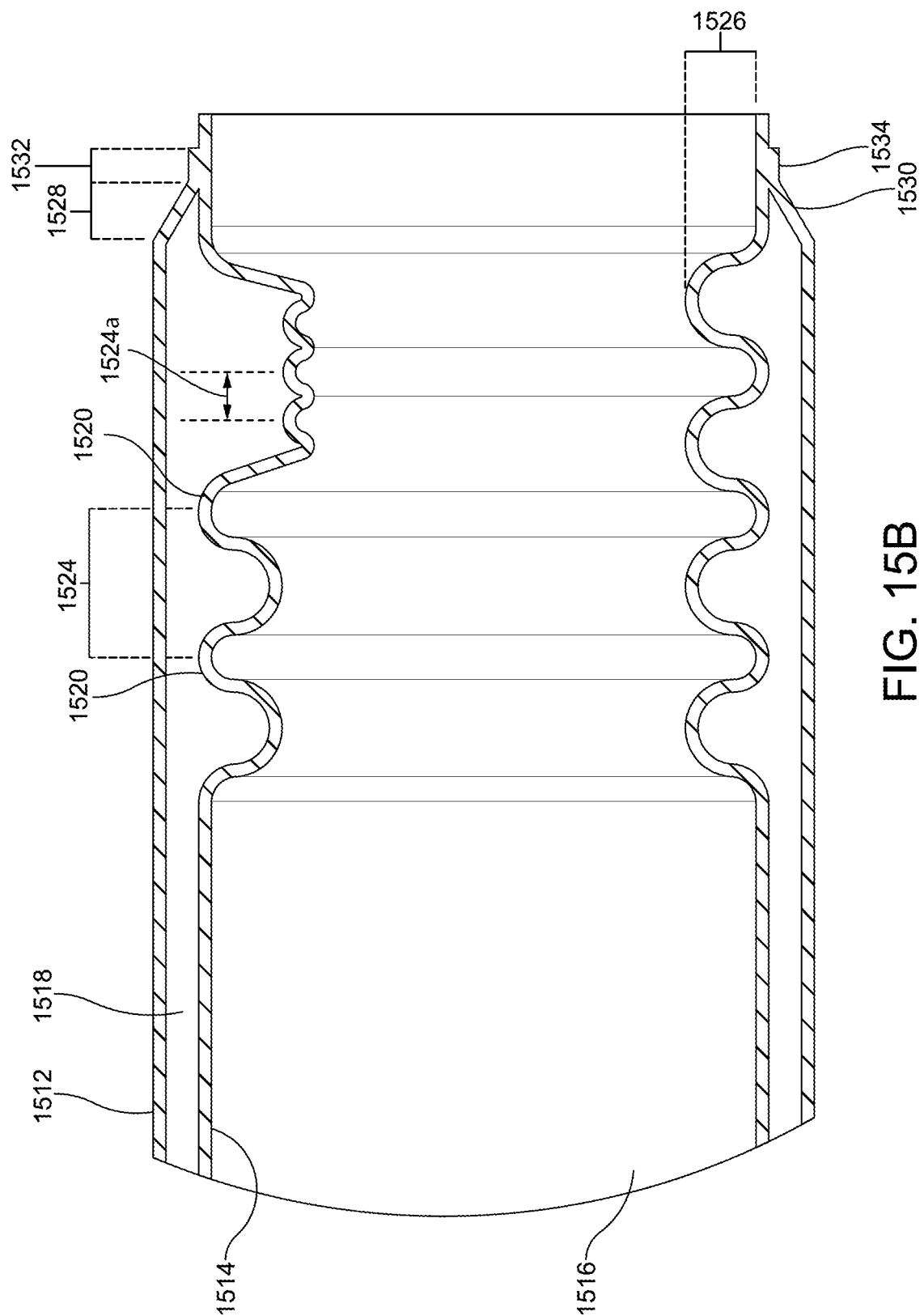
FIG. 15B provides a magnified, cutaway view of one end of the insulated conduit of FIG. 15A.

FIG. 15B provides a cutaway view of distal end 1502 in FIG. 15A. As shown in FIG. 15B, inner tube 1514 is disposed within outer tube 1512 so as to form sealed insulating space 1518 between the inner and outer tubes. Inner tube 1514 can define a lumen 1516 within. The internal diameter of the lumen will depend on the user's needs and can be, e.g., from about 0.1 cm to about 5 or even about 10 cm.

Outer tube 1512 can include one or more corrugations 1520. As shown, the corrugations can extend from the distal end of outer tube 1512 in the direction of the proximal end (not shown) of outer tube 1512. Corrugations can extend only partially along the length of outer tube 1512, e.g., from about 0.01 to about 50% of the end-to-end length of outer tube 1512.

FIG. 15B provides a cutaway with addition detail of the distal end 1502 of FIG. 15A. As shown in FIG. 15B, an insulated conduit can include outer tube 1512 and inner tube 1514, which define therebetween a sealed insulating region 1518.

An inner tube corrugation can be arched, but can also have a triangular or be otherwise polygonal in profile. Inner tube corrugations can be separated by outer tube corrugation pitch distance 1524, which can be the distance between the highest points on two adjacent corrugations. The pitch distance 1524 can depend on the needs of the user. As shown, one region of corrugations can have corrugation pitch distance 1524, and another region can have corrugation pitch distance 1524a, which differs from corrugation pitch distance 1524. In some embodiments, the pitch distance is, e.g., from about 0.1 to about 3 cm, and all intermediate values. (The foregoing values are exemplary only and do not limit the pitch values.)

An inner tube corrugation can be arched, but can also have a triangular or be otherwise polygonal in profile. Inner tube corrugations can be separated by outer tube corrugation pitch distance 1524, which can be the distance between the highest points on two adjacent corrugations. The pitch distance 1524 can depend on the needs of the user. In some embodiments, the pitch distance is, e.g., from about 0.1 to about 3 cm, and all intermediate values. (The foregoing values are exemplary only and do not limit the pitch values.)

The corrugations of the inner tube can also define outer tube corrugation height 1526, which is measured as the distance between the innermost and outermost (measured radially outward from the inner tube) points on a corrugation 1520. In some non-limiting embodiments, the corrugation height can be, e.g., 0.1 to about 5 or even 10 cm. The outer tube corrugations can suitably all have the same height, although this is not a requirement, as different regions of the outer tube can have corrugations of different heights.

As shown in exemplary FIG. 15B, outer tube 1512 can include a sloped region 1530 (having a length 1528), which sloped region flares inward toward inner tube 1514. Outer tube 1512 can also include land region 1534 (having a length 1532), which land region is connected to sloped region 1530, and which land region can be brazed to inner tube 1512 so as to form a sealed vent. Some exemplary vacuum-insulated vents and structures (and related techniques for forming and using such structures) can be found in United States patent application publications 2017/0253416, 2017/0225276, 2017/0120362, 2017/0062774, 2017/0043938, 2016/0084425, 2015/0260332, 2015/0110548, 2014/0090737, 2012/0090817, 2011/0264084, 2008/0121642, and 2005/0211711, all by A. Reid, and all incorporated herein by reference in their entireties for any and all purposes. It should be understood that a vacuum (i.e., any vacuum within the disclosed devices and methods) can be effected by the methods in the aforementioned applications or by any other method known in the art.

Although FIG. 15B illustrates a cutaway view of the conduit's distal end, it should be understood that the proximal end of a conduit can also include any or all of the features described in FIG. 15B.

Without being bound to any particular theory of operation, a corrugated region of a tube can act as a bellows or spring so as to absorb mechanical stresses that would otherwise be borne by the fixed joint between the inner and outer walls of the conduit.

This can be illustrated by reference to FIG. 14C. In the event of outer tube 1412 reaching a comparatively low temperature, outer tube 1412 can contract, thereby exerting mechanical stress at the joint between the inner tube and outer tube at land region 1434. By incorporating corrugations into outer tube 1412 as shown in FIG. 14C, the contraction forces in outer tube 1412 will be at least partially borne by the corrugations, thus reducing the mechanical stresses experienced by the joint between the inner and outer tubes. Likewise, in the event that outer tube 1412 expands, the expansion forces in outer tube 1412 will be at least partially borne by the corrugations, thus reducing the mechanical stresses experienced by the joint between the inner and outer tubes.

A similar illustration is provided by FIG. 15B. In the event of inner tube 1514 reaching a comparatively low temperature, inner tube 1512 can contract, thereby exerting mechanical stress at the joint between the inner tube and outer tube. By incorporating corrugations into inner tube 1514 as shown in FIG. 15B, the contraction forces in outer tube 1514 will be at least partially borne by the corrugations, thus reducing the mechanical stresses experienced by the joint between the inner and outer tubes. Likewise, in the event that inner tube 1514 expands, the expansion forces in inner tube 1514 will be at least partially borne by the corrugations, thus reducing the mechanical stresses experienced by the joint between the inner and outer tubes.

Exemplary Embodiments

The following exemplary embodiments are illustrative only and do not serve to limit the scope of the present disclosure or of the attached claims.

Embodiment 1. An insulated conduit, comprising: (a) an outer tube, the outer tube having a distal end and a proximal end, the outer tube further comprising a first corrugated region having a length and comprising a plurality of corrugations extending along the outer tube from the distal end of the outer tube toward the proximal end of the outer tube; an inner tube disposed within the outer tube, the inner tube having a distal end and a proximal end, and the inner tube defining a lumen; the inner tube and outer tube being sealed to one another at a joint, optionally at the distal end of the inner tube, the seal defining a sealed insulating region of reduced pressure between the outer tube and the inner tube, the inner tube and outer tube being sealed to one another such that the length of the first corrugated region of the outer tube increases or decreases in response to a temperature, or (b) an outer tube, the outer tube having a distal end and a proximal end, an inner tube disposed within the outer tube, the inner tube having a distal end and a proximal end, and the inner tube defining a lumen; the inner tube further comprising a first corrugated region having a length and comprising a plurality of corrugations extending along the inner tube from the distal end of the inner tube toward the proximal end of the inner tube; the inner tube and outer tube being sealed to one another at a joint, optionally at the distal end of the outer tube, the seal defining a sealed insulating region of reduced pressure between the outer tube and the inner tube, the inner tube and outer tube being sealed to one another such that the length of the first corrugated region of the inner tube increases or decreases in response to a temperature.

In some embodiments one of the inner and outer tubes comprises a non-metallic material (e.g., a ceramic), and the other of the inner and outer tube comprises a metal. For example, the outer tube can comprise a ceramic material, and the inner tube can comprise a metallic material. Alternatively, the inner tube can comprise a ceramic material, and the outer tube can comprise a metallic material. Corrugations are suitably comprised in a tube that comprises a metallic material.

It should be understood that an outer tube can include corrugated regions at both the proximal and distal ends. Likewise, it should be understood that an inner tube can include corrugated regions at both the proximal and distal ends. In this way, the corrugated regions at either end of a tube contract/lengthen in response to temperature, with the expansion/contraction of the corrugated regions bearing the mechanical stress that would otherwise be borne by the joint between the inner and outer tubes. Without the presence of the corrugated regions, the inner and/or outer tubes would contract or expand, thereby exerting a "tugging" force or a "pushing" force on the joint. With the presence of the comparatively flexible corrugations, the corrugations contract/lengthen in response to temperature so as to accommodate the thermal expansion/contraction of the tube, and the non-corrugated portion(s) of the tubes that are joined to one another then experience reduced mechanical stresses in comparison to tubes that lack corrugations, as the expansion/contraction stresses are taken up by the corrugations.

The corrugated region at a proximal end of a tube can be identical (e.g., in terms of length, corrugation height, and corrugation period/interval), but this is not a requirement, as the corrugated region at a proximal end of a tube can differ from the corrugated region at the distal end of a tube, e.g., in length, corrugation height, and corrugation period/interval.

Embodiment 2. The insulated conduit of claim 1, wherein the sealed insulating region defines a pressure in the range of from about $10^{-2}$ to about $10^{-9}$ Torr, e.g., about $10^{-3}$, $10^{-4}$ $10^{-5}$, $10^{-6}$, $10^{-7}$, $10^{-8}$, or even about $10^{-9}$ Torr and all intermediate values.

Embodiment 3. The insulated conduit of any of claims 1-2, wherein the joint comprises (a) a first vent communicating with the sealed insulating region to provide an exit pathway for gas molecules from the sealed insulating region, the first vent being sealable for maintaining a reduced pressure within the first insulating space following evacuation of gas molecules through the first vent, and (b) a first seal sealing the first insulating space at the first vent.

Embodiment 4. The insulated conduit of any of claims 1-3, wherein the outer tube first corrugated region defines a corrugation height that is from about 0.1 to about 100% of an inner diameter of an uncorrugated section of the outer tube. For example, the height of the corrugations of the outer tube can be about 0.1 cm in an embodiment where the outer tube has an inner diameter of about 1 cm.

The outer corrugation height can be, e.g., from about 1 to about 90% of an inner diameter of an uncorrugated section of the outer tube, or from about 5 to about 85% of an inner diameter of an uncorrugated section of the outer tube, or from about 10 to about 80% of an inner diameter of an uncorrugated section of the outer tube, or from about 15 to about 75% of an inner diameter of an uncorrugated section of the outer tube, or from about 20 to about 70% of an inner diameter of an uncorrugated section of the outer tube, or from about 30 to about 65% of an inner diameter of an uncorrugated section of the outer tube, or from about 35 to about 60% of an inner diameter of an uncorrugated section of the outer tube, or from about 40 to about 55% of an inner diameter of an uncorrugated section of the outer tube, or even about 50% of an inner diameter of an uncorrugated section of the outer tube. In some embodiments, the outer corrugation height is from about 0.01 or even 0.1 to about 10% of an inner diameter of an uncorrugated section of the outer tube.

Embodiment 5. The insulated conduit of any of claims 1-3, wherein the inner tube first corrugated region defines a corrugation height that is from about 0.1 to about 100% of an inner diameter of an uncorrugated section of the inner tube. The inner corrugation height can be, e.g., from about 1 to about 90% of an inner diameter of an uncorrugated section of the inner tube, or from about 5 to about 85% of an inner diameter of an uncorrugated section of the inner tube, or from about 10 to about 80% of an inner diameter of an uncorrugated section of the inner tube, or from about 15 to about 75% of an inner diameter of an uncorrugated section of the inner tube, or from about 20 to about 70% of an inner diameter of an uncorrugated section of the inner tube, or from about 30 to about 65% of an inner diameter of an uncorrugated section of the inner tube, or from about 35 to about 60% of an inner diameter of an uncorrugated section of the inner tube, or from about 40 to about 55% of an inner diameter of an uncorrugated section of the inner tube, or even about 50% of an inner diameter of an uncorrugated section of the inner tube. In some embodiments, the inner corrugation height is from about 0.01 or even 0.1 to about 10% of an inner diameter of an uncorrugated section of the inner tube.

Embodiment 6. The insulated conduit of any of claims 1-5, wherein the outer tube first corrugated region has a length that is less than about 50% of the distance between the distal and proximal ends of the outer tube. As examples, the outer tube first corrugated region can have a length that is from about 0.01 to about 50% the length of the distance between the distal and proximal ends of the outer tube, or from about 0.1 to about 25% the length of the distance between the distal and proximal ends of the outer tube, or from about 1 to about 10% the length of the distance between the distal and proximal ends of the outer tube, or even from about 2 to about 5% of the length of the distance between the distal and proximal ends of the outer tube.

Embodiment 7. The insulated conduit of claim 6, wherein the outer tube first corrugated region has a length that is less than about 20% of the distance between the distal and proximal ends of the outer tube.

Embodiment 8. The insulated conduit of any of claims 1-5, wherein the inner tube first corrugated region has a length that is less than about 50% of the distance between the distal and proximal ends of the inner tube. As examples, the inner tube first corrugated region can have a length that is from about 0.01 to about 50% the length of the distance between the distal and proximal ends of the inner tube, or from about 0.1 to about 25% the length of the distance between the distal and proximal ends of the inner tube, or from about 1 to about 10% the length of the distance between the distal and proximal ends of the inner tube, or even from about 2 to about 5% of the length of the distance between the distal and proximal ends of the inner tube.

Embodiment 9. The insulated conduit of claim 6, wherein the inner tube first corrugated region has a length that is less than about 20% of the distance between the distal and proximal ends of the inner tube.

Embodiment 10. The insulated conduit of any of claims 1-9, wherein the joint comprises a brazed joint.

Embodiment 11. The insulated conduit of any of claims 1-10, wherein the inner tube and the outer tube comprise different materials. As one example, the inner tube can comprise Inconel™ allow, and the outer tube can comprise stainless steel. Such an embodiment can be useful in applications where, e.g., the user can desire a conduit that is free of nickel on the outside surface of the conduit. As another example, an inner tube can comprise stainless steel, and the outer tube can comprise Inconel™ alloy.

In some embodiments, a user can desire to use a comparatively low-conductivity material as the inner tube, and a comparatively high-conductivity material as the outer tube. In such an embodiment, the outer tube would stay comparatively cool when a hot fluid were carried in the lumen of the inner tube. In some embodiments, a user can wish to use a material in the outer tube that is non-magnetic.

In some embodiments, one of the inner and outer tubes comprises a non-metallic materials, e.g., a ceramic material. This can be done so as to have a tube material that is non-magnetic, so as to have a tube material that acts as a radiation or other shield, or for any other purpose. In some embodiments both the inner and outer tubes comprise a metallic material; in other embodiments, only one of the inner and outer tubes comprises a metallic material.

In one particular embodiment, the outer tube comprises a metallic, corrugated material, and the inner tube comprises a metallic material. In another embodiment, the outer tube comprises a corrugated metallic material and the inner tube comprises a ceramic material. In another embodiment, the outer tube comprises a ceramic material and the inner tube comprises a corrugated metallic material.

Embodiment 12. The insulated conduit of claim 11, wherein the inner tube and the outer tube comprise different metallic materials.

Embodiment 13. The insulated conduit of any of claims 11-12, wherein the inner tube and the outer tube comprise materials that have different coefficients of thermal expansion.

Embodiment 14. The insulated conduit according to any of claims 1-13, further comprising a fitting configured to securably maintain the insulated conduit in engagement with a fluid source or fluid outlet. Such a fitting can be, e.g., a screw fitting, a bayonet-type fitting, a friction fit-type fitting, or other fittings known to those of skill in the art. As one example, a fitting can be used to secure a conduit according to the present disclosure to a pressurized source of fluid, e.g., a liquid nitrogen. This can be accomplished so as to place the lumen of the conduit (i.e., the lumen of the inner tube of the conduit) into fluid communication with the source of fluid. In this way, a user can then dispense the fluid (e.g., during a medical procedure) through the conduit, the insulating space of the conduit acting to minimize heat transfer between the fluid and the environment exterior to the conduit.

Embodiment 15. A method, comprising communicating a fluid through the lumen of the inner tube of an insulated conduit according to any of claims 1-14. Suitable fluids include, e.g., oil or other lubricants, liquid nitrogen, liquid oxygen, liquid helium, water, steam, fuel, and the like.

Embodiment 16. The method of claim 15, wherein the fluid defines a temperature of between about 200 deg C. and about −200 deg. C., e.g., from about −200 to about 200 deg C., from about −175 to about 175 deg C., from about −150 to about 150 deg. C., from about −125 to about 125 deg. C., from about 100 to about 100 deg. C., from about −75 to about 75 deg. C., from about −50 to about 50 deg. c, or even from about −25 to about 25 deg. C., and all intermediate values.

Embodiment 17. A method, comprising:

with (a) an outer tube, the outer tube having a distal end and a proximal end, the outer tube further comprising a first corrugated region having a length and comprising a plurality of corrugations extending along the outer tube from the distal end of the outer tube toward the proximal end of the outer tube, and (b) an inner tube having a distal end and a proximal end, and the inner tube defining a lumen, disposing the inner tube within the outer tube and sealing the inner tube and outer tube to one another at a joint, optionally at the distal end of the inner tube, the seal defining a sealed insulating region of reduced pressure between the outer tube and the inner tube, the inner tube and outer tube being sealed to one another such that the length of the first corrugated region of the outer tube increases or decreases in response to a temperature.

Embodiment 18. A method, comprising: with (a) an outer tube, the outer tube having a distal end and a proximal end, and (b) an inner tube having a distal end and a proximal end, and the inner tube defining a lumen and the inner tube further comprising a first corrugated region having a length and comprising a plurality of corrugations extending along the inner tube from the distal end of the inner tube toward the proximal end of the inner tube, disposing the inner tube within the outer tube and sealing the inner tube and outer tube to one another at a joint, optionally at the distal end of the outer tube, the seal defining a sealed insulating region of reduced pressure between the outer tube and the inner tube, the inner tube and outer tube being sealed to one another such that the length of the first corrugated region of the inner tube increases or decreases in response to a temperature.

Embodiment 19. The method of any of claims 17-18, wherein the sealed insulating region defines a pressure in the range of from about $10^{-2}$ to about $10^{-9}$ Torr, e.g., about from about $10^{-2}$ to about $10^{-9}$ Torr, or from about $10^{-3}$ to about $10^{-8}$, Torr, or from about $10^{-4}$ to about $10^{-7}$ Torr, or even from about $10^{-5}$ to about $10^{-6}$ Torr.

Embodiment 20. The method of any of claims 17-19, wherein the inner and outer tubes define a first vent communicating with the sealed insulating region to provide an exit pathway for gas molecules from the sealed insulating region, the first vent being sealable for maintaining the reduced pressure within the first insulating space following evacuation of gas molecules through the first vent.

It should be understood that in any embodiment of the technology disclosed therein, a spacer material can be present in the sealed insulating region of an article according to the present disclosure. Such a spacer material can be used to maintain a spacing between the inner and outer tubes and/or to reduce or eliminate contact between the walls separated by the spacer material. The spacer material is suitably one that exhibits little to no outgassing when processed using vacuum or brazing processes and can be, e.g., a ceramic material. The spacer material can be present as a fabric (woven or non-woven), a thread, a braid, or in some other form. The spacer material can be disposed between the inner and outer tubes. It should be understood that the spacer material can be present between tubes regardless of the shape/configuration of the tubes. For example, a spacer material can be present between two tubes where none, one, or both of the tubes comprises corrugations. The spacer material can be a material that has a relatively low thermal conductivity, e.g., a thermal conductivity that is lower than at least one of the walls that are separated by the spacer material. The spacer material can have a thermal conductivity of, e.g., from about 0.1 to about 0.015 $W*m^{-1}*K^{-1}$.

Embodiment 21. A vacuum-insulated component, comprising: a first arcuate shell sealed to a second arcuate shell, the sealed first and second arcuate shells defining a first tube; a second tube being disposed within the first tube so as to define a sealed insulating space between the first tube and the second tube, the second tube being coaxial with the first tube, the component further comprising a vent defined by first and second walls communicating with the insulating space to provide an exit pathway for gas molecules from the space, the vent being sealable for maintaining a vacuum within the insulating space following evacuation of gas molecules through the vent, the distance between the first and second walls being variable in a portion of the insulating space adjacent the vent such that gas molecules within the insulating space are directed towards the vent by the variable-distance portion of the first and second walls during the evacuation of the insulating space, the directing of the gas molecules by the variable-distance portion of the first and second walls imparting to the gas molecules a greater probability of egress from the insulating space than ingress.

Embodiment 22. The insulated component of claim 21, wherein the first and second arcuate shells are sealed along flanges of the first arcuate shell and the second arcuate shell.

Embodiment 23. The insulated component of claim 22, wherein the flange of the first arcuate shell extends at an angle that diverges from the arc of the first arcuate shell.

Embodiment 24. The insulated component of any of claims 22-23, wherein the flange of the second arcuate shell extends at an angle that diverges from the arc of the second arcuate shell.

Embodiment 25. The insulated component of any of claims 21-24, wherein the second tube is defined by a third arcuate shell sealed to a fourth arcuate shell.

Embodiment 26. The insulated component of claim 25, wherein the third and fourth arcuate shells are sealed along flanges of the third arcuate shell and the fourth arcuate shell.

Embodiment 27. The insulated component of claim 26, wherein the flange of the third arcuate shell extends at an angle that diverges from the arc of the third arcuate shell.

Embodiment 28. The insulated component of claim 27, wherein the flange of the fourth arcuate shell extends at an angle that diverges from the arc of the fourth arcuate shell.

Embodiment 29. The insulated component of any of claims 21-28, wherein the first and second arcuate shells are curved.

Embodiment 30. The insulated component of any of claims 1-9, wherein the second tube is curved.

Embodiment 31. A vacuum-insulated component, comprising: a first arcuate shell sealed to a second arcuate shell so as to define an insulating space therebetween, the sealed first and second arcuate shells defining a first tube, the first arcuate shell comprising a region that extends toward the second arcuate shell, the second arcuate shell comprising a region that extends toward the first arcuate shell, or both; the component further comprising a vent communicating with the insulating space to provide an exit pathway for gas molecules from the space, the vent comprising first and second walls defined by a region of the first arcuate shell that extends toward the second arcuate shell, by a region of the second arcuate shell that extends toward the first arcuate shell, or both, the vent being sealable for maintaining a vacuum within the insulating space following evacuation of gas molecules through the vent, the distance between the first and second walls being variable in a portion of the insulating space adjacent the vent such that gas molecules within the insulating space are directed towards the vent by the variable-distance portion of the first and second walls during the evacuation of the insulating space, the directing of the gas molecules by the variable-distance portion of the first and second walls imparting to the gas molecules a greater probability of egress from the insulating space than ingress.

Embodiment 32. The vacuum-insulated component of claim 31, wherein the first and second arcuate shells are curved.

Embodiment 33. A method of fabricating a vacuum-insulated component, comprising: sealing a first arcuate shell to a second arcuate shell so as to define a first tube; disposing a second tube within the first tube so as to define an insulating space between the first and second tubes, the vacuum-insulated component comprising a vent defined by first and second walls communicating with the insulating space to provide an exit pathway for gas molecules from the space, the vent being sealable for maintaining a vacuum within the insulating space following evacuation of gas molecules through the vent, the distance between the first and second walls being variable in a portion of the insulating space adjacent the vent such that gas molecules within the insulating space are directed towards the vent by the variable-distance portion of the first and second walls during the evacuation of the insulating space, the directing of the gas molecules by the variable-distance portion of the first and second walls imparting to the gas molecules a greater probability of egress from the insulating space than ingress; and giving rise to a reduced pressure within the insulating space and sealing the vent so as to maintain the insulating space.

Embodiment 34. The method of claim 33, further comprising sealing a third arcuate shell to a fourth arcuate shell to as to form the second tube.

Embodiment 35. The method of any of claims 33-34, wherein sealing the first and second arcuate shells is effected along flanges of the first and second arcuate shells.

Embodiment 36. The method of any of claims 33-35, wherein the first and second arcuate shells are curved.

Embodiment 37. The method of any of claims 34-36, wherein the third and fourth arcuate shells are curved.

Embodiment 38. A method of fabricating a vacuum-insulated component, comprising: sealing a first arcuate shell to a second arcuate shell so as to define a first tube; disposing a second tube within the first tube so as to define an insulating space between the first and second tubes, the vacuum-insulated component including a vent comprising first and second walls defined by a region of the first arcuate shell that extends toward the second arcuate shell, by a region of the second arcuate shell that extends toward the first arcuate shell, or both, the vent being sealable for maintaining a vacuum within the insulating space following evacuation of gas molecules through the vent, the distance between the first and second walls being variable in a portion of the insulating space adjacent the vent such that gas molecules within the insulating space are directed towards the vent by the variable-distance portion of the first and second walls during the evacuation of the insulating space, the directing of the gas molecules by the variable-distance portion of the first and second walls imparting to the gas molecules a greater probability of egress from the insulating space than ingress; and giving rise to a reduced pressure within the insulating space and sealing the vent so as to maintain the insulating space.

Embodiment 39. The method of claim 38, wherein the first and second arcuate shells are curved.

Embodiment 40. The method of any of claims 38-39, wherein the first and second arcuate shells are sealed to one another such that two elongate edges of the first arcuate shell are sealed to two arcuate shells of the second arcuate shell so as to form two elongate sealed regions.

Embodiment 41. The method of claim 40, further comprising sealing the two elongate sealed regions to one another.

In one aspect, the present disclosure provides vacuum-insulated components, comprising: a first arcuate shell sealed to a second arcuate shell, the sealed first and second arcuate shells defining a first tube; a second tube being disposed within the first tube so as to define a sealed insulating space between the first tube and the second tube, the second tube being coaxial with the first tube, the component further comprising a vent defined by first and second walls communicating with the insulating space to provide an exit pathway for gas molecules from the space, the vent being sealable for maintaining a vacuum within the insulating space following evacuation of gas molecules through the vent, the distance between the first and second walls being variable in a portion of the insulating space adjacent the vent such that gas molecules within the insulating space are directed towards the vent by the variable-distance portion of the first and second walls during the evacuation of the insulating space, the directing of the gas molecules by the variable-distance portion of the first and second walls imparting to the gas molecules a greater probability of egress from the insulating space than ingress.

Some exemplary vacuum-insulated vents and structures (and related techniques for forming and using such structures) can be found in United States patent application publications 2015/0110548, 2014/0090737, 2012/0090817, 2011/0264084, 2008/0121642, and 2005/0211711, all by A. Reid, and all incorporated herein by reference in their entireties for any and all purposes. It should be understood that a vacuum (i.e., any vacuum within the disclosed devices and methods) can be effected by the methods in the aforementioned applications or by any other method known in the art.

The first and second arcuate shells can be sealed along flanges (e.g., planar regions, extensions, and the like) of the first arcuate shell and the second arcuate shell. The sealing can be accomplished by welding, brazing, or other methods known in the art. Alternatively, the shells can be sealed along curved or other-shaped regions of the shells.

The term "arcuate" should be understood as referring to curved; an arcuate shell need not be semicircular in cross-section. An arcuate shell can comprise a curve that is a section of a circle, of an oval, or even a section of a toroid. A shell can comprise a portion of a frustoconical structure.

In some embodiments, the flange of the first arcuate shell extends at an angle that diverges from the arc of the first arcuate shell. The flange can comprise a slot, tab, groove, or other feature that engages with a complementary feature of another shell. In some embodiments, the flange of the second arcuate shell extends at an angle that diverges from the arc of the second arcuate shell. A flange can extend from a shell at an angle that is perpendicular to the angle of the shell at the location at which the flange extends. A flange can in some embodiments also extend from a shell at an angle of from +90 to −90 degrees relative to the angle of the shell at the location from which the flange extends.

The second tube of a component can be defined by a third arcuate shell sealed to a fourth arcuate shell. The third and fourth arcuate shells can be sealed along flanges (e.g., planar regions) of the third arcuate shell and the fourth arcuate shell. The flange of the third arcuate shell extends at an angle that diverges from the arc of the third arcuate shell. Similarly, the flange of the fourth arcuate shell extends at an angle that diverges from the arc of the fourth arcuate shell. In some embodiments, the first and second arcuate shells can be curved. Similarly, the second tube can be curved, kinked, or otherwise non-straight.

It should be understood that in some embodiments, the second or inner tube can be formed from a single piece of material. For example, a second tube can be formed in an extruded manner, in an injection mold, by forging, or by other methods known to those of ordinary skill in the art. Put another way, it is not a requirement that a second—or inner—tube be formed from two shells that are sealed together.

A first tube can have a characteristic cross-sectional dimension (e.g., inner diameter or other interior cross-sectional measurement) in the range of, e.g., from about 0.1 mm to about 10 mm, 20 mm, 30 mm, 40 mm, 50 mm, or even 100 mm. The foregoing values are illustrative only and are not limiting of the present disclosure. A second tube can have a characteristic cross-sectional dimension (e.g., inner diameter or other interior cross-sectional measurement) in the range of from about 0.1 mm to about 100 mm. The spacing between first and second tube can be in the range of from about 0.01 mm to about 10 mm, and all intermediate values.

The present disclosure also provides vacuum-insulated components. The components suitably comprise a first arcuate shell sealed to a second arcuate shell so as to define an insulating space therebetween, the sealed first and second arcuate shells defining a first tube, the first arcuate shell comprising a region that extends toward the second arcuate shell, the second arcuate shell comprising a region that extends toward the first arcuate shell, or both; the component further comprising a vent communicating with the insulating space to provide an exit pathway for gas molecules from the space, the vent comprising first and second walls defined by a region of the first arcuate shell that extends toward the second arcuate shell, by a region of the second arcuate shell that extends toward the first arcuate shell, or both, the vent being sealable for maintaining a vacuum within the insulating space following evacuation of gas molecules through the vent, the distance between the first and second walls being variable in a portion of the insulating space adjacent the vent such that gas molecules within the insulating space are directed towards the vent by the variable-distance portion of the first and second walls during the evacuation of the insulating space, the directing of the gas molecules by the variable-distance portion of the first and second walls imparting to the gas molecules a greater probability of egress from the insulating space than ingress.

Suitable shells are described elsewhere herein. In some embodiments, the first and second arcuate shells are curved.

The vent can be formed at an end of a component. The vent can also be formed along an edge or along a length of a component, depending on the user's needs and the configuration of the component in question.

A component can comprise a vent according to the present disclosure at one or both ends of the component. Similarly, a component can comprise a single vent formed along an edge or along a length of the component, but the component can also comprise two or more vents, depending on the user's specifications for the component.

Components according to the present disclosure can be, e.g., cylindrical in form, as shown by the attached, non-limiting figures. Components can have an aspect ratio in the range of from about 1:10 to about 100:1 or greater, e.g., from 1:10 to about 1000:1, and all intermediate values. A component can have an outer diameter in the range of from about 1 mm to about 10 cm, or from about 10 mm to about 1 cm, or from about 20 mm to about 80 mm, or from about 30 mm to about 70 mm, or from about 40 mm to about 60 mm, or even about 50 mm.

A component can be configured to convey fluid disposed within the component. A component can also be configured to contain wires, data conduits (e.g., fiber optics), and the like. A component can comprise a fitting or other connector so as to enable engagement with another device, e.g., a refrigerator device or similar. Such fittings include, e.g., screw fittings, press-fit fittings, bayonet connectors, and the like.

Also provided are methods of fabricating a vacuum-insulated component, comprising: sealing a first arcuate shell to a second arcuate shell so as to define a first tube; disposing a second tube within the first tube so as to define an insulating space between the first and second tubes, the vacuum-insulated component comprising a vent defined by first and second walls communicating with the insulating space to provide an exit pathway for gas molecules from the space.

The vent can be being sealable for maintaining a vacuum within the insulating space following evacuation of gas molecules through the vent, the distance between the first and second walls being variable in a portion of the insulating space adjacent the vent such that gas molecules within the insulating space are directed towards the vent by the variable-distance portion of the first and second walls during the evacuation of the insulating space, the directing of the gas molecules by the variable-distance portion of the first and second walls imparting to the gas molecules a greater probability of egress from the insulating space than ingress.

The methods can also include giving rise to a reduced pressure within the insulating space and sealing the vent so as to maintain the insulating space. This can be accomplished via a vacuum furnace, a getter material, or by other methods known to those of ordinary skill in the art.

The methods can further comprise sealing a third arcuate shell to a fourth arcuate shell to as to form the second tube. Sealing the first and second arcuate shells can be effected along flanges (e.g., planar regions) of the first and second arcuate shells.

In some embodiments, the first and second arcuate shells are curved. In some embodiments, the third and fourth arcuate shells are curved.

As one example, a user can desire to insulate a tube (i.e., an inner tube) that includes a bend of 45 degrees. The user can then fabricate first and second shells—e.g., via hydroforming or other fluid-assisted formation—such that the first and second shells can engage and be sealed to one another and such that the first and second shells are shaped such that when assembled, they enclose the angled inner tube. A user can, of course, use a commercially-available inner tube as the basis for designing the shells that are then used to enclose that inner tube. A user can also fabricate their own inner tube according to their own specifications.

Also provided are methods of fabricating a vacuum-insulated component, comprising: sealing a first arcuate shell to a second arcuate shell so as to define a first tube; disposing a second tube within the first tube so as to define an insulating space between the first and second tubes, the vacuum-insulated component including a vent comprising first and second walls defined by a region of the first arcuate shell that extends toward the second arcuate shell, by a region of the second arcuate shell that extends toward the first arcuate shell, or both, the vent being sealable for maintaining a vacuum within the insulating space following evacuation of gas molecules through the vent, the distance between the first and second walls being variable in a portion of the insulating space adjacent the vent such that gas molecules within the insulating space are directed towards the vent by the variable-distance portion of the first and second walls during the evacuation of the insulating space, the directing of the gas molecules by the variable-distance portion of the first and second walls imparting to the gas molecules a greater probability of egress from the insulating space than ingress; and giving rise to a reduced pressure within the insulating space and sealing the vent so as to maintain the insulating space.

In some embodiments, the first and second arcuate shells are curved. In some embodiments, the first and second arcuate shells are sealed to one another such that two elongate edges of the first arcuate shell are sealed to two arcuate shells of the second arcuate shell so as to form two elongate sealed regions. In some embodiments, the methods can further comprise sealing the two elongate sealed regions to one another. The sealing can be effected by various methods known to those of skill in the art, e.g., brazing, welding, and the like.

Embodiment 42. An insulated conduit, comprising: an outer tube, the outer tube comprising an outer tube corrugated section; an inner tube disposed within the outer tube, the inner tube defining a lumen and further comprising an inner tube corrugated section; the inner tube corrugated section and the outer tube corrugated section being at least partially in register with one another, and the inner tube and outer tube defining a sealed insulating region of reduced pressure therebetween.

Embodiment 43. The insulated conduit of embodiment 42, wherein the (sealed) insulating region of reduced pressure defines a pressure in the range of from about $10^{-2}$ to about $10^{-9}$ Torr. Pressures of from, e.g., $10^{-3}$ to $10^{-8}$, $10^{-4}$ to $10^{-7}$, or even $10^{-5}$ to $10^{-6}$ Torr are all considered suitable. The sealing of the region of reduced pressure can be accomplished as described elsewhere herein or in any of the documents cited herein.

Embodiment 44. The insulated conduit of any of embodiments 42-43, further comprising (a) a first vent communicating with the sealed insulating region to provide an exit pathway for gas molecules from the sealed insulating region, the first vent being sealable for maintaining the reduced pressure within the first insulating space following evacuation of gas molecules through the first vent, and (b) a first seal sealing the first insulating space at the first vent. The seal can be effected by, e.g., brazing, welding, or other techniques known to those of ordinary skill in the art.

Embodiment 45. The insulated conduit of any of embodiments 42-44, wherein the outer tube corrugated section defines an outer corrugation height that is from about 0.01 to about 100% of an inner diameter of an uncorrugated section of the outer tube. The outer corrugation height can be, e.g., from about 1 to about 90% of an inner diameter of an uncorrugated section of the outer tube, or from about 5 to about 85% of an inner diameter of an uncorrugated section of the outer tube, or from about 10 to about 80% of an inner diameter of an uncorrugated section of the outer tube, or from about 15 to about 75% of an inner diameter of an uncorrugated section of the outer tube, or from about 20 to about 70% of an inner diameter of an uncorrugated section of the outer tube, or from about 30 to about 65% of an inner diameter of an uncorrugated section of the outer tube, or from about 35 to about 60% of an inner diameter of an uncorrugated section of the outer tube, or from about 40 to about 55% of an inner diameter of an uncorrugated section of the outer tube, or even about 50% of an inner diameter of an uncorrugated section of the outer tube. In some embodiments, the outer corrugation height is from about 0.01 or even 0.1 to about 10% of an inner diameter of an uncorrugated section of the outer tube.

Embodiment 46. The insulated conduit of any of embodiments 42-45, wherein the inner tube corrugated section defines an inner corrugation height that is from about 0.5 to about 100% of an inner diameter of an uncorrugated section of the inner tube. The inner corrugation height can be, e.g., from about 1 to about 90% of an inner diameter of an uncorrugated section of the inner tube, or from about 5 to about 85% of an inner diameter of an uncorrugated section of the inner tube, or from about 10 to about 80% of an inner diameter of an uncorrugated section of the inner tube, or from about 15 to about 75% of an inner diameter of an uncorrugated section of the inner tube, or from about 20 to about 70% of an inner diameter of an uncorrugated section of the inner tube, or from about 30 to about 65% of an inner diameter of an uncorrugated section of the inner tube, or from about 35 to about 60% of an inner diameter of an uncorrugated section of the inner tube, or from about 40 to about 55% of an inner diameter of an uncorrugated section of the inner tube, or even about 50% of an inner diameter of an uncorrugated section of the inner tube. In some embodiments, the inner corrugation height is from about 0.01 or even 0.1 to about 10% of an inner diameter of an uncorrugated section of the inner tube.

Embodiment 47. The insulated conduit of embodiment 46, wherein the ratio of the outer corrugation height to the inner corrugation height is from about 1:100 to about 100:1. Ratios of from about 1:100 to about 100:1, 1:90 to 90:1, 1:80 to 80:1, 1:70 to 70:1, 1:60 to 60:1, 1:50 to 50:1, 1:40 to 40:1, 1:30 to 30:1, 1:20 to 20:1, or even 1:10 to 10:1 are all considered suitable.

Embodiment 48. The insulated conduit of embodiment 47, wherein the ratio of the outer corrugation height to the inner corrugation height is from about 1:10 to about 10:1.

Embodiment 49. The insulated conduit of any of embodiments 42-48, wherein a second region of the inner tube defines a central axis that is from 0 to about 90 degrees from the central axis of a first region of the inner tube.

The first and second regions of the inner tube can be regions at either end of a bend in the conduit. The bend in the conduit can be only in corrugated regions of the inner and outer tubes, although this is not a requirement. The bend can be adjustable, e.g., the conduit can be bent by a certain initial amount (e.g., by 10 degrees) so as to enable insertion of the conduit into a certain space and then further bent by an additional amount (e.g., by an additional 5 degrees). A conduit can also be bent and then un-bent (i.e., at least partially straightened), depending on the needs of the user.

Because the disclosed conduits are bendable (e.g., by hand), users no longer need to order customized conduits for particular applications. Instead, a user can purchase a set of bendable conduits according to the present disclosure, which conduits can then be custom-bent to the user's needs. As mentioned, a conduit can be bendable by hand, but can also be bendable by machine. In some embodiments, a force of 10 lb-f or less can be used to bend the insulated conduit.

Embodiment 50. The insulated conduit of embodiment 49, wherein a second region of the inner tube defines a central axis that is from 20 to about 70 degrees from the central axis of a first region of the inner tube.

Embodiment 51. The insulated conduit of embodiment 50, wherein a second region of the inner tube defines a central axis that is from 35 to about 65 degrees from the central axis of a first region of the inner tube.

Embodiment 52. The insulated conduit according to any of embodiments 42-51, further comprising a fitting configured to securably maintain the insulated conduit in engagement with a fluid source or fluid outlet. Such a fitting can be, e.g., a screw fitting, a bayonet-type fitting, a friction fit-type fitting, or other fittings known to those of skill in the art.

As one example, a fitting can be used to secure a conduit according to the present disclosure to a pressurized source of fluid, e.g., a liquid nitrogen. This can be accomplished so as to place the lumen of the conduit (i.e., the lumen of the inner tube of the conduit) into fluid communication with the source of fluid. In this way, a user can then dispense the fluid (e.g., during a medical procedure) through the conduit, the insulating space of the conduit acting to minimize heat transfer between the fluid and the environment exterior to the conduit. The user can bend the conduit before, during, or even after the fluid is dispensed, thus allowing the user the opportunity to, e.g., bend the conduit as needed during fluid dispensing so that the user can direct the fluid to one or more desired locations.

As another example, conduits according to the present disclosure can be bent during a manufacturing process so as to place two locations into fluid communication with one another. This can be done in, e.g., the assembly of a fluid handling device, as a user can connect one end of a conduit according to the present disclosure to a fluid source (e.g., a source of high temperature fluid) and then bend the conduit so as to place that fluid source into fluid communication with a destination that might not be accessible by a straight conduit.

For example, in a medical device, one can connect a conduit according to the present disclosure to a source of liquid nitrogen, bend the conduit around one or more components of the medical device so as to place the source of liquid nitrogen into fluid communication with an outlet of the device. In this way, the disclosed conduits allow for curved or tortuous fluid pathways that, by virtue of the conduits' insulating characteristics, maintain the temperature of the fluid by minimizing heat transfer between the fluid within the conduit and the environment exterior to the conduit.

Embodiment 53. A method, comprising communicating a fluid through the lumen of the inner tube of an insulated conduit according to any of embodiments 42-52. The disclosed conduits are suitable for use with virtually any fluid. A fluid can be in a liquid or a gaseous state.

Embodiment 54. The method of embodiment 53, wherein the fluid defines a temperature of between about 0 deg C. and about −210 deg. C. The foregoing temperatures are illustrative only, as a conduit according to the present disclosure can be used to carry essentially any fluid at any temperature that does not adversely degrade the conduit itself.

Embodiment 55. The method of embodiment 54, wherein the fluid defines a temperature of between about 0 deg. C. and about 200 deg. C.

Embodiment 56. A method, comprising bending the outer tube corrugated section and the inner tube corrugated section of an insulated conduit according to any of embodiments 42-52. (An exemplary bent conduit is shown in FIG. 1D, in which figure the bending is shown by angle θ.)

Embodiment 57. The method of embodiment 56, wherein the bending is from about 1 to about 180 degrees, e.g., about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, or even 180 degrees. The bending can be between about 10 and about 170, about 20 and about 160, about 30 and about 150, about 40 and about 140, about 50 and about 130, about 60 and about 120, about 70 and about 110, about 80 and about 100, or even about 90 degrees.

Embodiment 58. The method of embodiment 16, wherein the bending is from about 20 to about 90 degrees. For example, the bending can be from about 20 to about 90 degrees, or from about 30 to about 80 degrees, or from about 40 to about 70 degrees, or even from about 50 to about 60 degrees.

Embodiment 59. The method of embodiment 17, wherein the bending is from about 40 to about 60 degrees.

Embodiment 60. A method, comprising: with an outer tube, the outer tube comprising an outer tube corrugated section, and an inner tube defining a lumen and further comprising an inner tube corrugated section, disposing the inner tube within the outer tube such that there is a space therebetween, the inner tube corrugated section and the outer tube corrugated section being at least partially in register with one another, and sealing the space between the inner tube and outer tube so as to give rise to a sealed insulating region of reduced pressure therebetween.

In some embodiments, the inner and outer tubes are positioned by way of relative motion; e.g., by holding the outer tube in a given location and inserting the inner tube into the outer tube. In some embodiments, one or both of the inner and outer tubes includes a feature (tab, slot, groove, ridge, and the like) to assist with positioning the inner and outer tubes relative to one another. As one example, the inner tube can include a circumferential groove at one or more locations along its length, and the outer tube can include a circumferential ridge that is complementary to the groove of the inner tube. In this way, the ridge of the outer tube engages with the groove of the inner tube, thereby assisting with positioning the inner and outer tubes relative to one another.

Suitable inner and outer tubes are described elsewhere herein. The sealing can be performed according to methods known in the art, e.g., brazing, welding, and the like.

Embodiment 61. The method of embodiment 19, wherein the inner and outer tubes define a first vent communicating with the sealed insulating region to provide an exit pathway for gas molecules from the sealed insulating region, the first vent being sealable for maintaining the reduced pressure within the first insulating space following evacuation of gas molecules through the first vent.

Suitable vents are described elsewhere herein and also in the documents cited in this disclosure. By reference to FIG. 1C, a vent can be located at an intersection between outer tube 104 and spacer 102, at an intersection between inner tube 106 and spacer 102, or both. A vent can be located at an intersection (not shown) between inner tube 106 and outer tube 104.

Embodiment 62. An insulated conduit, comprising: an outer tube having a first end and an inner tube having a first end, the inner tube defining a lumen, the inner tube being disposed within the outer tube so as to define a insulating space between the first tube and the second tube, the conduit further comprising a vent defined by a sealer ring having a first wall and a second wall, the second wall being disposed opposite the outer tube and the first wall being disposed opposite the inner tube, the sealer ring being disposed between one or both of the first end of the outer tube and the first end of the inner tube and the other tube so as to seal the insulating space to provide an exit pathway for gas molecules from the space, the vent being sealable for maintaining a vacuum within the insulating space following evacuation of gas molecules through the vent, (a) the distance between the second wall of the sealer ring and the outer tube and/or (b) the distance between the first wall of the sealer ring and the and the outer tube being variable in a portion of the insulating space adjacent the vent such that gas molecules within the insulating space are directed towards the vent by the variable-distance portion of the first and second walls during the evacuation of the insulating space, the directing of the gas molecules by the variable-distance portion of the first and second walls imparting to the gas molecules a greater probability of egress from the insulating space than ingress, and the lumen of the inner tube comprising a first major axis at the first end of the inner tube, and the lumen comprising a bend, measured relative to the first major axis of from about 1 to about 180 degrees. The measurement can be in a single dimension, e.g., in the x-plane dimension.

The lumen can be, e.g., C-shaped, S-shaped, helical, or otherwise comprise one or more bends. As shown in exemplary FIG. 1A, the lumen can be shaped such that fluid entering the conduit along the major axis at the first end of the lumen exits the lumen at the second end of the lumen along an axis that does not intersect the major axis along which the fluid entered.

Embodiment 63. The insulated conduit of embodiment 62, wherein the inner tube comprises two or more segments. Segments can be abutted or otherwise joined to one another.

Embodiment 64. The insulated conduit of any of embodiments 62-63, wherein the inner tube (lumen) comprises at least two curves that curve in different dimensions from one another. As one example, an inner tube lumen can include a first bend of 45 degrees in the x-plane dimension at one location along the length of the lumen, and the lumen can also include a second bend of 30 degrees in the y-plane dimension at a second location along the length of the lumen.

A bend can, of course, be in more than one dimension, e.g., a bend that is at 15 degrees in the x-plane dimension and 30 degrees in the y-plane dimension. In one embodiment, the inner tube can be characterized as being of a corkscrew configuration. In another embodiment, the inner tube can be characterized as being S-shaped in configuration.

Embodiment 65. The insulated conduit of any of embodiments 62-64, wherein the inner tube defines a second end, wherein the inner tube defines a second major axis at the second end of the inner tube.

Embodiment 66. The insulated conduit of embodiment 65, wherein the second major axis does not intersect the first major axis.

Embodiment 67. The insulated conduit of embodiment 65, wherein the second major axis intersects the first major axis.

Embodiment 68. The insulated conduit of embodiment 65, wherein the second major axis is offset from the first major axis by a non-zero angle in at least one dimension.

Embodiment 69. The insulated conduit of embodiment 68, wherein the second major axis is offset from the first major axis by a non-zero angle in at least two dimensions.

Embodiment 70. The insulated conduit of any of embodiments 62-69, wherein at least one of the outer tube and the inner tube comprises a corrugated surface.

Embodiment 71. The insulated conduit of any of embodiments 62-70, further comprising a spacer material disposed within the insulating space, the spacer material being disposed so as to maintain a separation between the inner tube and the outer tube. The spacer material is suitably a heat-resistant material, e.g., a ceramic. The spacer can be present as, e.g., a thread or yarn. In some embodiments, the spacer is in the form of a sleeve that is disposed between the inner and outer tubes. A sleeve can be woven, non-woven, or even helical in construction. In some embodiments, the spacer is in the form of a winding that is wound around the inner tube.

The spacer is suitable a flexible material such that it can flex or otherwise accommodate bends in the inner tube.

Embodiment 72. The insulated conduit of embodiment 71, wherein the spacer material comprises a ceramic.

Embodiment 73. The insulated conduit of any of embodiments 71-72, wherein the spacer material is characterized as braided.

Embodiment 74. The insulated conduit of any of embodiments 62-73, wherein the inner tube is characterized as having two bends, each in a different dimension.

Embodiment 75. The insulated conduit of any of embodiments 62-74, wherein the sealing right is characterized as having a varying thickness.

Embodiment 76. The insulated conduit of embodiment 75, wherein the thickness of the sealing ring increases in the direction of the first end of the inner tube and the first end of the outer tube.

Embodiment 77. The insulated conduit of any of embodiments 75-76, wherein the sealing ring is characterized as having a V-shaped cross-section.

Embodiment 78. The insulated conduit of any of embodiments 62-77, wherein the sealed insulating space defines a vacuum in the range of from about $10^{-5}$ to about $10^{-9}$ Torr.

Embodiment 79. The insulated conduit of any of embodiments 1-16, wherein the sealed insulating space defines a vacuum in the range of from about $10^{-6}$ to about $10^{-8}$ Torr.

Embodiment 80. The insulated conduit of any of embodiments 62-79, wherein the lumen of the inner tube defines a diameter in the range of from about 5 mm to about 20 cm.

Embodiment 81. The insulated conduit of embodiment 80, wherein the lumen of the inner tube defines a diameter in the range of from about 10 mm to about 5 cm.

Embodiment 82. A method, comprising communicating a fluid through the lumen of an insulated conduit according to any of embodiments 62-81.

Embodiment 83. The method of embodiment 82, wherein the fluid defines a temperature of less than about 0 deg. C.

Embodiment 84. The method of embodiment 82, wherein the fluid defines a temperature of greater than about 50 deg. C.

Embodiment 85. The method of any of embodiments 82-84, wherein the fluid experiences a temperature loss of less than about 20 deg. C. during communication through the conduit.

Embodiment 86. The method of embodiment 85, wherein the fluid experiences a temperature loss of less than about 10 deg. C. during communication through the conduit.

Embodiment 87. The method of embodiment 86, wherein the fluid experiences a temperature loss of less than about 5 deg. C. during communication through the conduit.

Embodiment 88. A method, comprising: positioning an inner tube having a first end within an outer tube having a first end, so as to define an insulating space therebetween; positioning a spacer in the insulating space; sealing, to the inner tube and outer tube, a sealer ring having a first wall and a second wall so as to form a vent, the second wall of the sealer ring being disposed opposite the outer tube and the first wall of the sealer ring being disposed opposite the inner tube, the sealer ring being disposed between one or both of the first end of the outer tube and the first end of the inner tube and the other tube so as to seal the insulating space to provide an exit pathway for gas molecules from the space, the vent being sealable for maintaining a vacuum within the insulating space following evacuation of gas molecules through the vent, (a) the distance between the second wall of the sealer ring and the outer tube and/or (b) the distance between the first wall of the sealer ring and the and the outer tube being variable in a portion of the insulating space adjacent the vent such that gas molecules within the insulating space are directed towards the vent by the variable-distance portion of the first and second walls during the evacuation of the insulating space, the directing of the gas molecules by the variable-distance portion of the first and second walls imparting to the gas molecules a greater probability of egress from the insulating space than ingress, and the lumen of the inner tube comprising a first major axis at the first end of the inner tube Embodiment 89. The method of embodiment 88, the lumen comprising a bend, measured relative to the first major axis of from about 1 to about 180 degrees.

Embodiment 90. The method of embodiment 88, further comprising bending the inner and outer tubes so as to form a bend in the lumen, the bending being performed under such conditions that the spacer maintains a spacing between the inner tube and outer tube.

Embodiment 91. The method of embodiment 90, wherein the bending is performed such that the inner and outer tube are free of contact with one another.

Embodiment 92. An insulated conduit, comprising: a outer tube having a first end, the outer tube optionally comprising a corrugated region; an inner tube having a first end, the inner tube defining a lumen and the inner tube optionally comprising a corrugated region, the inner tube being disposed within the outer tube so as to define a insulating space between the first tube and the second tube, the conduit further comprising a vent defined by a seal between the outer tube and the inner tube, the vent being sealable for maintaining a vacuum within the insulating space following evacuation of gas molecules through the vent, the distance between the inner tube and the outer tube being variable in a portion of the insulating space adjacent the vent such that gas molecules within the insulating space are directed towards the vent by the variable-distance portion, the directing of the gas molecules by the variable-distance portion imparting to the gas molecules a greater probability of egress from the insulating space than ingress, and the lumen of the inner tube comprising a first major axis at the first end of the inner tube, and the lumen comprising a bend, measured relative to the first major axis, of from about 1 to about 180 degrees.

Embodiment 93. The insulated conduit of embodiment 92, wherein the vent is formed by (a) a region of the outer tube that converges toward the inner tube, (b) a region of the inner tube that diverges toward the outer tube, or both (a) and (b). In some embodiments, the inner tube can comprise two or more segments.

Embodiment 94. The insulated conduit of any of embodiments 92-93, wherein the inner tube comprises at least two curves in different planes.

Embodiment 95. The insulated conduit of any of embodiments 92-94, wherein the inner tube defines a second end, wherein the inner tube defines a second major axis at the second end of the inner tube.

Embodiment 96. The insulated conduit of embodiment 95, wherein the second major axis does not intersect the first major axis.

Embodiment 97. The insulated conduit of embodiment 95, wherein the second major axis intersects the first major axis.

Embodiment 98. The insulated conduit of embodiment 95, wherein the second major axis is offset from the first major axis by a non-zero angle in at least one dimension.

Embodiment 99. The insulated conduit of embodiment 98, wherein the second major axis is offset from the first major axis by a non-zero angle in at least two dimensions.

Embodiment 100. The insulated conduit of any of embodiments 92-99, further comprising a spacer material disposed within the insulating space, the spacer material being disposed so as to maintain a separation between the inner tube and the outer tube.

Embodiment 101. The insulated conduit of embodiment 100, wherein the spacer material comprises a ceramic.

Embodiment 102. The insulated conduit of any of embodiments 100-101, wherein the spacer material is characterized as braided.

Embodiment 103. The insulated conduit of any of embodiments 92-102, wherein the inner tube is characterized as having two bends, each in a different dimension.

Embodiment 104. The insulated conduit of any of embodiments 92-103, wherein the sealed insulating space defines a vacuum in the range of from about $10^{-5}$ to about $10^{-9}$ Torr.

Embodiment 105. The insulated conduit of embodiment 104, wherein the sealed insulating space defines a vacuum in the range of from about $10^{-6}$ to about $10^{-8}$ Torr.

Embodiment 106. The insulated conduit of any of embodiments 92-105, wherein the lumen of the inner tube defines a diameter in the range of from about 5 mm to about 20 cm.

Embodiment 107. The insulated conduit of embodiment 106, wherein the lumen of the inner tube defines a diameter in the range of from about 10 mm to about 5 cm.

Embodiment 108. A method, comprising communicating a fluid through the lumen of an insulated conduit according to any of embodiments 92-107.

Embodiment 109. The method of embodiment 108, wherein the fluid defines a temperature of less than about 0 deg. C.

Embodiment 110. The method of embodiment 108, wherein the fluid defines a temperature of greater than about 50 deg. C.

Embodiment 111. The method of any of embodiments 108-110, wherein the fluid experiences a temperature loss of less than about 20 deg. C. during communication through the conduit.

Embodiment 112. The method of embodiment 111, wherein the fluid experiences a temperature loss of less than about 10 deg. C. during communication through the conduit.

Embodiment 113. The method of embodiment 112, wherein the fluid experiences a temperature loss of less than about 5 deg. C. during communication through the conduit.

Embodiment 114. A method, comprising: positioning an optionally corrugated inner tube having a first end within an optionally corrugated outer tube having a first end, so as to define an insulating space therebetween; (a) the outer tube comprising a region that converges toward the inner tube, (b) the inner tube comprising a region that diverges toward the outer tube, or both (a) and (b), optionally positioning a spacer material in the insulating space; sealing the outer tube and inner tube so as to form a vent, the vent being sealable for maintaining a vacuum within the insulating space following evacuation of gas molecules through the vent, the distance between the inner tube and the outer tube being variable in a portion of the insulating space adjacent the vent such that gas molecules within the insulating space are directed towards the vent by the variable-distance portion, the directing of the gas molecules by the variable-distance portion imparting to the gas molecules a greater probability of egress from the insulating space than ingress, and the lumen of the inner tube comprising a first major axis at the first end of the inner tube, and the lumen of the inner tube comprising a first major axis at the first end of the inner tube, the lumen comprising a bend, measured relative to the first major axis, of from about 1 to about 180 degrees.

Embodiment 115. The method of embodiment 114, the lumen comprising a bend, measured relative to the first major axis of from about 1 to about 180 degrees.

Embodiment 116. The method of embodiment 115, further comprising bending the inner and outer tubes so as to form a bend in the lumen, the bending being performed under such conditions that the spacer maintains a spacing between the inner tube and outer tube.

Embodiment 117. The method of embodiment 116, wherein the bending is performed such that the inner and outer tube are free of contact with one another.

Embodiment 118. An insulated conduit, comprising: an outer tube having a first end and an inner tube having a first end, the inner tube defining a lumen, the first end of the inner tube and the first end of the outer tube being sealed to one another so as to define a insulating space between the first tube and the second tube, the distance between the inner and outer tubes being variable in a portion of the insulating space, and a vent in communication with the insulating space to provide an exit pathway for gas molecules from the insulating space, the vent located proximate to the variable distance portion of the insulating space such that gas molecules are guided towards the vent during evacuation of the insulating space to facilitate their egress from the insulating space, and the vent being sealable for maintaining a vacuum within the insulating space; the distance between the inner and outer tubes being variable in a portion of the insulating space adjacent the vent such that gas molecules within the insulating space are directed towards the vent by the variable-distance portion, the directing of the gas molecules by the variable-distance portion imparting to the gas molecules a greater probability of egress from the insulating space than ingress, and the lumen of the inner tube comprising a first major axis at the first end of the inner tube, and the lumen comprising a bend, measured relative to the first major axis of from about 1 to about 180 degrees.

Embodiment 119. The insulated conduit of Embodiment 118, wherein at least one of the inner tube and the outer tube comprises a corrugated region.

Embodiment 120. The insulated conduit of Embodiment 119, wherein the outer tube comprises a corrugated region.

Embodiment 121. The insulated conduit of Embodiment 119, wherein the outer tube is free of corrugations.

Embodiment 122. The insulated conduit of any of Embodiments 118-121, further comprising a spacing material disposed within the insulating space.

Embodiment 123. The insulated conduit of any of Embodiments 118-122, wherein the outer tube comprises a second end, wherein the inner tube comprises a second end, and wherein the second end of the inner tube and the second end of the outer tube are sealed.

It should be understood that in an insulated conduit according to the present disclosure, the inner and outer tubes can be sealed to one another so as to form a sealed insulated space therebetween, as described herein. In an insulated conduit according to the present disclosure, the inner and outer tubes can be sealed to a ring, e.g., as shown in FIG. 1B and as described elsewhere herein.

The disclosed technology also includes communicating a fluid through an insulated conduit according to the embodiments described herein, or through an insulated conduit according to any other embodiment described herein.

Embodiment 124. A system, comprising: (a) an outer tube, the outer tube having a distal end and a proximal end, (b) an inner tube having a distal end and a proximal end, and the inner tube defining a lumen and the inner tube further comprising a first corrugated region having a length and comprising a plurality of corrugations extending along the inner tube from the distal end of the inner tube toward the proximal end of the inner tube, the inner tube being disposed within the outer tube and the inner tube and outer tube being sealed so as to define a sealed insulating region of reduced pressure between the outer tube and the inner tube, the inner tube and outer tube being sealed (e.g., to one another) such that the first corrugated region of the inner tube expands or contracts (e.g., increases or decreases in length) in response to a temperature. As described elsewhere herein, this permits the inner tube to accommodate thermal stresses brought about by the temperature of a fluid carried within the system while the outer tube retains its shape/length/configuration. For example, a heated fluid may cause a change in shape (e.g., an expansion of 5%) of a corrugated region of the inner tube, but because the corrugated region of the inner tube has accommodated the thermal stress brought about by the heated fluid, the outer tube remains unchanged in shape.

Embodiment 125. The system of Embodiment 124, wherein the lumen of the inner tube is in fluid communication with a source of combustion.

Embodiment 126. The system of Embodiment 125, wherein the source of combustion comprises an internal combustion engine.

Embodiment 127. The system of any of Embodiments 124-126, wherein the outer tube comprises at least one corrugated region having a length.

Embodiment 128. The system of any of Embodiments 124-127, wherein the inner tube comprises two or more corrugated regions.

Embodiment 129. The system of Embodiment 128, wherein at least two of the regions differ in at least one of corrugation height or corrugation period.

Embodiment 130. The system of any of Embodiments 124-129, wherein at least one of the inner tube and the outer tube is characterized as curved. For example, at least one of the inner and outer tubes may define a major axis and a radius of curvature.

Embodiment 131. A method, comprising communicating a fluid within the lumen of a system according to any of Embodiments 124-130.

Suitable corrugation periods are described elsewhere herein. Suitable corrugation heights are also described elsewhere herein. A tube (e.g., inner tube) may have two or more corrugation regions, wherein the regions differ from one another in terms of corrugation period, corrugation height, or both. A tube may include alternating corrugated and non-corrugated region.

What is claimed:

1. An insulated conduit, comprising:
(a) an outer tube, the outer tube having a distal end and a proximal end,
the outer tube further comprising a first integral corrugated region having a length and comprising a plurality of corrugations extending along the outer tube from the distal end of the outer tube toward the proximal end of the outer tube; and
an inner tube disposed within the outer tube, the inner tube having a distal end and a proximal end, and the inner tube defining a lumen configured to communicate a fluid therein, the inner tube and outer tube being sealed directly to one another at a joint, optionally at the distal end of the inner tube, the seal defining a sealed insulating region of reduced pressure between the outer tube and the inner tube, and the inner tube and outer tube being sealed to one another such that the length of the first corrugated region of the outer tube increases or decreases in response to a temperature, or (b) an outer tube, the outer tube having a distal end and a proximal end;
an inner tube disposed within the outer tube, the inner tube having a distal end and a proximal end, and the inner tube defining a lumen configured to communicate a fluid therein,
the inner tube further comprising a first integral corrugated region having a length and comprising a plurality of corrugations extending along the inner tube from the distal end of the inner tube toward the proximal end of the inner tube,
the inner tube and outer tube being sealed directly to one another at a joint, optionally at the distal end of the outer tube, the seal defining a sealed insulating region of reduced pressure between the outer tube and the inner tube, and
the inner tube and outer tube being sealed to one another such that the length of the first corrugated region of the inner tube increases or decreases in response to a temperature.

2. The insulated conduit of claim 1, wherein the sealed insulating region defines a pressure in the range of from about $10^{-2}$ to about $10^{-9}$ Torr.

3. The insulated conduit of claim 1, wherein the joint comprises (a) a first vent communicating with the sealed insulating region to provide an exit pathway for gas molecules from the sealed insulating region, the first vent being sealable for maintaining a reduced pressure within the first insulating space following evacuation of gas molecules through the first vent, and (b) a first seal sealing the first insulating space at the first vent.

4. The insulated conduit of claim 1, wherein the outer tube first corrugated region defines a corrugation height that is from about 0.1 to about 100% of an inner diameter of an uncorrugated section of the outer tube.

5. The insulated conduit of claim 1, wherein the inner tube first corrugated region defines a corrugation height that is from about 0.1 to about 100% of an inner diameter of an uncorrugated section of the inner tube.

6. The insulated conduit of claim 1, wherein the outer tube first corrugated region has a length that is less than about 50% of the distance between the distal and proximal ends of the outer tube.

7. The insulated conduit of claim 1, wherein the outer tube first corrugated region has a length that is less than about 20% of the distance between the distal and proximal ends of the outer tube.

8. The insulated conduit of claim 1, wherein the inner tube first corrugated region has a length that is less than about 50% of the distance between the distal and proximal ends of the inner tube.

9. The insulated conduit of claim 6, wherein the inner tube first corrugated region has a length that is less than about 20% of the distance between the distal and proximal ends of the inner tube.

10. The insulated conduit of claim 1, wherein the inner tube and the outer tube comprise different metallic materials.

11. The insulated conduit of claim 1, wherein the inner tube and the outer tube comprise materials that have different coefficients of thermal expansion.

12. A method, comprising: communicating a fluid through the lumen of the inner tube of an insulated conduit, the insulated conduit comprising:
(a) an outer tube, the outer tube having a distal end and a proximal end,
the outer tube further comprising a first integral corrugated region having a length and comprising a plurality of corrugations extending along the outer tube from the distal end of the outer tube toward the proximal end of the outer tube; and
an inner tube disposed within the outer tube, the inner tube having a distal end and a proximal end, and the inner tube defining a lumen configured to communicate a fluid therein,
the inner tube and outer tube being sealed directly to one another at a joint, optionally at the distal end of the inner tube, the seal defining a sealed insulating region of reduced pressure between the outer tube and the inner tube, and
the inner tube and outer tube being sealed to one another such that the length of the first corrugated region of the outer tube increases or decreases in response to a temperature, or
(b) an outer tube, the outer tube having a distal end and a proximal end;
an inner tube disposed within the outer tube, the inner tube having a distal end and a proximal end, and the inner tube defining a lumen configured to communicate a fluid therein,
the inner tube further comprising a first integral corrugated region having a length and comprising a plurality of corrugations extending along the inner tube from the distal end of the inner tube toward the proximal end of the inner tube,
the inner tube and outer tube being sealed directly to one another at a joint, optionally at the distal end of the outer tube, the seal defining a sealed insulating region of reduced pressure between the outer tube and the inner tube, and
the inner tube and outer tube being sealed to one another such that the length of the first corrugated region of the inner tube increases or decreases in response to a temperature.

13. A system, comprising:
(a) an outer tube, the outer tube having a distal end and a proximal end,
(b) an inner tube having a distal end and a proximal end, and the inner tube defining a lumen and the inner tube further comprising a first integral corrugated region having a length and comprising a plurality of corrugations extending along the inner tube from the distal end of the inner tube toward the proximal end of the inner tube,
the inner tube being disposed within the outer tube and the inner tube and outer tube being sealed directly to one another so as to define a sealed insulating region of reduced pressure between the outer tube and the inner tube,
the inner tube and outer tube being sealed such that the first corrugated region of the inner tube expands or contracts in response to a temperature.

14. The system of claim 13, wherein the lumen of the inner tube is in fluid communication with a source of combustion.

15. The system of claim 14, wherein the system of combustion comprises an internal combustion engine.

16. The system of claim 13, wherein the outer tube comprises at least one corrugated region having a length.

17. The system of claim 13, wherein the inner tube comprises two or more corrugated regions.

18. The system of claim 17, wherein at least two of the regions differ in at least one of corrugation height or corrugation period.

19. The system of claim 13, wherein at least one of the inner tube and the outer tube is characterized as curved.

20. The insulated conduit of claim 1, wherein the outer tube comprises a first corrugated region having a length and comprising a plurality of corrugations extending along the outer tube from the distal end of the outer tube toward the proximal end of the outer tube.

21. The insulated conduit of claim 1, wherein the inner tube comprises a first corrugated region having a length and comprising a plurality of corrugations extending along the inner tube from the distal end of the inner tube toward the proximal end of the inner tube.

22. The insulated conduit of claim 1, wherein the outer tube comprises a corrugated region, wherein the inner tube comprises a corrugated region, and wherein the corrugated region of the outer tube is at least partially in register with the corrugated region of the inner tube.

23. An insulated conduit, comprising:
(a) an outer tube, the outer tube having a distal end and a proximal end,
the outer tube further comprising a first integral corrugated region having a length and comprising a plurality of corrugations extending along a region of the outer tube; and
an inner tube disposed within the outer tube, the inner tube having a distal end and a proximal end, and the inner tube defining a lumen configured to communicate a fluid therein,
the inner tube and outer tube being sealed directly to one another at a joint, optionally at the distal end of the inner tube, the seal defining a sealed insulating region of reduced pressure between the outer tube and the inner tube, and
the inner tube and outer tube being sealed to one another such that the length of the first corrugated region of the outer tube increases or decreases in response to a temperature, or
(b) an outer tube, the outer tube having a distal end and a proximal end;
an inner tube disposed within the outer tube, the inner tube having a distal end and a proximal end, and the inner tube defining a lumen configured to communicate a fluid therein,
the inner tube further comprising a first integral corrugated region having a length and comprising a plurality of corrugations extending along a region of the inner tube,
the inner tube and outer tube being sealed directly to one another at a joint, optionally at the distal end of the outer tube, the seal defining a sealed insulating region of reduced pressure between the outer tube and the inner tube, and
the inner tube and outer tube being sealed to one another such that the length of the first corrugated region of the inner tube increases or decreases in response to a temperature.

24. The insulated conduit of claim 23, wherein the sealed insulating region defines a pressure in the range of from about $10^{-2}$ to about $10^{-9}$ Torr.

25. The insulated conduit of claim 23, wherein the outer tube comprises a first corrugated region having a length and comprising a plurality of corrugations extending along the outer tube from the distal end of the outer tube toward the proximal end of the outer tube.

26. The insulated conduit of claim 23, wherein the inner tube comprises a first corrugated region having a length and comprising a plurality of corrugations extending along the inner tube from the distal end of the inner tube toward the proximal end of the inner tube.

27. The insulated conduit of claim 23, wherein the outer tube comprises a corrugated region, wherein the inner tube comprises a corrugated region, and wherein the corrugated region of the outer tube is at least partially in register with the corrugated region of the inner tube.

* * * * *